(12) United States Patent
Nishimaki

(10) Patent No.: US 12,711,804 B2
(45) Date of Patent: Aug. 18, 2026

(54) INFORMATION PROCESSING APPARATUS, IMAGE SENSOR, AND CONTROL METHOD USING ON-SENSOR IMAGE RECOGNITION

(71) Applicant: SONY SEMICONDUCTOR SOLUTIONS CORPORATION, Kanagawa (JP)

(72) Inventor: Hisashi Nishimaki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 174 days.

(21) Appl. No.: 18/291,939

(22) PCT Filed: Mar. 8, 2022

(86) PCT No.: PCT/JP2022/009864

§ 371 (c)(1),
(2) Date: Jan. 25, 2024

(87) PCT Pub. No.: WO2023/032274

PCT Pub. Date: Mar. 9, 2023

(65) Prior Publication Data

US 2024/0346844 A1 Oct. 17, 2024

(30) Foreign Application Priority Data

Aug. 31, 2021 (JP) ................................ 2021-141251

(51) Int. Cl.
*G06V 40/16* (2022.01)
*G06F 21/32* (2013.01)
(Continued)

(52) U.S. Cl.
CPC ............ *G06V 40/161* (2022.01); *G06F 21/32* (2013.01); *G06F 21/84* (2013.01);
(Continued)

(58) Field of Classification Search
None
See application file for complete search history.

(56) References Cited

U.S. PATENT DOCUMENTS

| | | | | |
|---|---|---|---|---|
| 10,986,264 B2 * | 4/2021 | Ejiri | ..................... | H04N 23/611 |
| 11,727,718 B2 * | 8/2023 | Wang | .................. | G06V 40/172 382/118 |

(Continued)

FOREIGN PATENT DOCUMENTS

| | | |
|---|---|---|
| JP | 2006-014291 A | 1/2006 |
| JP | 2007-325144 A | 12/2007 |

(Continued)

OTHER PUBLICATIONS

International Search Report and Written Opinion of PCT Application No. PCT/JP2022/009864, issued on May 17, 2022, 12 pages of ISRWO.

*Primary Examiner* — Tahmina N Ansari
(74) *Attorney, Agent, or Firm* — CHIP LAW GROUP

(57) ABSTRACT

The present technology relates to an information processing apparatus and an information processing method which are capable of reducing power consumption that impairs convenience. An image of a predetermined detection target is included in a captured image captured by an image sensor, an output image output from the image sensor is acquired, predetermined processing is executed on the output image, and the output image is output from the image sensor in a case where it is detected that the image of the detection target is included.

19 Claims, 31 Drawing Sheets

(51) Int. Cl.

| | |
|---|---|
| ***G06F 21/84*** | (2013.01) |
| ***G06K 7/10*** | (2006.01) |
| ***G06K 7/14*** | (2006.01) |
| ***G06T 3/60*** | (2006.01) |
| ***G06T 7/70*** | (2017.01) |
| ***G06V 10/147*** | (2022.01) |
| ***G06V 10/82*** | (2022.01) |

(52) U.S. Cl.

CPC ....... *G06K 7/10722* (2013.01); *G06K 7/1413* (2013.01); *G06K 7/1417* (2013.01); *G06T 3/60* (2013.01); *G06T 7/70* (2017.01); *G06V 10/147* (2022.01); *G06V 10/82* (2022.01); *G06V 40/172* (2022.01); *G06T 2207/30201* (2013.01)

(56) References Cited

U.S. PATENT DOCUMENTS

| | | | | |
|---|---|---|---|---|
| 12,411,927 | B2 * | 9/2025 | Dedonato | G06F 3/04842 |
| 2011/0317917 | A1 * | 12/2011 | Free | G06V 40/162 382/167 |
| 2019/0158730 | A1 * | 5/2019 | Ejiri | G03B 17/02 |
| 2020/0097747 | A1 * | 3/2020 | Wang | G06V 40/166 |
| 2021/0056291 | A1 * | 2/2021 | Doublet | G06V 40/18 |

FOREIGN PATENT DOCUMENTS

| | | | |
|---|---|---|---|
| JP | 2012-129701 | A | 7/2012 |
| JP | 2012-239156 | A | 12/2012 |
| JP | 2014-027386 | A | 2/2014 |
| JP | 2018-160799 | A | 10/2018 |
| JP | 2019-202089 | A | 11/2019 |

* cited by examiner

FIG. 1

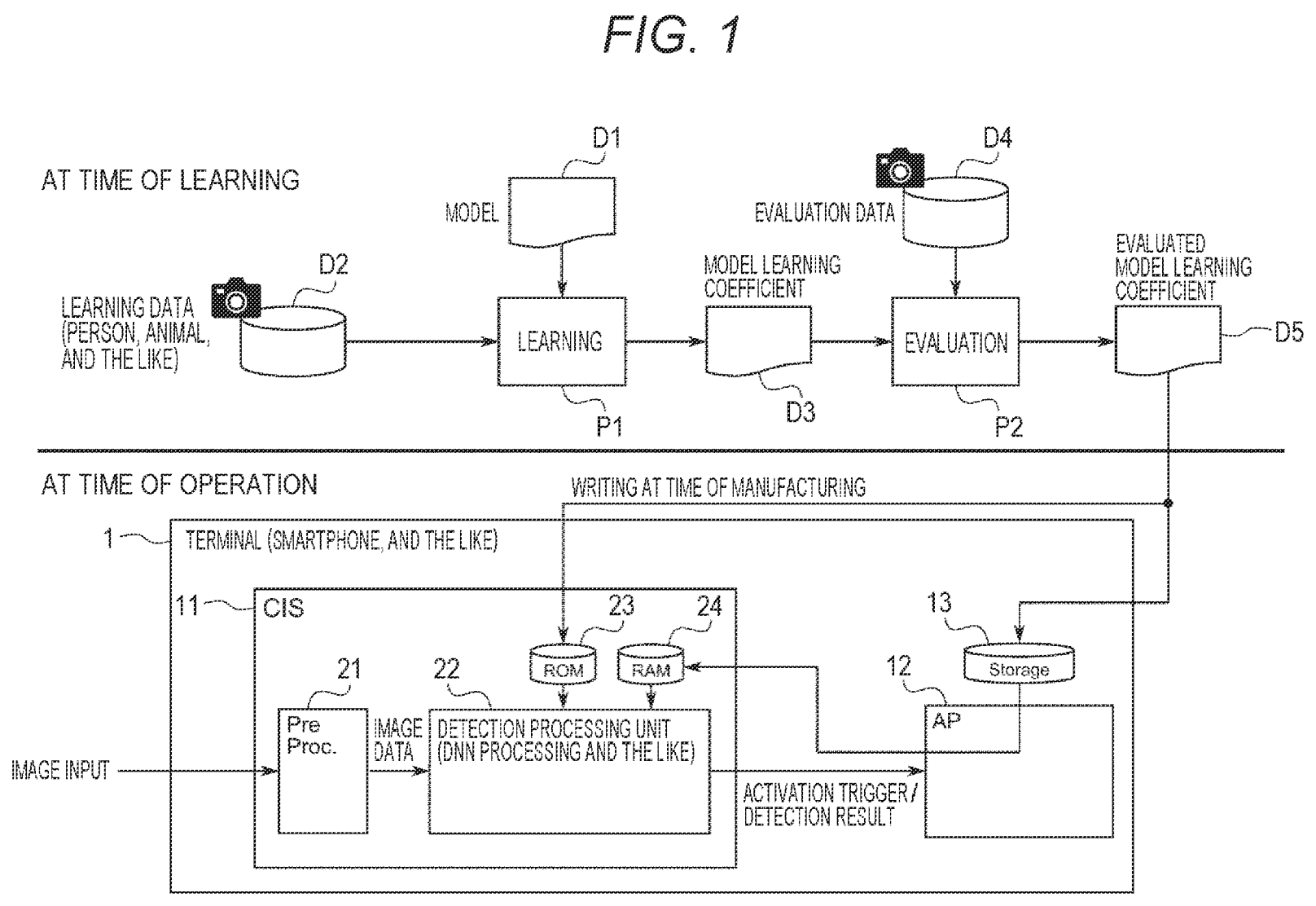

AT TIME OF LEARNING

LEARNING DATA (PERSON, ANIMAL, AND THE LIKE)

D2

MODEL

D1

LEARNING

P1

MODEL LEARNING COEFFICIENT

D3

EVALUATION DATA

D4

EVALUATION

P2

EVALUATED MODEL LEARNING COEFFICIENT

D5

AT TIME OF OPERATION

WRITING AT TIME OF MANUFACTURING

TERMINAL (SMARTPHONE, AND THE LIKE)

1

CIS

11

Pre Proc.

21

IMAGE DATA

DETECTION PROCESSING UNIT (DNN PROCESSING AND THE LIKE)

22

ROM

23

RAM

24

ACTIVATION TRIGGER / DETECTION RESULT

AP

12

Storage

13

IMAGE INPUT

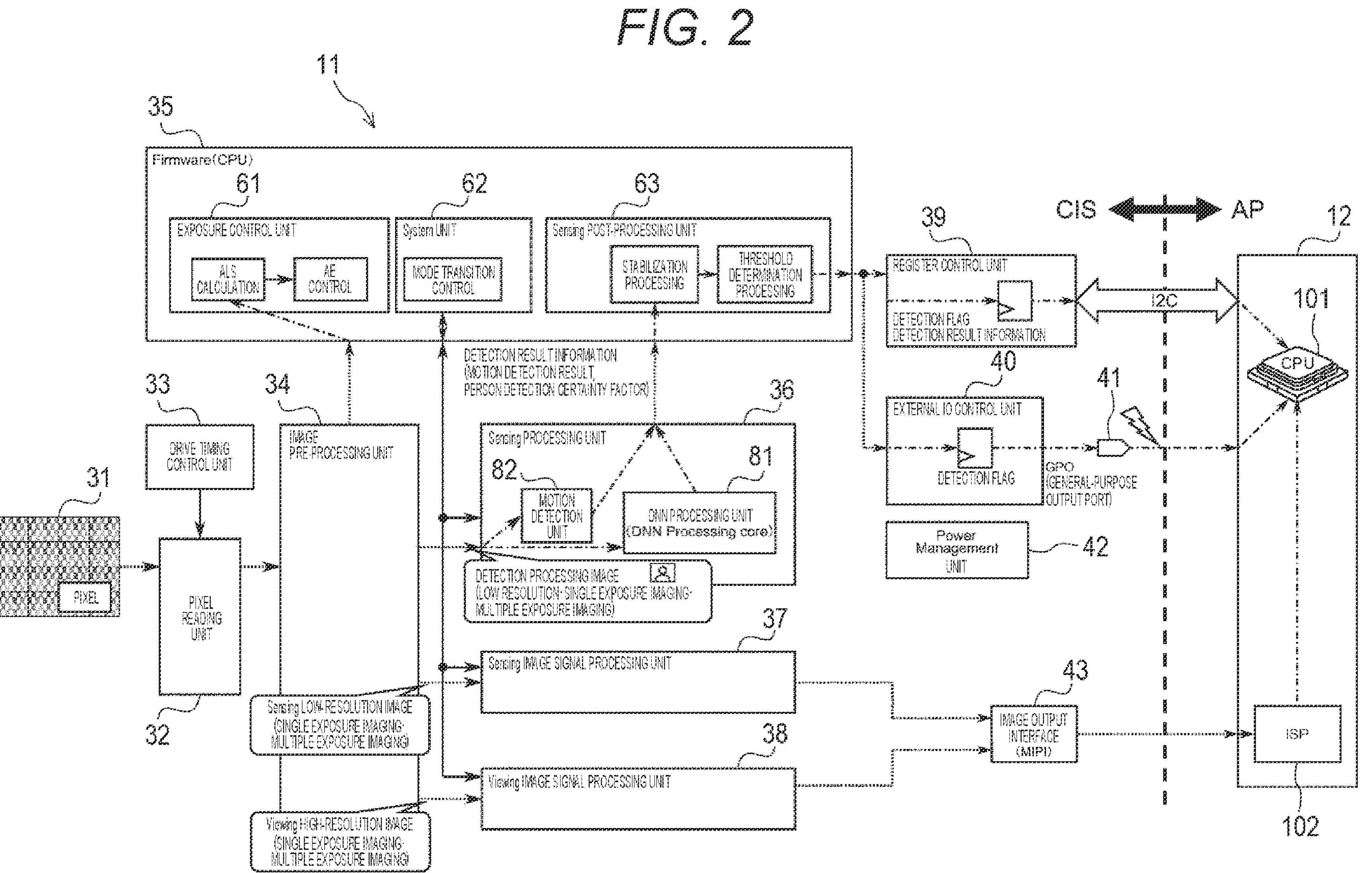
FIG. 2
11
35
Firmware (CPU)
61
EXPOSURE CONTROL UNIT
ALS CALCULATION
AE CONTROL
62
System UNIT
MODE TRANSITION CONTROL
63
Sensing POST-PROCESSING UNIT
STABILIZATION PROCESSING
THRESHOLD DETERMINATION PROCESSING
DETECTION RESULT INFORMATION (MOTION DETECTION RESULT, PERSON DETECTION CERTAINTY FACTOR)
31
PIXEL
33
DRIVE TIMING CONTROL UNIT
32
PIXEL READING UNIT
34
IMAGE PRE-PROCESSING UNIT
36
Sensing PROCESSING UNIT
82
MOTION DETECTION UNIT
81
DNN PROCESSING UNIT (DNN Processing core)
DETECTION PROCESSING IMAGE (LOW RESOLUTION·SINGLE EXPOSURE IMAGING·MULTIPLE EXPOSURE IMAGING)
37
Sensing IMAGE SIGNAL PROCESSING UNIT
38
Viewing IMAGE SIGNAL PROCESSING UNIT
Sensing LOW-RESOLUTION IMAGE (SINGLE EXPOSURE IMAGING·MULTIPLE EXPOSURE IMAGING)
Viewing HIGH-RESOLUTION IMAGE (SINGLE EXPOSURE IMAGING·MULTIPLE EXPOSURE IMAGING)
39
REGISTER CONTROL UNIT
DETECTION FLAG
DETECTION RESULT INFORMATION
40
EXTERNAL IO CONTROL UNIT
DETECTION FLAG
41
GPO (GENERAL-PURPOSE OUTPUT PORT)
42
Power Management UNIT
43
IMAGE OUTPUT INTERFACE (MIPI)
CIS
AP
I2C
12
101
CPU
102
ISP IMAGE INPUT
CIS (Active)
11
21
Pre Proc.
22
DETECTION PROCESSING (DNN, OTHERS)
25
Post Proc.
DETECTION TRIGGER, DETECTION RESULT (CERTAINTY FACTOR INFORMATION, SUBJECT POSITION, AND THE LIKE)
FACE DETECTION IMAGE
AP (Standby)
12
102
ISP
104
DRAM
105
Storage
103
DETECTION·DETERMINATION PROCESSING (DNN, OTHERS)

FIG. 4

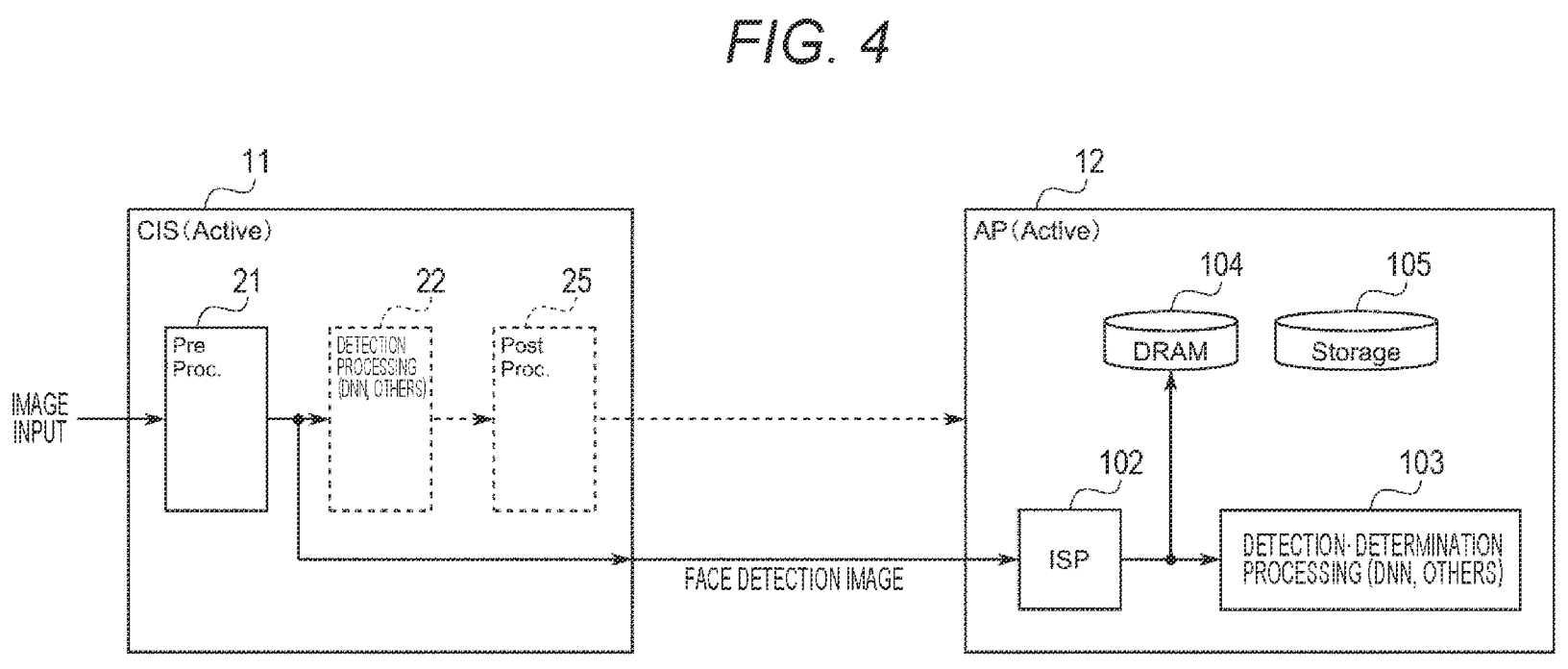

IMAGE INPUT
11
CIS (Active)
21
Pre Proc.
22
DETECTION PROCESSING (DNN, OTHERS)
25
Post Proc.
FACE DETECTION IMAGE
12
AP (Active)
102
ISP
104
DRAM
105
Storage
103
DETECTION·DETERMINATION PROCESSING (DNN, OTHERS)

11
CIS (Active)
21
Pre Proc.
22
DETECTION PROCESSING (DNN, OTHERS)
25
Post Proc.
IMAGE INPUT
DETECTION TRIGGER, DETECTION RESULT (CERTAINTY FACTOR INFORMATION, SUBJECT POSITION, AND THE LIKE)
12
AP (Active)
104
DRAM
105
Storage
102
ISP
103
DETECTION-DETERMINATION PROCESSING (DNN, OTHERS)
121
CIS (Active)
141
Pre Proc.
142
ISP
143
Post Proc.
IMAGE INPUT
RECOGNITION PROCESSING IMAGE

FIG. 6

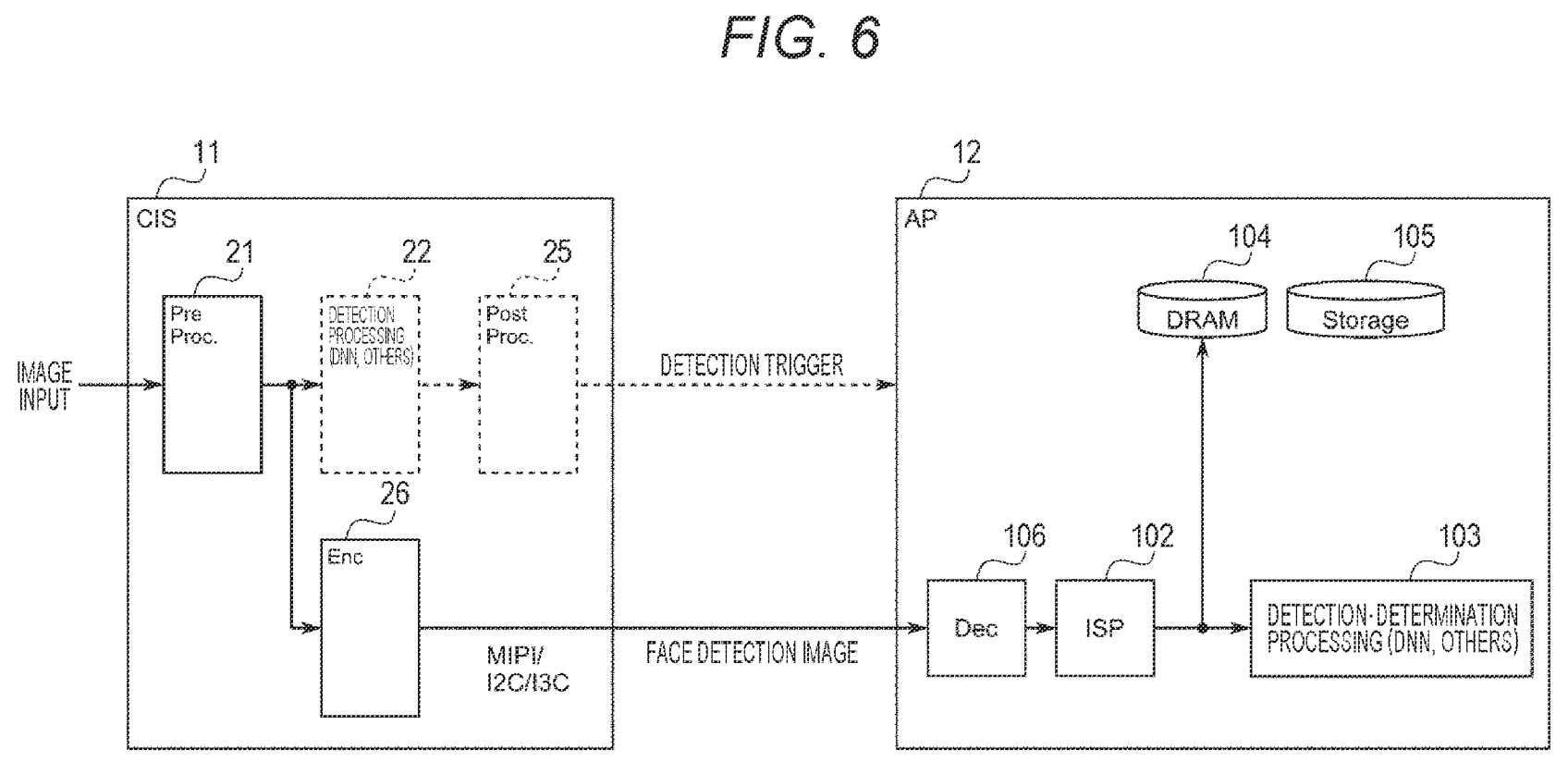

IMAGE INPUT
CIS
11
Pre Proc.
21
DETECTION PROCESSING (DNN, OTHERS)
22
Post Proc.
25
Enc
26
MIPI/ I2C/I3C
DETECTION TRIGGER
FACE DETECTION IMAGE
AP
12
Dec
106
ISP
102
DETECTION·DETERMINATION PROCESSING (DNN, OTHERS)
103
DRAM
104
Storage
105

FIG. 11

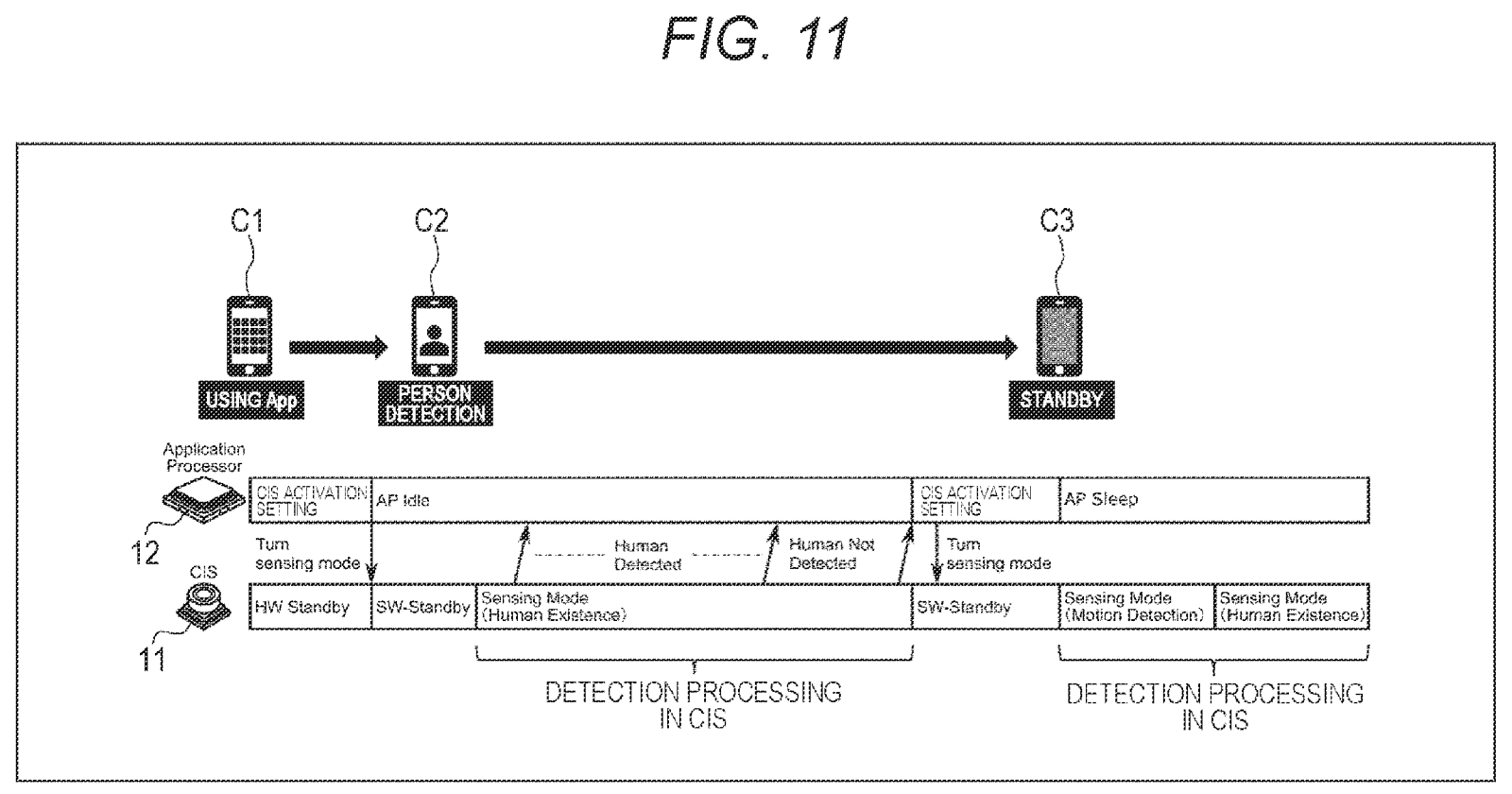

C1
USING App
C2
PERSON DETECTION
C3
STANDBY
Application Processor
12
CIS
11
CIS ACTIVATION SETTING
AP Idle
CIS ACTIVATION SETTING
AP Sleep
Turn sensing mode
Human Detected
Human Not Detected
Turn sensing mode
HW Standby
SW-Standby
Sensing Mode (Human Existence)
SW-Standby
Sensing Mode (Motion Detection)
Sensing Mode (Human Existence)
DETECTION PROCESSING IN CIS
DETECTION PROCESSING IN CIS

FIG. 16

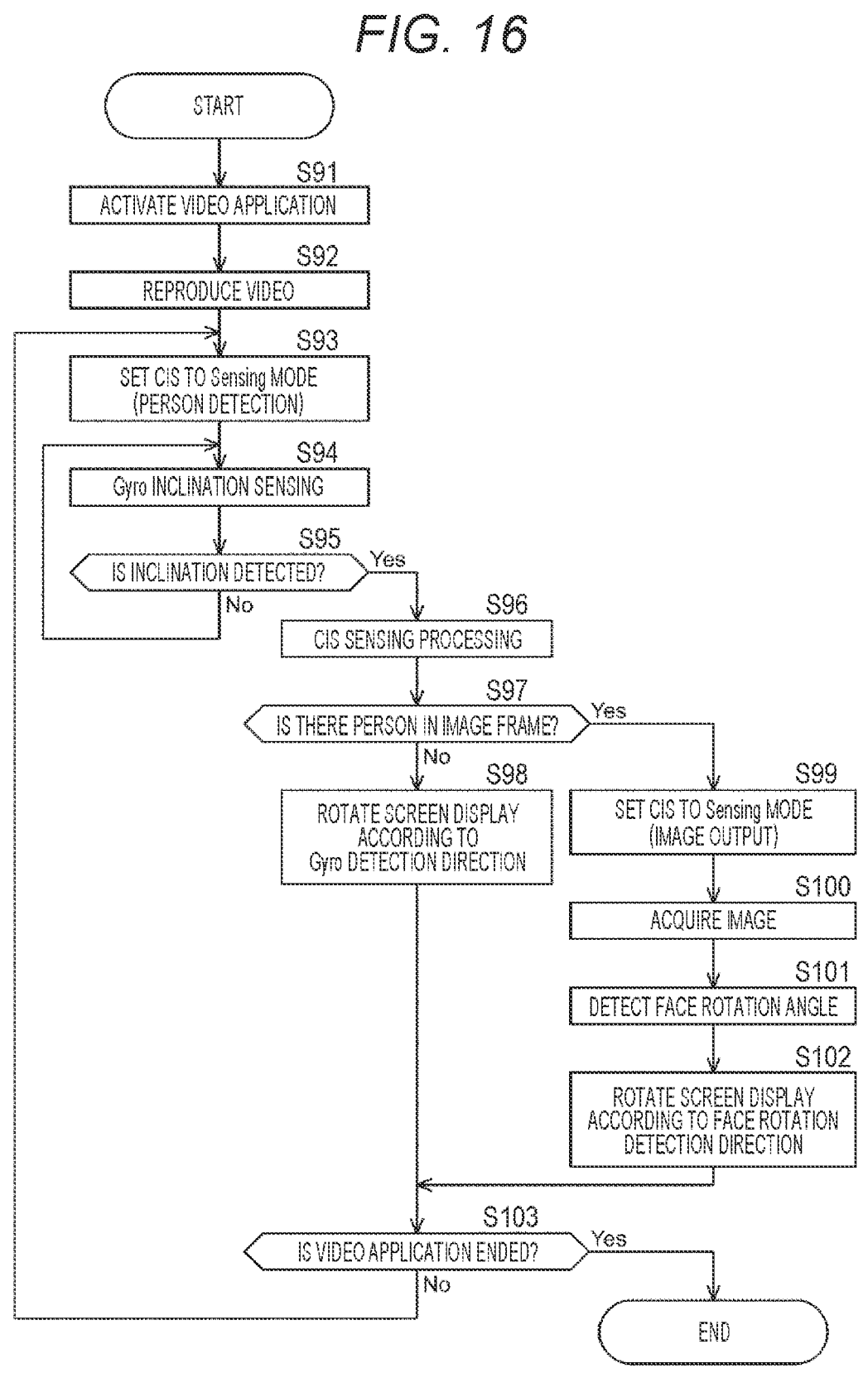

START
S91 ACTIVATE VIDEO APPLICATION
S92 REPRODUCE VIDEO
S93 SET CIS TO Sensing MODE (PERSON DETECTION)
S94 Gyro INCLINATION SENSING
S95 IS INCLINATION DETECTED?
Yes
No
S96 CIS SENSING PROCESSING
S97 IS THERE PERSON IN IMAGE FRAME?
Yes
No
S98 ROTATE SCREEN DISPLAY ACCORDING TO Gyro DETECTION DIRECTION
S99 SET CIS TO Sensing MODE (IMAGE OUTPUT)
S100 ACQUIRE IMAGE
S101 DETECT FACE ROTATION ANGLE
S102 ROTATE SCREEN DISPLAY ACCORDING TO FACE ROTATION DETECTION DIRECTION
S103 IS VIDEO APPLICATION ENDED?
Yes
No
END

FIG. 18

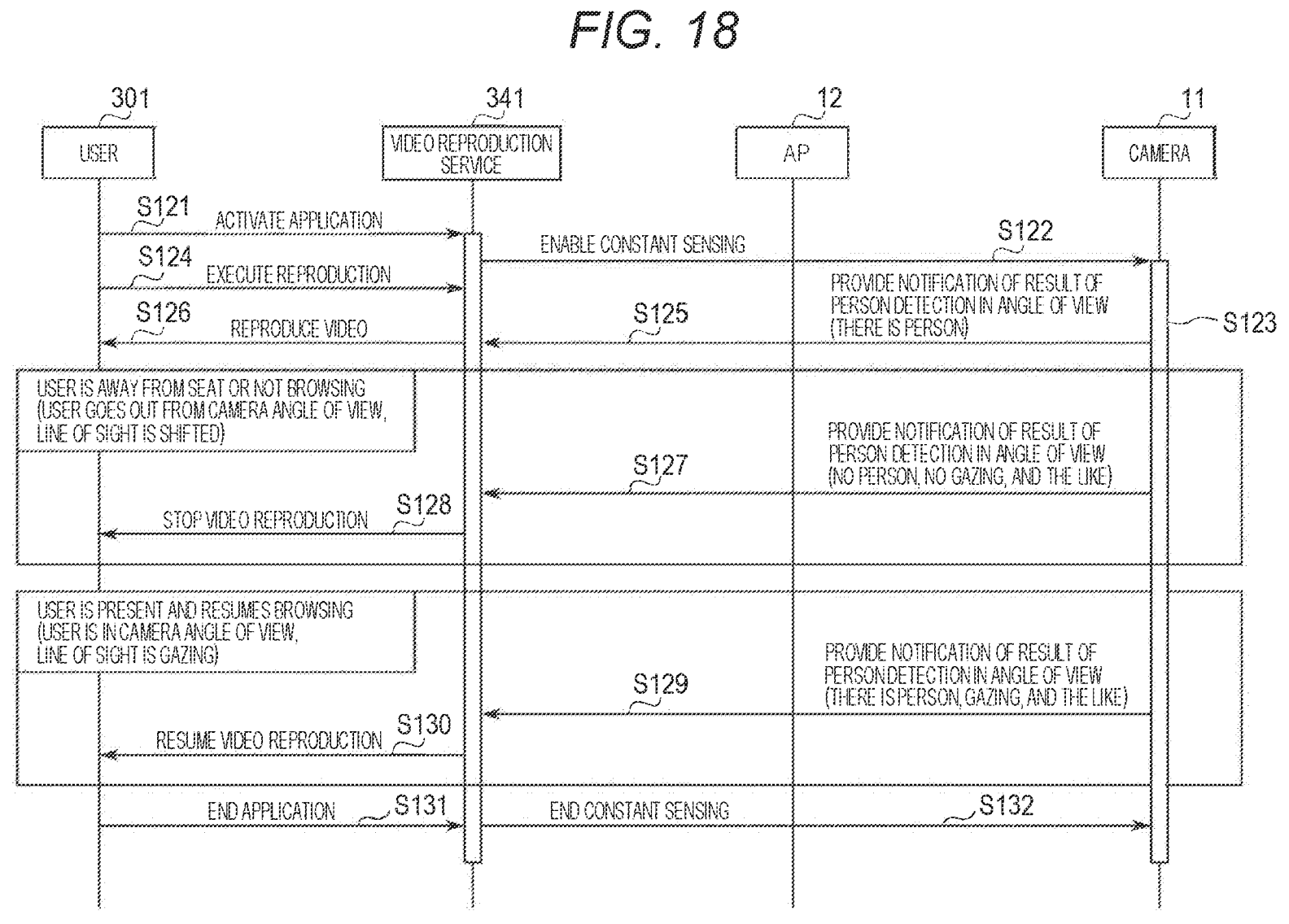

301 USER
341 VIDEO REPRODUCTION SERVICE
12 AP
11 CAMERA

S121 ACTIVATE APPLICATION
S122 ENABLE CONSTANT SENSING
S123
S124 EXECUTE REPRODUCTION
S125 PROVIDE NOTIFICATION OF RESULT OF PERSON DETECTION IN ANGLE OF VIEW (THERE IS PERSON)
S126 REPRODUCE VIDEO
USER IS AWAY FROM SEAT OR NOT BROWSING (USER GOES OUT FROM CAMERA ANGLE OF VIEW, LINE OF SIGHT IS SHIFTED)
S127 PROVIDE NOTIFICATION OF RESULT OF PERSON DETECTION IN ANGLE OF VIEW (NO PERSON, NO GAZING, AND THE LIKE)
S128 STOP VIDEO REPRODUCTION
USER IS PRESENT AND RESUMES BROWSING (USER IS IN CAMERA ANGLE OF VIEW, LINE OF SIGHT IS GAZING)
S129 PROVIDE NOTIFICATION OF RESULT OF PERSON DETECTION IN ANGLE OF VIEW (THERE IS PERSON, GAZING, AND THE LIKE)
S130 RESUME VIDEO REPRODUCTION
S131 END APPLICATION
S132 END CONSTANT SENSING

FIG. 19

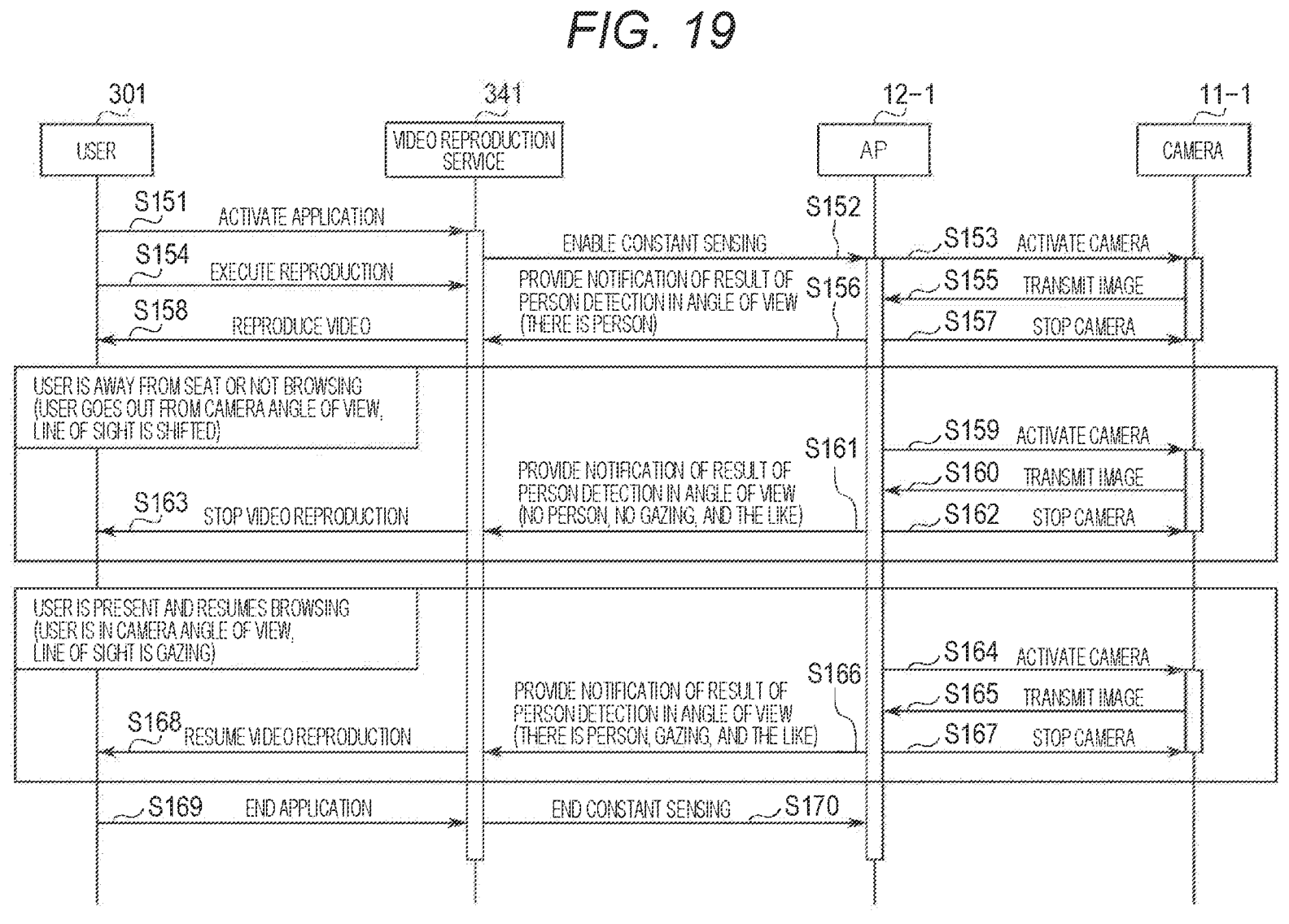

301 USER

341 VIDEO REPRODUCTION SERVICE 12-1 AP 11-1 CAMERA

S151 ACTIVATE APPLICATION

S152 ENABLE CONSTANT SENSING

S153 ACTIVATE CAMERA

S154 EXECUTE REPRODUCTION

S155 TRANSMIT IMAGE

S156 PROVIDE NOTIFICATION OF RESULT OF PERSON DETECTION IN ANGLE OF VIEW (THERE IS PERSON)

S157 STOP CAMERA

S158 REPRODUCE VIDEO

USER IS AWAY FROM SEAT OR NOT BROWSING (USER GOES OUT FROM CAMERA ANGLE OF VIEW, LINE OF SIGHT IS SHIFTED)

S159 ACTIVATE CAMERA

S160 TRANSMIT IMAGE

S161 PROVIDE NOTIFICATION OF RESULT OF PERSON DETECTION IN ANGLE OF VIEW (NO PERSON, NO GAZING, AND THE LIKE)

S162 STOP CAMERA

S163 STOP VIDEO REPRODUCTION

USER IS PRESENT AND RESUMES BROWSING (USER IS IN CAMERA ANGLE OF VIEW, LINE OF SIGHT IS GAZING)

S164 ACTIVATE CAMERA

S165 TRANSMIT IMAGE

S166 PROVIDE NOTIFICATION OF RESULT OF PERSON DETECTION IN ANGLE OF VIEW (THERE IS PERSON, GAZING, AND THE LIKE)

S167 STOP CAMERA

S168 RESUME VIDEO REPRODUCTION

S169 END APPLICATION

S170 END CONSTANT SENSING

FIG. 23

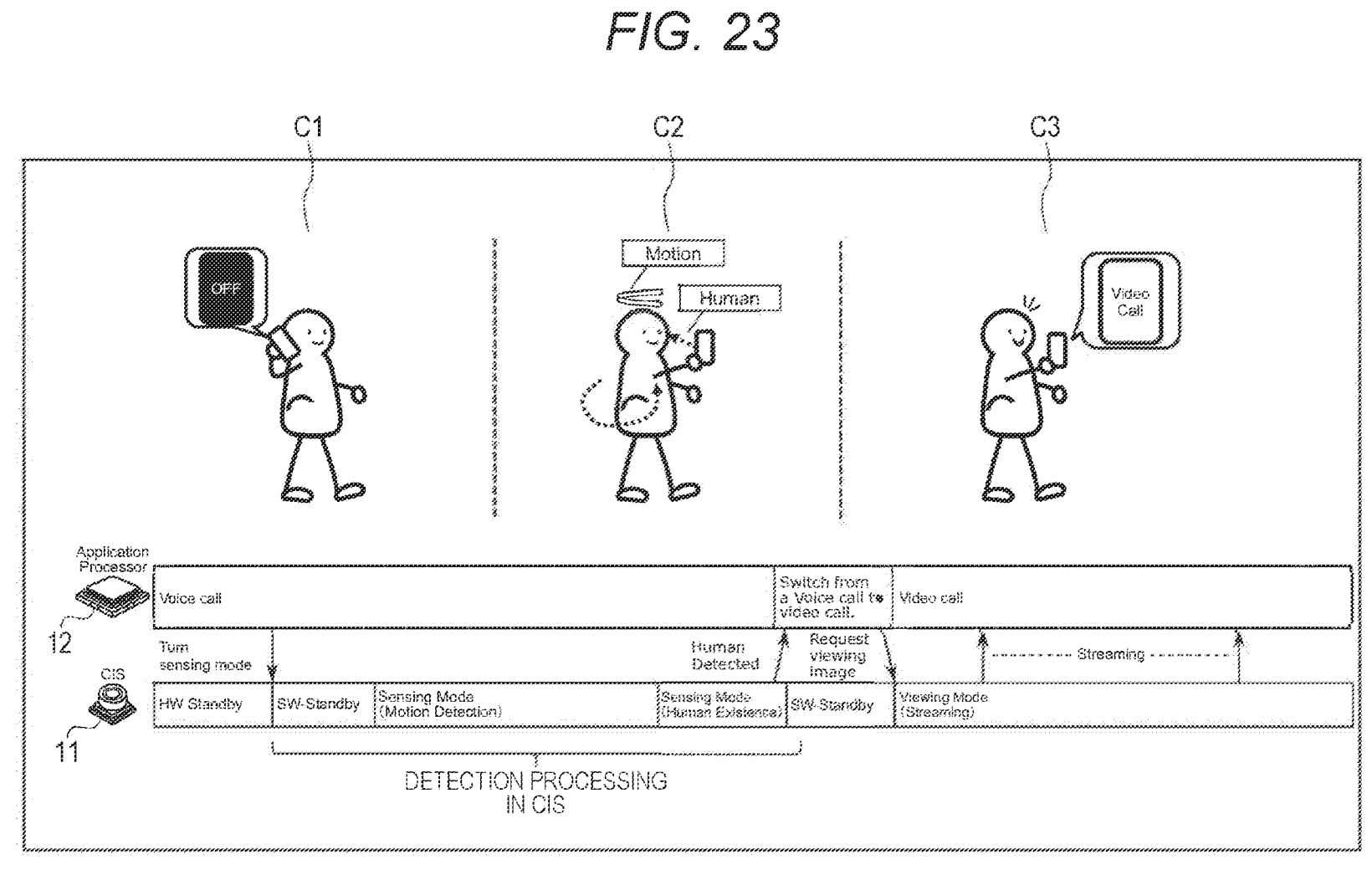

C1
OFF
C2
Motion
Human
C3
Video Call

Application Processor
12
CIS
11

Voice call
Switch from a Voice call to video call.
Video call

Turn sensing mode
Human Detected
Request viewing image
Streaming

HW Standby
SW-Standby
Sensing Mode (Motion Detection)
Sensing Mode (Human Existence)
SW-Standby
Viewing Mode (Streaming)

DETECTION PROCESSING IN CIS

Figure 26:
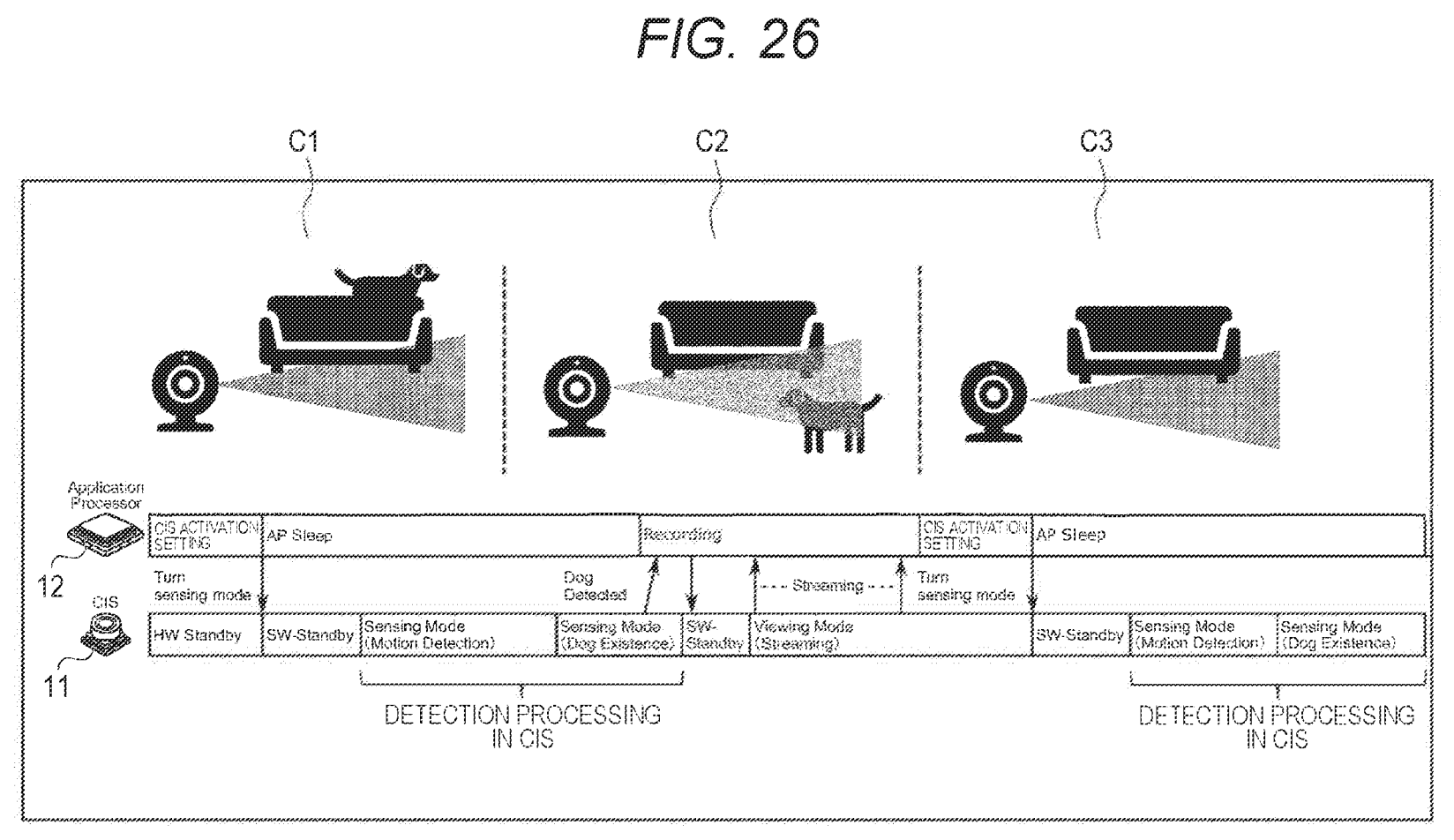

Application Processor

12

CIS

11

CIS ACTIVATION SETTING

AP Sleep

Recording

CIS ACTIVATION SETTING

AP Sleep

Turn sensing mode

Dog Detected

Streaming

Turn sensing mode

HW Standby

SW-Standby

Sensing Mode (Motion Detection)

Sensing Mode (Dog Existence)

SW-Standby

Viewing Mode (Streaming)

SW-Standby

Sensing Mode (Motion Detection)

Sensing Mode (Dog Existence)

DETECTION PROCESSING IN CIS

DETECTION PROCESSING IN CIS

FIG. 28

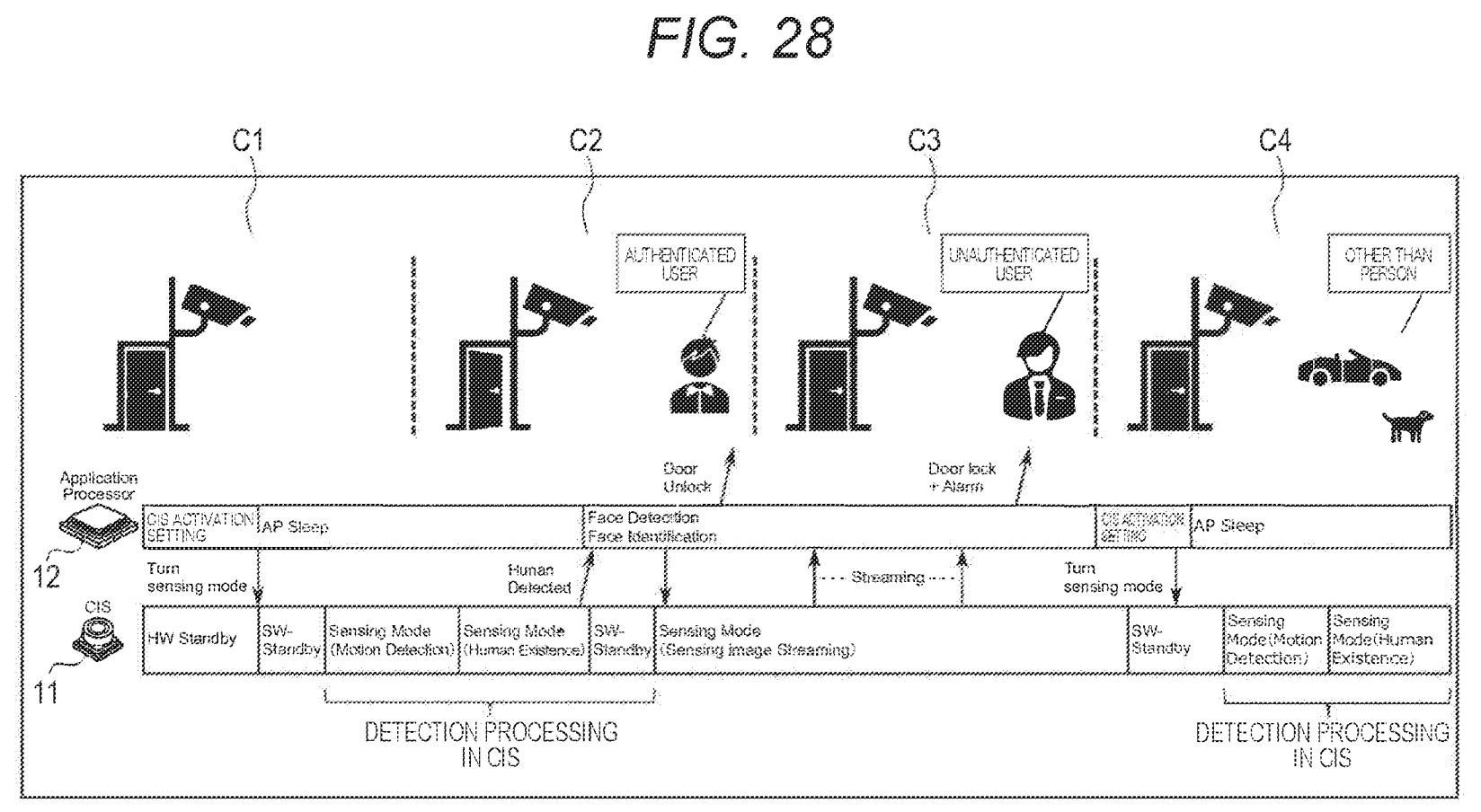

C1
C2
C3
C4
AUTHENTICATED USER
UNAUTHENTICATED USER
OTHER THAN PERSON
Application Processor
12
CIS
11
CIS ACTIVATION SETTING
AP Sleep
Face Detection
Face Identification
Door Unlock
Door lock + Alarm
CIS ACTIVATION SETTING
AP Sleep
Turn sensing mode
Human Detected
Streaming
Turn sensing mode
HW Standby
SW-Standby
Sensing Mode (Motion Detection)
Sensing Mode (Human Existence)
SW-Standby
Sensing Mode (Sensing Image Streaming)
SW-Standby
Sensing Mode (Motion Detection)
Sensing Mode (Human Existence)
DETECTION PROCESSING IN CIS
DETECTION PROCESSING IN CIS

FIG. 30

INFORMATION PROCESSING APPARATUS, IMAGE SENSOR, AND CONTROL METHOD USING ON-SENSOR IMAGE RECOGNITION

CROSS REFERENCE TO RELATED APPLICATIONS

This application is a U.S. National Phase of International Patent Application No. PCT/JP2022/009864 filed on Mar. 8, 2022, which claims priority benefit of Japanese Patent Application No. JP 2021-141251 filed in the Japan Patent Office on Aug. 31, 2021. Each of the above-referenced applications is hereby incorporated herein by reference in its entirety.

TECHNICAL FIELD

The present technology relates to an information processing apparatus, an information processing method, and a program, and more particularly, to an information processing apparatus, an information processing method, and a program which are capable of reducing power consumption without impairing convenience.

BACKGROUND ART

Patent Document 1 discloses a technique for switching a mobile terminal from a normal mode to a power saving mode with low power consumption on the basis of a result of face recognition using an image captured by a camera.

CITATION LIST

Patent Document

Patent Document 1: Japanese Patent Application Laid-Open No. 2014-27386

SUMMARY OF THE INVENTION

Problems to be Solved by the Invention

In a case where an operation state of an apparatus is switched using an imaging unit included in the apparatus, power consumption in the imaging unit and an in-terminal calculation device becomes a problem. The power consumption in the imaging unit and the convenience in using the apparatus are in a trade-off relationship, and it is difficult to reduce the power consumption.

The present technology has been made in view of such a situation, and enables reduction in power consumption without impairing convenience.

Solutions to Problems

An information processing apparatus or a program according to an aspect of the present technology is an information processing apparatus or a program of causing a computer to function as such an information processing apparatus, the information processing apparatus including an image recognition unit that an image sensor has, and detects that an image of a predetermined detection target is included in a captured image captured by the image sensor; and a processing unit that acquires an output image output from the image sensor, executes predetermined processing on the output image, and causes the image sensor to output the output image in a case where the image recognition unit detects that the image of the detection target is included.

An information processing method according to another aspect of the present technology is an information processing method including detecting that an image of a predetermined detection target is included in a captured image captured by the image sensor, via an image recognition unit of an information processing apparatus having an image sensor, the image recognition unit of the image sensor, and a processing unit; and acquiring an output image output from the image sensor, executing predetermined processing on the output image, and causing the image sensor to output the output image in a case where the image recognition unit detects that the image of the detection target is included.

In the information processing apparatus, the information processing method, and the program of the present technology, it is detected an image of a predetermined detection target is included in a captured image captured by an image sensor, an output image output from the image sensor is acquired, predetermined processing is executed on the output image, and the output image is output from the image sensor in a case where it is detected that the image of the detection target is included.

BRIEF DESCRIPTION OF DRAWINGS

FIG. 1 is a block diagram exemplifying a schematic configuration of a terminal device to which the present technology is applied.

FIG. 2 is a block diagram exemplifying a configuration of a CIS.

FIG. 4 is a diagram describing a second use form of image recognition of a CIS and image recognition of an AP.

FIG. 6 is a diagram describing a fourth use form of image recognition of a CIS and image recognition of an AP.

FIG. 11 is a flow diagram illustrating state transition as a terminal device in a terminal locking function and state transition of a CIS and an AP.

FIG. 16 is a flowchart illustrating a processing procedure performed by a CIS and an AP in Smart rotate.

FIG. 18 is a sequence diagram exemplifying a processing procedure of video reproduction control.

FIG. 19 is a sequence diagram exemplified for comparison with FIG. 18.

FIG. 23 is a diagram describing an example of a specific situation of a voice/video call automatic transition function and an outline of state transition of a CIS and an AP at that time.

FIG. 26 is a diagram describing an example of a specific situation of a pet camera function and an outline of state transition of a CIS and an AP at that time.

FIG. 28 is a diagram describing an example of a specific situation of a security door phone function and an outline of state transition of a CIS and an AP at that time.

FIG. 30 is a diagram describing an example of a specific situation of an application activation function using a 2D code and an outline of state transition of a CIS and an AP at that time.

MODE FOR CARRYING OUT THE INVENTION

Figure 3:
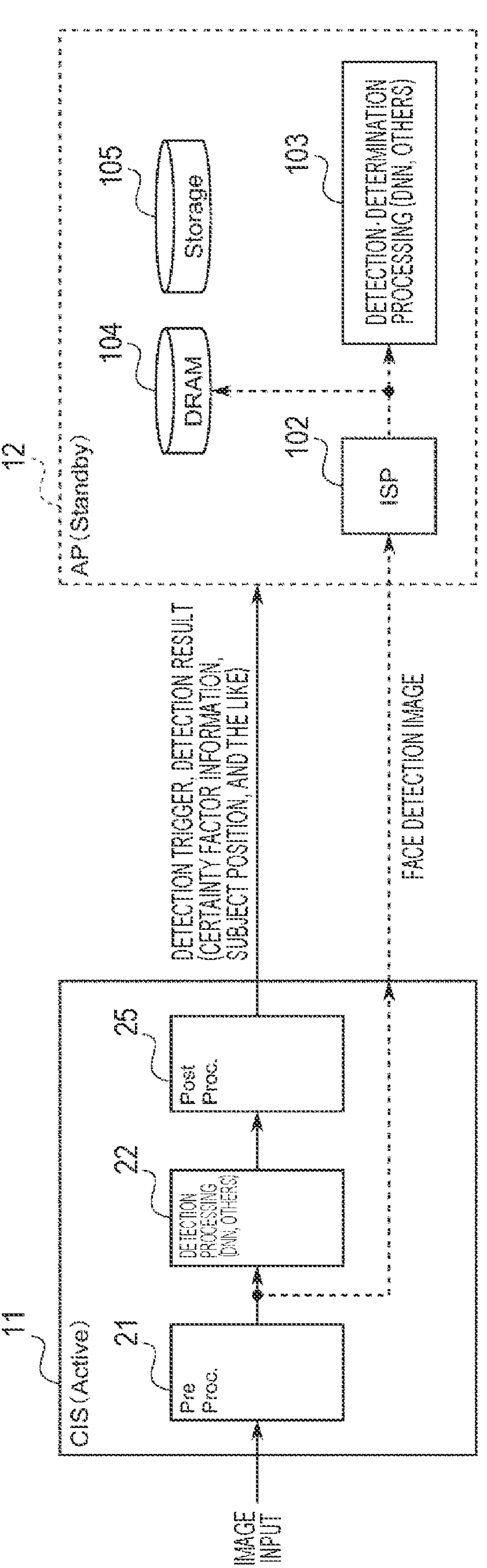
FIG. 3 is a diagram describing a first use form of image recognition of a CIS and image recognition of an AP.

Hereinafter, embodiments of the present technology will be described with reference to the drawings.

Embodiments of Information Processing Apparatus

FIG. 1 is a block diagram exemplifying a schematic configuration of a terminal device to which the present technology is applied. In FIG. 1, a terminal device 1 is, for example, a mobile terminal such as a smartphone, a mobile phone, a notebook computer, or a tablet. However, the terminal device 1 is not limited to a mobile terminal, and may be any type of information processing apparatus. The terminal device 1 includes a CMOS image sensor (CIS) 11, an application processor (AP) 12, a storage 13, and the like.

The CIS 11 is included in a camera (imaging unit) included in the terminal device 1. The CIS 11 is an imaging element including one chip having a light receiving unit that performs photoelectric conversion and a signal processing unit that performs signal processing. Note that a case where the terminal device 1 is mainly a smartphone is assumed. The terminal device 1 includes a display unit (display), and the camera is installed in the terminal device 1 such that a user (in particular, a head) who browses the display in a normal state enters an angle of view (imaging range) of the camera (CIS 11).

The AP 12 is a calculation processing unit included in the terminal device 1. The AP 12 executes not only processing regarding the imaging unit including the CIS 11 but also processing regarding each unit such as an input unit, the display unit, a power supply unit, a storage unit, and a communication unit included in the terminal device 1, processing of an application, and the like according to a program. For example, the AP 12 performs processing regarding switching of the operation state of the terminal device 1 and the like due to a notification signal such as a trigger from the CIS 11. The operation state of the terminal device 1 represents a predetermined state such as an activated state to be a normal operation state of the terminal device 1, a power saving state in which power consumption is less than that in the activated state, and a locked state in which an unlocking operation or the like is required to return the terminal device 1 to an original operation state or a predetermined operation state.

The storage 13 is a storage unit included in the terminal device 1, and stores various kinds of data.

The CIS 11 has a pre-processing unit 21, a detection processing unit 22, a read only memory (ROM) 23, and a random access memory (RAM) 24. The pre-processing unit 21 includes a light receiving unit in the CIS 11, and an image formed by an optical system (not illustrated) is input to the light receiving unit (light receiving element). The pre-processing unit 21 performs predetermined signal processing on the image that is input to the light receiving unit and is subjected to the photoelectric conversion, and supplies the processed image as image data to the detection processing unit 22. Note that the image data for one screen (for one frame) obtained by photoelectric conversion by the light receiving unit and having fixed vertical and horizontal pixel sizes is also simply referred to as an image or a captured image, and the entire contour of the captured image or a range of a subject appearing in the captured image is also referred to as an image frame (or angle of view). Acquisition of an image by photoelectric conversion by the light receiving unit is also referred to as imaging.

The detection processing unit 22 includes a processing unit that performs calculation processing (referred to as DNN processing) based on an inference model having a deep neural network (DNN) structure. The detection processing unit 22 performs DNN processing on the image data from the pre-processing unit 21. In the DNN processing, a range of a region of a target detected as a person (person image) within a range of an image (image input to the pre-processing unit 21) captured by the light receiving unit, that is, within an image frame, a certainty factor (a degree of certainty that the target is a person) that the target is a person, and the like are obtained as detection results. Note that a detection target to be detected by the DNN processing is not limited to a person. The detection result of the DNN processing also varies depending on the structure of the inference model used for the DNN processing. The detection processing unit 22 supplies an activation trigger (detection trigger) and a detection result to the AP 12 on the basis of the detection result of the DNN processing.

The ROM 23 stores data that can only be read, such as data of an operation program of the CIS 11. Data of the inference model to be used for the DNN processing in the detection processing unit 22 is also stored in the ROM 23 and read by the detection processing unit 22. The RAM 24 temporarily stores data used or generated in the CIS 11 in a writable and readable manner. Data of the inference model to be used for the DNN processing in the detection processing unit 22 can be written from the AP 12 to the RAM 24 in addition to being written in the ROM 23 at the time of manufacturing.

Here, in the present specification, detecting (an image of) one or a plurality of types of detection targets determined in advance from within the captured image (within the image frame) and detecting a position thereof (a position or a range of a region of the detection target) is referred to as object detection. In a case where the detection target is a person, it is referred to as person detection, and in a case where the detection target is a face, it is referred to as face detection. In a case where the detection target is a face of a specific person, it is referred to as face recognition. Collating the face detected by the face detection with the face (face image) of the specific person prepared in advance and determining whether the detected face is the face of the specific person is referred to as face authentication. In the present specification, image recognition is a generic term for all of processing and techniques for acquiring information associated with information regarding an object included in an image, such as object detection, person detection, face detection, face recognition, and face authentication. The face recognition and the face authentication are referred to as face authentication without being particularly distinguished.

The detection processing unit 22 is a processing unit that performs processing including image recognition using the DNN processing, and the type of image recognition is not limited to a specific type such as person detection, face detection, or face authentication. However, in the present embodiment, in order to simplify the description, it is assumed that the image recognition (DNN processing) in the detection processing unit 22 is person detection in principle.

Data of the inference model to be used for the DNN processing of the detection processing unit 22 is program data for performing calculation according to the structure of the inference model (structure of the DNN) and data of various parameters (learning coefficients) determined in advance by learning. Data of the inference model is written in the ROM 23 at the time of manufacturing, and the detection processing unit 22 reads the data of the inference model from the ROM 23 and performs the DNN processing. In a case where an inference model different from that at the time of manufacturing is used after product shipment, the detection processing unit 22 reads data of the inference model from the RAM 24 and performs the DNN processing. For example, in a case where the detection target (class) of the inference model is changed to a detection target different from that at the time of manufacturing, in a case where there is a change in the learning coefficient in order to improve detection accuracy, in a case where there is a change in the program data in order to change the structure itself of the inference model, or the like, the data of the inference model after the change is supplied from the AP 12 to the RAM 24 and is stored.

FIG. 1 illustrates a process at the time of generating an inference model to be used by the detection processing unit 22 in the DNN processing. According to this, in a learning process P1, learning is performed on data D1 of the inference model including the program data for determining the structure itself of the inference model and the initial learning coefficient, using learning data D2 corresponding to the detection target (person, animal, and the like) in the inference model. Therefore, learning of the inference model is performed, and data D3 of the inference model in which the learning coefficient is updated is generated. After the learning process P1, in an evaluation process P2, the data D3 of the inference model for which the learning has been performed is evaluated using evaluation data D4 different from the learning data D2. As a result of the evaluation, if there is no problem in the data D3 of the inference model, the inference model is applied to the terminal device 1, as data D5 of the trained (evaluated) inference model. At the time of manufacturing, the data D5 of the trained inference model is written to the ROM 23 of the CIS 11. After manufacturing, the data D5 of the trained inference model is stored in the RAM 24 of the CIS 11 via the storage 13 and the AP 12 of the terminal device 1.

<Configuration of CIS 11>

FIG. 2 is a block diagram exemplifying the configuration of the CIS 11. In FIG. 2, the CIS 11 has a light receiving unit 31, a pixel reading unit 32, a drive timing control unit 33, an image pre-processing unit 34, a central processing unit (CPU) 35, a sensing processing unit 36, a sensing image signal processing unit 37, a viewing image signal processing unit 38, a register control unit 39, an external IO control unit 40, a GPO 41, a power management unit 42, and an image output interface 43.

The light receiving unit 31 includes a large number of light receiving elements (pixels) regularly arranged at a high density, performs photoelectric conversion on the image formed by an optical system (lens) (not illustrated) in units of pixels, and accumulates the image as a charge.

The pixel reading unit 32 reads a voltage value (pixel value) corresponding to a charge amount accumulated in each pixel of the light receiving unit 31, and supplies the voltage value to the image pre-processing unit 34.

The drive timing control unit 33 supplies a control signal corresponding to a drive mode (image reading size, imaging mode, and the like) to the pixel reading unit 32, and gives an instruction for a timing at which the pixel reading unit 32 reads the pixel value from the light receiving unit 31.

The image pre-processing unit 34 performs pre-processing such as rearrangement or pixel addition on the pixel values from the pixel reading unit 32 according to signal processing (for sensing, for viewing, and the like) in the subsequent stage. The image pre-processing unit 34 supplies the preprocessed image data to the CPU 35, the sensing processing unit 36, the sensing image signal processing unit 37, or the viewing image signal processing unit 38.

The central processing unit (CPU) 35 is operated by firmware, and performs various kinds of processing such as processing as an exposure control unit 61, a system unit 62, and a sensing post-processing unit 63, for example.

The exposure control unit 61 calculates a luminance value of an image (captured image) obtained by the light receiving unit 31 by calculation of an ambient light sensor (ALS) on the basis of the image data from the image pre-processing unit 34. On the basis of the result, the exposure control unit 61 controls an exposure time, the gain, and the like by AE control such that an image with appropriate brightness is captured by the light receiving unit 31.

The system unit 62 controls the entire operation of the CIS 11. For example, the system unit 62 performs mode transition control such as automatic transition of a sensing function and transition control between a sensing mode and a viewing mode.

The sensing post-processing unit 63 performs stabilization processing and threshold determination processing on the detection result (motion detection result, person detection certainty factor, and the like) supplied from the sensing processing unit 36 to suppress erroneous detection and the like, and supplies the stabilized detection result to the register control unit 39 and the external IO control unit 40. For example, in the stabilization processing, the variation of the detection result from the sensing processing unit 36 is suppressed by filter processing. In the threshold determination processing, threshold determination is performed on the stabilized detection result from the sensing processing unit 36. According to this threshold determination, the determination result in a case where it is determined that a motion is detected in the image frame and the determination result in a case where it is determined that a person is detected in the image frame have high reliability. The sensing post-processing unit 63 supplies a detection flag to the register control unit 39 and the external IO control unit 40 in a case where it is determined that the motion is detected in the image frame and in a case where it is determined that a person is detected in the image frame by the threshold determination. Note that the sensing post-processing unit 63 supplies all the detection results such as the position in the image frame where a person is detected in addition to the motion detection result and the person detection certainty factor from the sensing processing unit 36, to the register control unit 39.

The sensing processing unit 36 has a DNN processing unit 81 and a motion detection unit 82. The DNN processing unit 81 performs DNN processing based on the inference model described above using DNN processing core, on the image data from the image pre-processing unit 34, and performs person detection. The DNN processing unit 81 supplies the degree of certainty that the target detected as a person is a person (person detection certainty factor), the range (position) of the region where a person is present in the image frame, and the like to the sensing post-processing unit 63, as the detection result. Note that, as described above, in the present embodiment, the detection target by the DNN processing is a person, but the detection target is not limited to a person. The detection result of the DNN processing also differs depending on the inference model that performs the DNN processing.

The motion detection unit 82 performs motion detection on the image data from the image pre-processing unit 34, and detects that there has been a motion in any of the image frames, a range (motion range) where there has been a motion, a motion amount indicating the magnitude of the detected motion, and the like. The motion detection unit 82 supplies the detected result (motion detection result) to the sensing post-processing unit 63. Note that the contents of the motion detection result of the motion detection by the motion detection unit 82 are not limited to the contents described here. As a method for the motion detection by the motion detection unit 82, for example, any method can be used such as a method of detecting an image change at the same position in the image frame as a motion by comparing the captured image of the previous frame with the captured image of the subsequent frame, a method of detecting an object that is actually moving in consideration of a change in the imaging method, and the like.

The sensing image signal processing unit 37 performs signal processing for generating an image suitable for sensing system processing (image recognition such as face detection and face authentication) in the AP 12, on the image data from the image pre-processing unit 34. The sensing image signal processing unit 37 supplies the processed image data to the image output interface 43.

The viewing image signal processing unit 38 performs signal processing for generating an image for viewing, on the image data from the image pre-processing unit 34. The viewing image signal processing unit 38 supplies the processed image data to the image output interface 43.

The register control unit 39 holds parameters necessary for controlling the CIS 11, and calculation results of each unit such as the detection result in the sensing processing unit 36. The data held in the register control unit 39 can be appropriately referred to from the AP 12 via an inter-integrated circuit (I2C) which is a communication interface standard.

The external IO control unit 40 transmits the detection result (the presence or absence of a motion or a person) from the sensing post-processing unit 63 to the AP 12 via the GPO 41 which is a general-purpose output port. For example, when a detection flag in a case where a motion is detected in the image frame or a detection flag in a case where a person is detected in the image frame is supplied from the sensing post-processing unit 63, the external IO control unit 40 transmits a detection trigger for providing notification of the fact, to the AP 12. The detection trigger may be transmitted to the AP 12 in correspondence with only the detection flag in a case where a person is detected in the image frame.

The power management unit 42 controls the entire power of the CIS 11 and controls ON/OFF of each unit according to the drive mode of the CIS 11.

The image output interface 43 controls the MIPI, which is an interface standard, and transmits the image data from the sensing image signal processing unit 37 or the viewing image signal processing unit 38 to the AP 12.

Note that, when an image is captured by the light receiving unit 31, the CIS 11 can perform single exposure imaging (standard dynamic range (SDR)) and multiple exposure imaging (high dynamic range) capable of acquiring an image with a higher gradation than the single exposure imaging. When the images respectively supplied from the image pre-processing unit 34 to the sensing processing unit 36, the sensing image signal processing unit 37, and the viewing image signal processing unit 38 are compared with one another, the image supplied to the viewing image signal processing unit 38 is an image for generating an image for viewing, and thus is an image with high resolution and is also referred to as a viewing high-resolution image. The image supplied to the sensing image signal processing unit 37 is an image for generating an image suitable for sensing system processing (face detection, face authentication, and the like) in the AP 12, and thus is an image with lower resolution than the viewing high-resolution image and is also referred to as a sensing low-resolution image. The viewing high-resolution image and the sensing low-resolution image can be selected from an image acquired by single exposure imaging and an image acquired by multiple exposure imaging. The image (referred to as a detection processing image) supplied to the sensing processing unit 36 is an image used for person detection in which high-speed detection and a low processing load and low power consumption in the chip of the CIS 11 are desired. Therefore, the detection processing image has lower resolution than at least the viewing high-resolution image. As compared with the sensing low-resolution image, the detection processing image may have substantially the same resolution or lower resolution. The detection processing image is an image acquired by multiple exposure imaging so as to obtain a highly accurate result in the DNN processing. However, the detection processing image may be an image acquired by single exposure imaging.

Although the detailed configuration of the AP 12 is omitted in FIG. 2, the AP 12 has a CPU 101 and an image signal processor (ISP) 102. The CPU 101 performs various kinds of processing according to a program. In a case where a motion is detected in the image frame or in a case where a person is detected in the image frame by the sensing processing unit 36 in the CIS 11, the CPU 101 receives a detection trigger from the external IO control unit 40 via the GPO 40. The CPU 101 can perform processing triggered by the detection trigger. The CPU 101 can acquire data held in the register control unit 39 through the inter-integrated circuit (I2C) which is a communication interface standard. Since the detection result detected by the sensing processing unit 36 is held in the register control unit 39, the CPU 101 can acquire the detection result detected by the sensing processing unit 36 via the register control unit 39, and can use the acquired detection result in any processing.

The ISP 102 mainly performs signal processing such as image adjustment. The ISP 102 acquires the sensing low-resolution image processed by the sensing image signal processing unit 37 of the CIS 11 and the viewing high-resolution image processed by the viewing image signal processing unit 38 via the image output interface 43. The ISP 102 performs signal processing such as image adjustment on the acquired sensing low-resolution image and viewing high-resolution image, and then supplies the processed images to the CPU 101. Note that transmission of the sensing low-resolution image from the sensing image signal processing unit 37 to the ISP 102 and transmission of the viewing high-resolution image from the viewing image signal processing unit 38 to the ISP 102 are performed exclusively. Therefore, the ISP 102 does not acquire these images at the same time. The CPU 101 can use the sensing low-resolution image or the viewing high-resolution image from the ISP 102 for any purpose. For example, there is a case in which the CPU 101 performs image recognition such as face detection by the DNN processing and release the terminal locking and the like. In that case, the CPU 101 acquires the sensing low-resolution image from the ISP 102, and performs the DNN processing on the sensing low-resolution image. Note that the DNN processing in the AP 12 can cope with any of the object detection, person detection, face detection, face recognition, and the like, but for simplification of description, the face detection is mainly performed.

<Use Form of DNN Processing in AP 12 of CIS 11>

In a case where image recognition using the DNN processing and the like can be performed in the AP 12, the terminal device 1 can use image recognition (DNN processing) of the CIS 11 and image recognition of the AP 12. In this case, the terminal device 1 can use the image recognition of the CIS 11 and the image recognition of the AP 12 in the following first to fourth use forms. Note that the motion detection performed by the motion detection unit 82 of the sensing processing unit 36 is included in the technology of image recognition of the CIS 11.

<First Use Form>

FIG. 3 is a diagram describing a first use form of the image recognition of the CIS 11 and the image recognition of the AP 12. In FIG. 3, the CIS 11 has the pre-processing unit 21, the detection processing unit 22, and a post-processing unit 25. Since the pre-processing unit 21 and the detection processing unit 22 correspond to the pre-processing unit 21 and the detection processing unit 22 denoted by the same reference numerals in the CIS 11 of FIG. 1, the description thereof will be omitted. The post-processing unit 25 in FIG. 3 is omitted in FIG. 1, and is a processing unit including, for example, the sensing post-processing unit 63, the register control unit 39, the external IO control unit 40, and the GPO 41 in FIG. 2. That is, the post-processing unit 25 includes a processing unit that performs processing, storage, and transmission to the AP 12, on the detection result of the image recognition in the detection processing unit 22.

In FIG. 3, the AP 12 has the ISP 102, a detection determination processing unit 103, a dynamic random access memory (DRAM) 104, and a storage 105. Since the ISP 102 corresponds to the ISP 102 denoted by the same reference numeral in the AP 12 of FIG. 2, the description thereof will be omitted. The detection determination processing unit 103 performs processing including image recognition among the processing executed by the CPU 101, in the AP 12 of FIG. 2, for example. The DRAM 104 temporarily stores the image processed by the ISP 102, in the AP 12. The storage 105 stores various kinds of data in the AR 12.

In the first use form, the CIS 11 is in an active state (operation state), and the AP 12 is in a standby state (standby state) with low power consumption. In this state, the detection processing unit 22 of the CIS 11 performs image recognition on the image supplied from the pre-processing unit 21. The detection determination processing unit 103 of the AP 12 does not perform image recognition. In a case where the detection determination processing unit 103 performs image recognition, the pre-processing unit 21 of the CIS 11 transmits a face detection image (sensing low-resolution image) to the ISP 102 of the AP 12, and the detection determination processing unit 103 of the AP 12 acquires the face detection image via the ISP 102. Since the detection determination processing unit 103 of the AP 12 does not perform image recognition, the face detection image is not transmitted from the CIS 11 to the AP 12.

In a case where it is determined that a person is detected in the image frame on the basis of the detection result of the image recognition supplied from the detection processing unit 22, the post-processing unit 25 of the CIS 11 transmits the detection trigger to the AP 12. When receiving the detection trigger, the AP 12 switches from the standby state to the active state, and starts predetermined processing. The AP 12 can acquire the detection result (information such as a person detection certainty factor and a subject position) of image recognition of the detection processing unit 22 from the post-processing unit 25 of the CIS 11 as necessary.

According to the first use form, it is effective in a situation where the AP 12 may be in the standby state in a case where no person is detected in the image frame. The AP 12 does not consume unnecessary power, and power consumption required for transmitting the image from the CIS 11 to the AP 12 is also unnecessary. Since the power consumption required for image recognition of the CIS 11 is also small, the power consumption is smaller than that when the AP 12 performs image recognition.

<Second Use Form>

FIG. 4 is a diagram describing a second use form of the image recognition of the CIS 11 and the image recognition of the AP 12. In the drawing, portions corresponding to the CIS 11 and the AP 12 in FIG. 3 are denoted by the same reference numerals, and the description thereof will be omitted.

In the second use form, both the CIS 11 and the AP 12 are in the active state (operation state). In this state, the detection processing unit 22 of the CIS 11 does not perform image recognition. The detection determination processing unit 103 of the AP 12 performs image recognition. In this case, the pre-processing unit 21 of the CIS 11 transmits the face detection image (sensing low-resolution image) to the ISP 102 of the AP 12, and the detection determination processing unit 103 of the AP 12 acquires the face detection image via the ISP 102.

According to the second use form, it is effective in a case where highly accurate image recognition is required. The face detection image transmitted from the CIS 11 to the AP 12 can be a sensing low-resolution image with lower resolution than that of the viewer high-resolution image used for viewing. Therefore, the amount of data required for the transmission of the face detection image from the CIS 11 to the AP 12 is small, and power consumption can be reduced. The second use form can be applied in combination with the first use form. In this case, power consumption can be reduced, which is more effective. Specifically, when no person is detected in the image frame, the CIS 11 performs person detection by image recognition as in the first use form. When the CIS 11 detects a person by the image recognition, the detection trigger is transmitted to the AP 12. When the AP 12 receives the detection trigger, the AP 12 performs image recognition as in the second use form. In this case, while no person is detected in the image frame, it is not necessary to transmit the face detection image from at least the CIS 11 to the AP 12, and it is not necessary for the AP 12 to perform the image recognition. Therefore, the power consumption required for the transmission of the image and the power consumption required for the image recognition in the AP 12 are reduced.

<Third Use Form>

Figure 5:
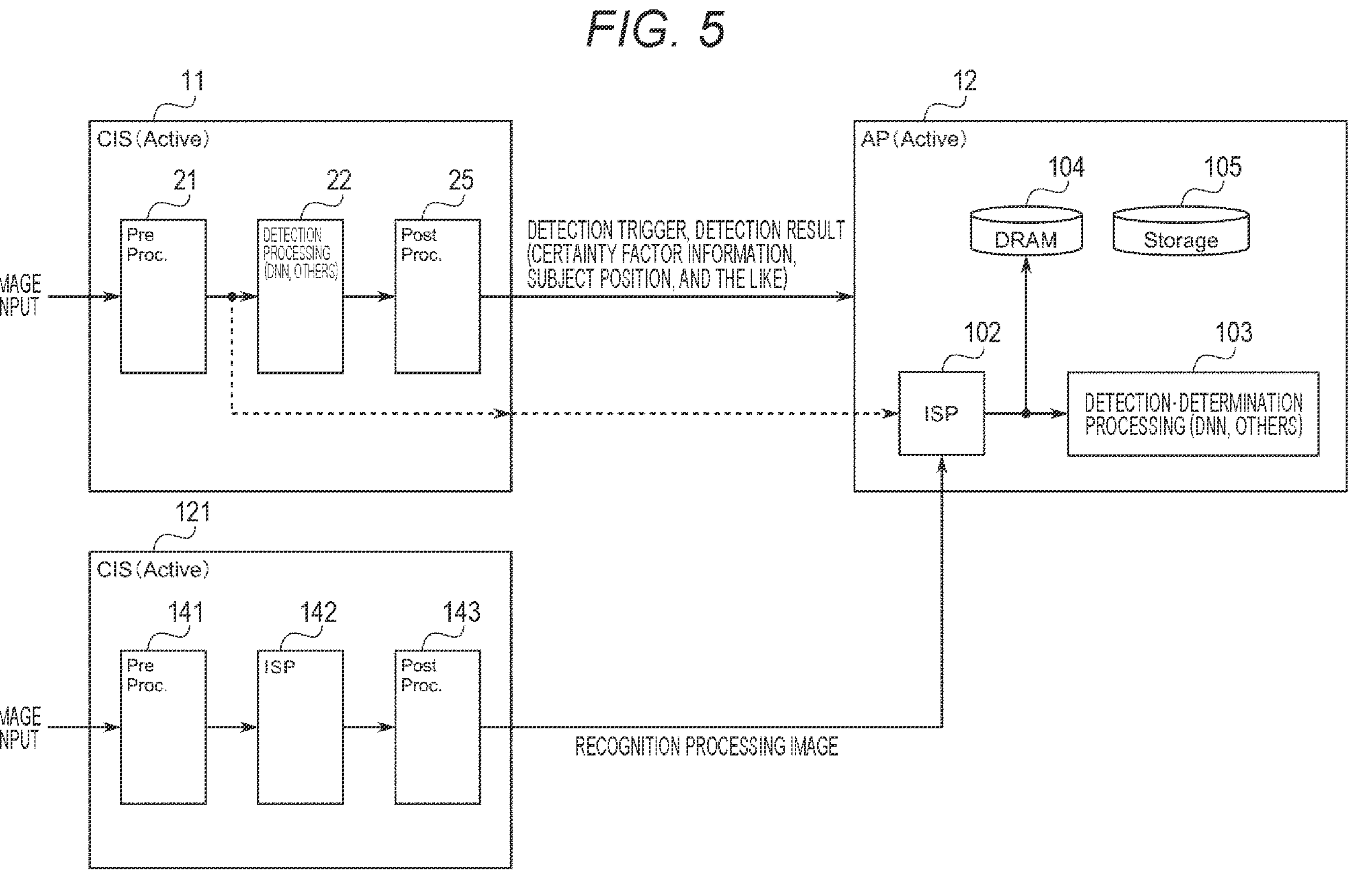
FIG. 5 is a diagram describing a third use form of image recognition of a CIS and image recognition of an AP.

FIG. 5 is a diagram describing a third use form of the image recognition of the CIS 11 and the image recognition of the AP 12. In the drawing, portions corresponding to the CIS 11 and the AP 12 in FIG. 3 are denoted by the same reference numerals, and the description thereof will be omitted.

The third use form represents a case where the terminal device 1 has two CISs, that is, the CIS 11 and another CIS 121. However, the CIS 121 does not have a function of performing image recognition. The CIS 121 has a pre-processing unit 141, an ISP 142, and a post-processing unit 143. Since the pre-processing unit 141 corresponds to the pre-processing unit 21 of the CIS 11, the description thereof will be omitted. The ISP 142 acquires, for example, a face detection image (sensing low-resolution image) from the pre-processing unit 141, and generates an image suitable for sensing system processing (face detection, face authentication, and the like) in the AP 12 by signal processing. The post-processing unit 143 supplies the face detection image to the ISP 102 of the AP 12. The AP 12 can perform image recognition on both the face detection image acquired from the CIS 11 and the face detection image acquired from the CIS 121.

In the third use form, all of the CIS 11, the CIS 121, and the AP 12 are in the active state. The detection processing unit 22 of the CIS 11 performs image recognition on the face detection image from the pre-processing unit 21, and the detection determination processing unit 103 of the AP 12 performs image recognition on the face detection image from the CIS 121.

According to the third use form, the image recognition can be distributed according to the detection target. For example, the CIS 11 can perform person detection by image recognition, and the AP 12 can perform face detection and the like by image recognition.

<Fourth Use Form>

FIG. 6 is a diagram describing a fourth use form of the image recognition of the CIS 11 and the image recognition of the AP 12. In the drawing, portions corresponding to the CIS 11 and the AP 12 in FIG. 3 are denoted by the same reference numerals, and the description thereof will be omitted.

In FIG. 6, the CIS 11 has the pre-processing unit 21, the detection processing unit 22, the post-processing unit 25, and an encoder 26. The encoder 26 encodes the face detection image from the pre-processing unit 21 to reduce the amount of data. The encoder 26 transmits the encoded face detection image to the AP 12. Note that the encoder 26 transmits the face detection image to the AP 21 using, for example, an MIPI, an I2C, or an improved inter integrated circuit (13C) which is a communication interface standard.

The AP 12 has the ISP 102, the detection determination processing unit 103, the DRAM 104, the storage 105, and a decoder 106. The decoder 106 receives and decodes the face detection image transmitted from the encoder 26 of the CIS 11. The decoder 106 supplies the decoded face detection image to the ISP 102. The detection determination processing unit 103 acquires the face detection image supplied from the decoder 106 to the IPS 102, from the ISP 102 and performs image recognition.

In the fourth use form, the CIS 11 and the AP 12 are in the active state. In a case where the detection determination processing unit 103 of the AP 12 performs image recognition, the pre-processing unit 21 of the CIS 11 supplies the face detection image to the encoder 26. The encoder 26 encodes the face detection image from the pre-processing unit 21, and transmits the encoded face detection image to the decoder 106 of the AP 12. The decoder 106 decodes the face detection image from the encoder 26, and supplies the decoded face detection image to the ISP 102. The detection determination processing unit 103 acquires the face detection image via the ISP 102, and performs image recognition.

In the fourth use form, both the CIS 11 and the AP 12 are in the active state (operation state). In this state, the detection processing unit 22 of the CIS 11 does not perform image recognition. The detection determination processing unit 103 of the AP 12 performs DNN processing. In this case, the pre-processing unit 21 of the CIS 11 transmits the sensing low-resolution image (face detection image) to the ISP 102 of the AP 12, and the detection determination processing unit 103 of the AP 12 acquires the sensing low-resolution image via the ISP 102.

According to the fourth use form, even in a case where the AP 12 performs image recognition, the image data transmitted from the CIS 11 to the AP 12 is encoded, so that the amount of data to be transmitted is reduced. Therefore, the power consumption required for the transmission of the image from the CIS 11 to the AP 12 is reduced.

<Specific Example of Function of Terminal Device 1>

Hereinafter, Application Examples 1 to 9 when image recognition of the CIS 11 is applied in the execution of various functions that can be adopted by the terminal device 1 will be described. As described above, the image recognition (also referred to as sensing) of the CIS 11 includes both the DNN processing by the DNN processing unit 81 and the motion detection by the motion detection unit 82 in the sensing processing unit 36 of the CIS 11 in FIG. 2.

Application Example 1

Application Example 1 is an application example when the image recognition of the CIS 11 is applied to the functions of the terminal unlocking (Face unlock) and the terminal locking (Face lock) of the terminal device 1. The terminal unlocking of the terminal device 1 is a function (also referred to as Face unlock) of switching the locked state of the terminal device 1 to the unlocked state in a case where the user's face is authenticated in the locked state of the terminal device 1. The locked state of the terminal device 1 includes all states in which unlocking processing for returning the terminal device 1 to an original operation state or a predetermined operation state is required, in addition to a general state in which an operation of the terminal device 1 is prohibited other than a specific operation. Typical operation states included in the locked state of the terminal device 1 include a standby state (a state in which the processing is stopped and the processing is activated by a trigger associated with the unlocking processing) which is also one of power saving states, a power saving state in which the display is turned off, and the like. Note that, for example, a smartphone is assumed as the terminal device 1, and the camera including the CIS 11 images a range facing the display of the smartphone.

Figure 7:
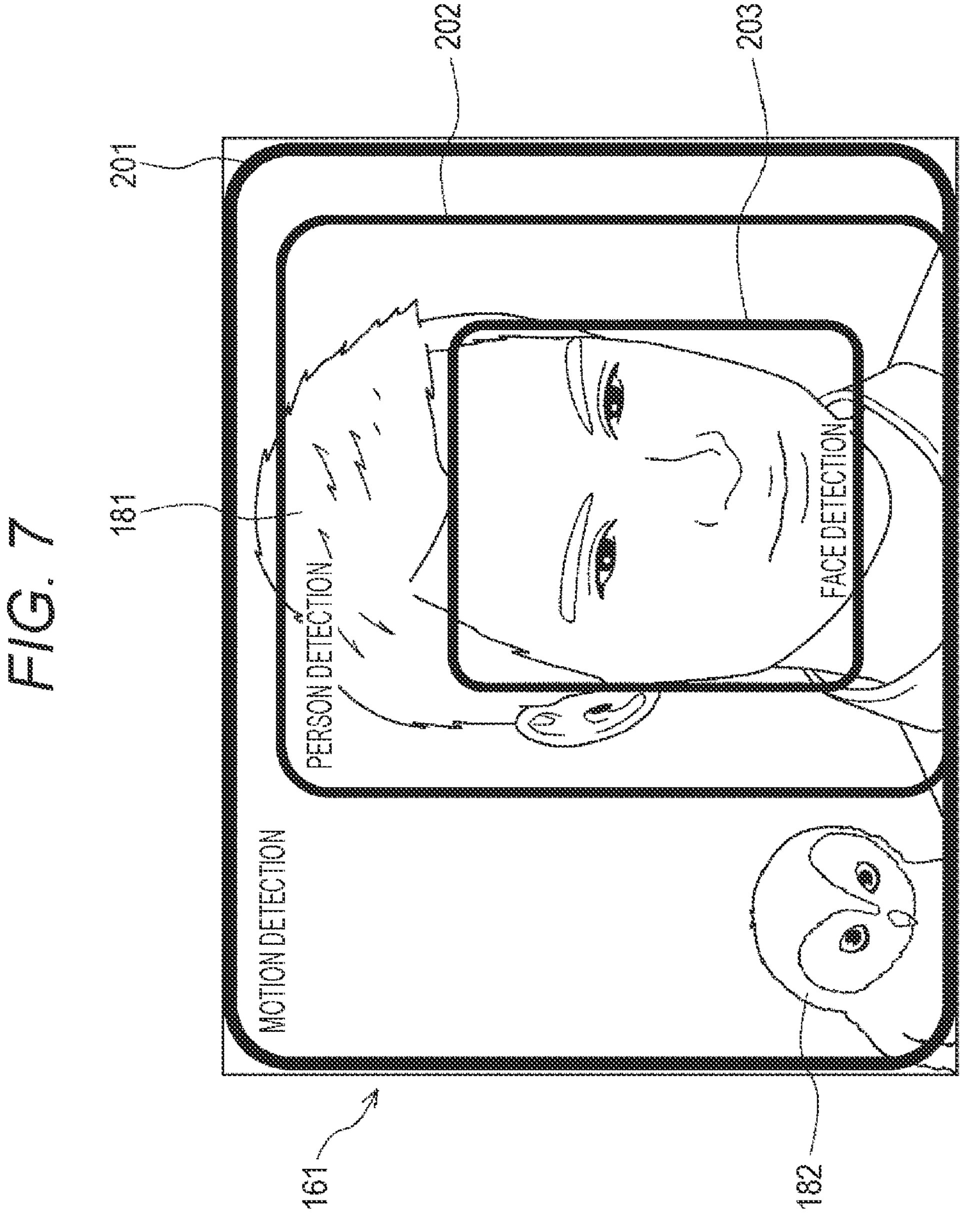
FIG. 7 is a diagram describing image recognition performed by a CIS and an AP in terminal unlocking.

FIG. 7 is a diagram describing image recognition performed by the CIS 11 and the AP 12 for the image recognition performed for the terminal unlocking of the terminal device 1. In FIG. 7, a captured image 161 is an example of a captured image captured by the CIS 11, and represents a state of a subject in an image frame. A user 181 represents, for example, the owner of the terminal device 1. A moving body 182 represents an arbitrary moving object.

In the terminal unlocking of the terminal device 1, motion detection indicated by a motion detection frame 201, person detection indicated by a person detection frame 202, and face detection indicated by a face detection frame 203 are performed as the image recognition, in the unlocked state of the terminal device 1.

The motion detection frame 201 represents a range in which a motion is detected in the image frame by the motion detection in a case where it is assumed that the user 181 and the moving body 182 are moved simultaneously. In the motion detection, it is not necessary to detect the range of the motion detection frame 201 in the image frame, and it may be a case where it is detected that a motion (that there is a motion) is detected in any range in the image frame. This motion detection is performed by the image recognition of the CIS 11.

The person detection frame 202 represents a range in which a person is detected in the image frame by the person detection. In the person detection, for example, in a case where a plurality of persons is present in the image frame, the range of each of the plurality of persons (the range of the person detection frame 202) is detected. In a case where the user 181 is present in the image frame, the range of the user 181 is detected. However, whether or not the detected person is the user 181 is not specified. This person detection is performed by the image recognition of the CIS 11.

The face detection frame 203 represents a range in which a face is detected in the image frame by the face detection. In the face detection, for example, in a case where a plurality of faces is present in the image frame, the range of each of the plurality of faces (the range of the face detection frame 203) is detected. In a case where the user 181 is present in the image frame, the range of the face of the user 181 is detected. However, whether or not the detected face is the user 181 is not specified. This face detection is performed by the image recognition of the AP 12. The image recognition of the AP 12 is performed by, for example, DNN processing in the detection determination processing unit 103 of FIG. 3. In the terminal unlocking, in a case where the terminal device 1 enters the unlocked state only in a case where not an arbitrary face but the face of the user 181 is detected, the face detected by the face detection is collated with the information on the face of the user 181 prepared in advance (face authentication).

The motion detection, the person detection, and the face detection are performed in cooperation with each other. In a case where only the motion detection is performed first and a motion is detected in the image frame, transition is made from the motion detection to the person detection. In a case where a person is detected in the image frame by the person detection, transition is made from the person detection to the face detection. However, in a case where a person is not detected in the image frame by the person detection until a certain period of time elapses, transition is made from the person detection to the motion detection, and the processing is performed again from the motion detection. In a case where transition is made from the person detection to the face detection and a face is detected by the face detection, the face authentication is performed. In a case where a face is not detected by the face detection until a certain period of time elapses, transition is made from the face detection to the motion detection, and the processing is performed again from the motion detection. In a case where the face authentication succeeds in the face authentication, the terminal device 1 transitions from the locked state to the unlocked state, and the image recognition is ended. In a case where the face authentication fails, transition is made from the face detection to the motion detection, and the processing is performed again from the motion detection. However, the processing in a case where the face authentication fails is not limited thereto.

The cooperation of the motion detection, the person detection, and the face detection is not limited to the temporal cooperation. For example, in a case where the range of the motion detection frame 201 is detected by the motion detection, the person detection may be performed with a range limited to the range of the motion detection frame 201. In a case where the range of the person detection frame 202 is detected by the person detection, the face detection may be performed with a range limited to the range of the person detection frame 202. Note that setting the terminal device 1 to the locked state or the unlocked state is performed by the AP 12.

Example 1 of Specific Situation of Terminal Unlocking

Figure 8:
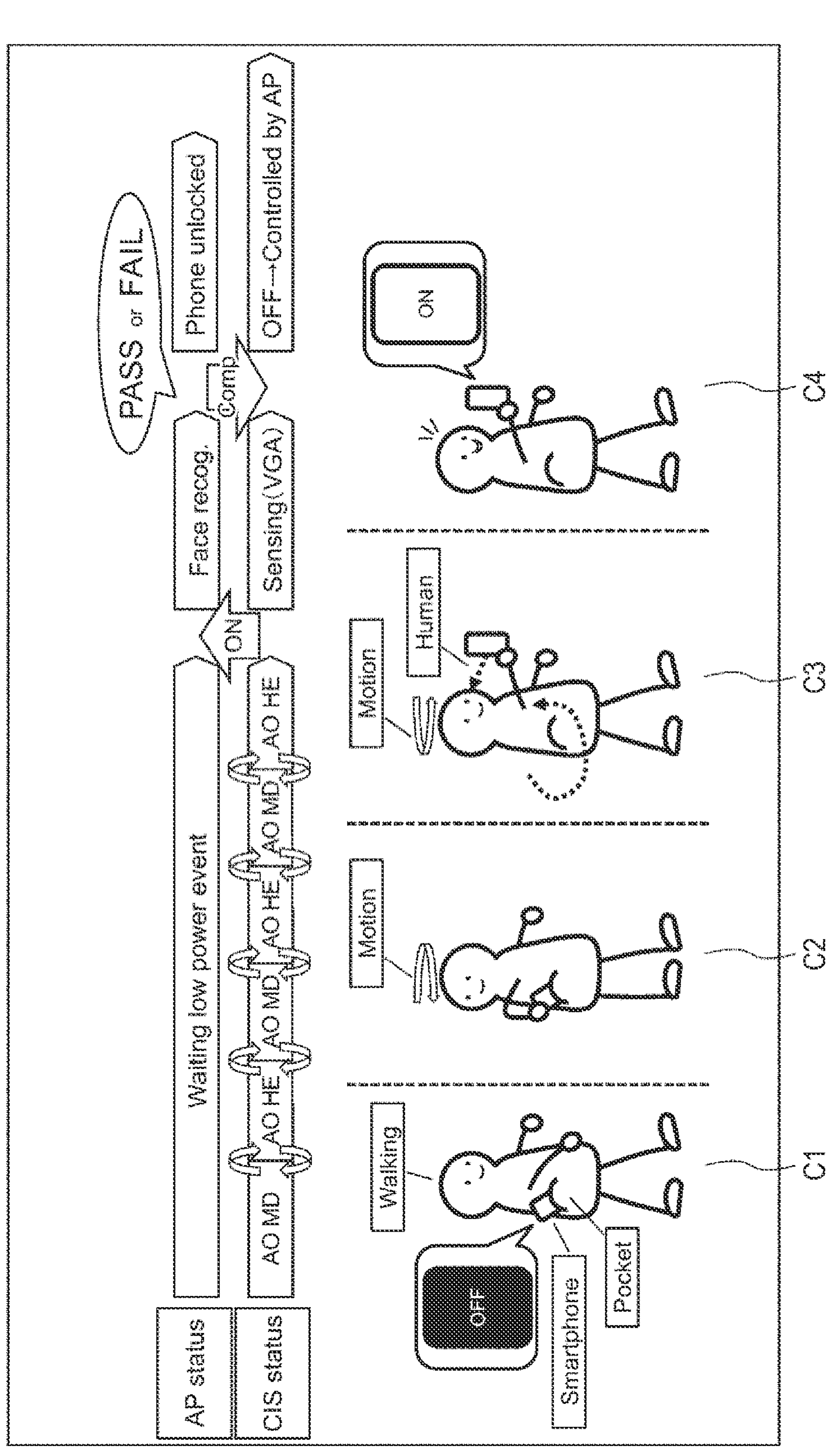
FIG. 8 is a diagram describing an example (Example 1) of a specific situation of a terminal unlocking function and an outline of state transition of a CIS and an AP at that time.

FIG. 8 is a diagram describing an example (Example 1) of a specific situation (scene development) until the terminal device 1 is switched from the locked state to the unlocked state by the terminal unlocking function of the terminal device 1 and an outline of state transition of the CIS 11 and the AP 12 at that time.

In FIG. 8, a scene C1 is a scene where the user is walking with the terminal device 1 (for example, a smartphone) in the standby state in a pocket. When the terminal device 1 is in the standby state, the display is turned off, and only a specific operation such as a power button is accepted.

A scene C2 is a scene where the user takes out the terminal device 1 in the standby state from the pocket in order to use the terminal device 1.

A scene C3 is a scene where the user points the terminal device 1 (camera) at his or her face in order to bring the terminal device 1 into the unlocked state using the terminal unlocking function. Note that there is a case where the camera of the terminal device 1 is installed in a direction of imaging the user's face when using the terminal device 1. The scene C3 in that case includes a scene where the camera is directed to the face of the user as a result of the user's intention to use the terminal device 1 without being conscious of bringing the terminal device 1 into the unlocked state.

A scene C4 is a scene where the face authentication of the user in the terminal unlocking function succeeds, and the terminal device 1 is switched from the standby state (locked state) to the activated state (unlocked state) in which normal use is possible.

In the scene C1 and the scene C2, the state of the AP 12 is "Waiting low power event". "Waiting low power event" represents that the AP 12 is in a sleep mode. In the sleep mode, the AP 12 does not perform processing, and waits for a detection trigger (person detection notification signal) from the CIS 11. In the sleep mode, the power consumption of the AP 12 is extremely small.

In the scene C1 and the scene C2, the state of the CIS 11 is "AO MD" or "AO HE". Both "AO MD" and "AO HE" represent that the CIS 11 is in a sensing mode. In the sensing mode, the CIS 11 repeatedly performs imaging at least by the light receiving unit. There is a plurality of types of sensing modes, and in the case of the sensing modes of "AO MD" and "AO HE", the CIS 11 captures a detection processing image with low resolution. "AO MD" (MO: Motion Detection) represents a motion detection mode in which the CIS 11 performs motion detection using the detection processing image. "AO HE" represents a person detection mode in which the person detection is performed by DNN processing using the detection processing image. In the scene C1 and the scene C2, since the image in the image frame captured by the camera is changed, the CIS 11 detects the motion in the image frame in the motion detection mode ("AO MD"), and automatically transitions to the person detection mode ("AO HE"). In the scene C1 and the scene C2, since no person is detected in the image frame (assumed as such), the CIS 11 automatically transitions to the motion detection mode ("AO MD") when a certain period of time elapses in the person detection mode ("AO HE"). In the scene C1 and the scene C2, the CIS 11 repeats such state transition.

In the scene C3, the state of the CIS 11 transitions from the person detection mode ("AO HE") to "Sensing (VGA)". At the time of this transition, the CIS 11 transmits "ON" to the AP 12. "ON" is a detection trigger (person detection notification signal) transmitted from the CIS 11 to the AP 12 in a case where the CIS 11 detects a person in the image frame in the person detection mode ("AO HE"). The detection trigger is transmitted to the AP 12 by the sensing post-processing unit 63 in FIG. 2. "Sensing (VGA)" is a type of sensing mode, and is a mode for transmitting an image with low resolution for image recognition to the AP 12. In the sensing mode ("Sensing (VGA)"), the CIS 11 continuously captures (acquires) the sensing low-resolution image with low resolution, and transmits the acquired sensing low-resolution image to the AP 12. The sensing low-resolution image is transmitted from the sensing image signal processing unit 37 in FIG. 2 to the AP 12.

Note that the sensing mode ("Sensing (VGA)") is a mode intended to output a sensing image with low resolution (sensing low-resolution image) used for image recognition and the like outside the CIS 11 to the outside, and is also referred to as a sensing mode for sensing image output or a sensing image output mode. In the sensing mode for sensing image output, the CIS 11 can perform the motion detection and the person detection simultaneously with the output of the sensing image, but in a case where it is not explicitly stated that the motion detection and the person detection are performed, the CIS 11 does not perform the motion detection and the person detection.

In the scene C3, since the user is included in the image frame, the CIS 11 detects a person in the image frame in the person detection mode ("AO HE"). Therefore, the CIS 11 transmits the detection trigger ("ON") for notifying the AP 12 of the fact to the AP 12, and transitions from the person detection mode ("AO HE") to the sensing mode ("Sensing (VGA)") for sensing image output.

In the scene C3, the state of the AP 12 transitions from the sleep mode ("Waiting low power event") to "Face recog." when receiving the detection trigger ("ON") from the CIS 11. "Face recog." represents a face authentication mode in which the AP 12 performs face authentication. In the face authentication mode ("Face recog."), the AP 12 performs face detection by image recognition (DNN processing and the like) prior to the authentication. When performing face detection, the AP 12 acquires a sensing low-resolution image from the CIS 11, and performs DNN processing and the like on the sensing low-resolution image.

In the scene C4, the state of the AP 12 transitions from the face authentication mode ("Face recog.") to "Phone unlocked". At the time of this transition, the AP 12 transmits "Comp" to the CIS 11. "Comp" is a notification signal for instructing the CIS 11 to stop the sensing mode ("Sensing (VGA)") for sensing image output. "Phone unlocked" represents a state in which the AP 12 performs processing of setting the terminal device 1 to the unlocked state. When transitioning to "Phone unlocked", the AP 12 ends the face authentication. In the scene C4, since the user's face is included in the image frame, the AP 12 detects the face in the image frame by face detection in the face authentication mode ("Face recog."). When detecting the face, the AP 12 collates the detected face with the information on the user's face (face image or feature of the face of the user) acquired in advance. Since the face in the image frame is the user's face, the AP 12 determines that the face authentication has succeeded as a result of the collation, and transitions from the face authentication mode ("Face recog.") to "Phone unlocked". At the time of this transition, the AP 12 transmits a communication signal ("Comp") to the CIS 11.

In the scene C4, the state of the CIS 11 transitions from the sensing mode ("Sensing (VGA)") to "OFF-Controlled by AP" when receiving the notification signal ("Comp") from the AP 12. "OFF→Controlled by AP" represents a standby state in which processing of the CIS 11 is stopped and the CIS 11 waits to receive the notification signal regarding the control and the like from the AP 12. In the scene C4, since the face authentication of the user succeeds and the terminal device 1 enters the unlocked state, the CIS 11 receives the notification signal ("Comp") from the AP 12. As a result, the CIS 11 stops the sensing mode ("Sensing (VGA)") for sensing image output, and stops the capturing of the sensing low-resolution image and the transmission of the sensing low-resolution image to the CIS 11. In a case where the sensing mode ("Sensing (VGA)") is stopped, the CIS 11 transitions to a standby mode ("OFF-Controlled by AP") and switches to a state of waiting for a notification signal from the AP 12.

Example 2 of Specific Situation of Terminal Unlocking

Figure 9:
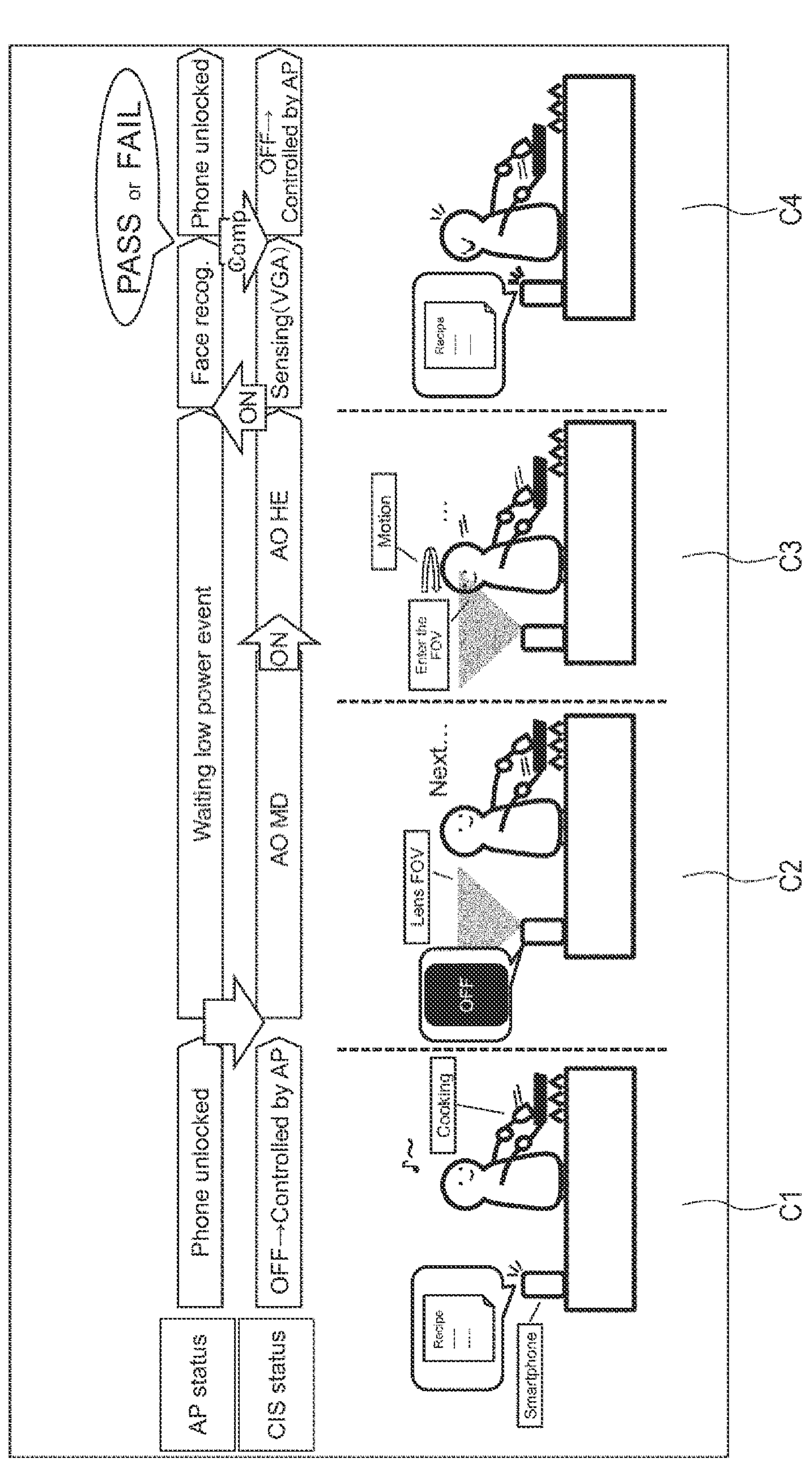
FIG. 9 is a diagram describing an example (Example 2) of a specific situation of terminal locking and terminal unlocking functions and an outline of state transition of a CIS and an AP at that time.

FIG. 9 is a diagram describing an example (Example 2) of a specific situation (scene development) until the terminal device 1 is switched from the unlocked state to the locked state and switched from the locked state to the unlocked state by the functions of terminal locking and terminal unlocking (Face unlock) of the terminal device 1, and an outline of state transitions of the CIS 11 and the AP 12 at that time. In FIG. 9, a scene C1 is a scene in which the user is cooking while referring to a recipe displayed on the display of the terminal device 1 in the unlocked state. Note that it is assumed that a state in which the user does not perform any operation on the terminal device 1 is continued.

A scene C2 is a scene in which a prescribed period of time elapses from the state in which the user does not perform any operation on the terminal device 1, and the terminal device 1 enters the locked state by the terminal locking function. The locked state of the terminal device 1 is, for example, a power saving state (state in which power consumption is lower than that in a normal activated state), and a state in which the display is turned off.

A scene C3 is a scene in which the user faces the direction of the display of the terminal device 1 to view the recipe. At this time, the face of the user can be confirmed in the image frame.

A scene C4 is a scene where the face authentication of the user in the terminal unlocking function succeeds, and the terminal device 1 returns from the locked state to the unlocked state in which the display before the locked state is turned on.

In the scene C1, the state of the AP 12 is "Phone unlocked". "Phone unlocked" represents that the AP 12 sets the terminal device 1 to the unlocked state. In the scene C1, the state of the CIS 11 is the standby mode ("OFF-Controlled by AP").

In the scene C2, the state of the AP 12 transitions from "Phone unlocked" to the sleep mode ("Waiting low power event"). At the time of this transition, the AP 12 transmits a notification signal requesting the CIS 11 to enable the sensing mode (a sensing mode based on motion detection and person detection). In the scene C2, although details will be described later, since a state in which the user's face is not detected in the image frame is continued, the terminal device 1 enters a locked state as the terminal locking function. At this time, the AP 12 transitions from the "Phone unlocked" state to the sleep mode ("Waiting low power event").

In the scene C2, the state of the CIS 11 transitions from the standby mode ("OFF→Controlled by AP") to the motion detection mode ("AO MD") as the sensing mode when a notification signal requesting the enabling of the sensing mode is received from the AP 12. In the motion detection mode ("AO MD"), the CIS 11 captures a detection processing image with low resolution, and performs motion detection using the detection processing image. In the scene C2, in a case where there is no motion in the image frame, the CIS 11 does not detect the motion in the image frame, and continues the motion detection mode ("AO MD").

In the scene C3, the state of the CIS 11 transitions from the motion detection mode ("AO MD") to the person detection mode ("AO HE"). In the scene C3, since the user moves his/her face in the direction of the terminal device 1, the CIS 11 detects the motion in the image frame. As a result, the CIS 11 automatically transitions from the motion detection mode ("AO MD") to the person detection mode ("AO HE") as the sensing mode. In the person detection mode ("AO HE"), the CIS 11 captures a detection processing image with low resolution, and performs person detection using the detection processing image. In the scene C3, the state of the AP 12 continues the sleep mode ("Waiting low power event").

In the scene C4, the state of the CIS 11 transitions from the person detection mode ("AO HE") to the sensing mode ("Sensing (VGA)"). At the time of this transition, the CIS 11 transmits a detection trigger ("ON") (person detection notification signal) to the AP 12. Thereafter, in a case where the notification signal ("Comp") is received from the AP 12, the state of the CIS 11 transitions from the sensing mode ("Sensing (VGA)") to the standby mode ("OFF→Controlled by AP").

In the scene C4, in a case where the detection trigger ("ON") from the CIS 11 is received, the state of the AP 12 is activated from the sleep mode ("Waiting low power event") (transition to an active mode), and transitions to the face authentication mode ("Face recog."). Thereafter, the state of the AP 12 transitions from the face authentication mode ("Face recog.") to "Phone unlocked" in a case where the face authentication succeeds (assuming that the face authentication succeeds). At the time of this transition, the AP 12 transmits the notification signal ("Comp") to the CIS 11.

In the scene C4, since the face is detected in the image frame, the CIS 11 detects a person in the image frame in the person detection mode ("AO HE"). Therefore, the CIS 11 transmits a detection trigger ("ON") providing notification that a person is detected to the AP 12, and transitions to the sensing mode ("Sensing (VGA)"). In the sensing mode ("Sensing (VGA)"), the CIS 11 does not perform image recognition, continuously captures the sensing low-resolution image with low resolution, and transmits the acquired sensing low-resolution image to the AP 12. On the other hand, in a case where the detection trigger ("ON") from the CIS 11 is received, the AP 12 transitions from the sleep mode ("Waiting low power event") to the face authentication mode ("Face recog.").

In the face authentication mode ("Face recog."), the AP 12 performs face detection by image recognition (DNN processing) prior to the authentication. When performing face detection, the AP 12 acquires a sensing low-resolution image from the CIS 11, and performs image recognition on the sensing low-resolution image. In the scene C4, since the user's face is included in the image frame, the AP 12 detects the face in the image frame by face detection in the face authentication mode ("Face recog."). When detecting the face, the AP 12 collates the detected face with the information on the user's face (face image or feature of the face of the user) acquired in advance. Since the face in the image frame is the user's face, the AP 12 determines that the face authentication has succeeded as a result of the collation, and transitions from the face authentication mode ("Face recog.") to "Phone unlocked". At the time of this transition, the AP 12 transmits the notification signal ("Comp") to the CIS 11. In a case where the notification signal ("Comp") from the AP 12 is received, the CIS 11 stops the sensing mode ("Sensing (VGA)"), and stops the capturing of the sensing low-resolution image and the transmission of the sensing low-resolution image to the CIS 11. In a case where the sensing mode ("Sensing (VGA)") is stopped, the CIS 11 transitions to the standby mode ("OFF-Controlled by AP") and switches to a state of waiting for a notification signal regarding control and the like from the AP 12.

Details of Example 1 of Specific Situation of Terminal Unlocking

Figure 10:
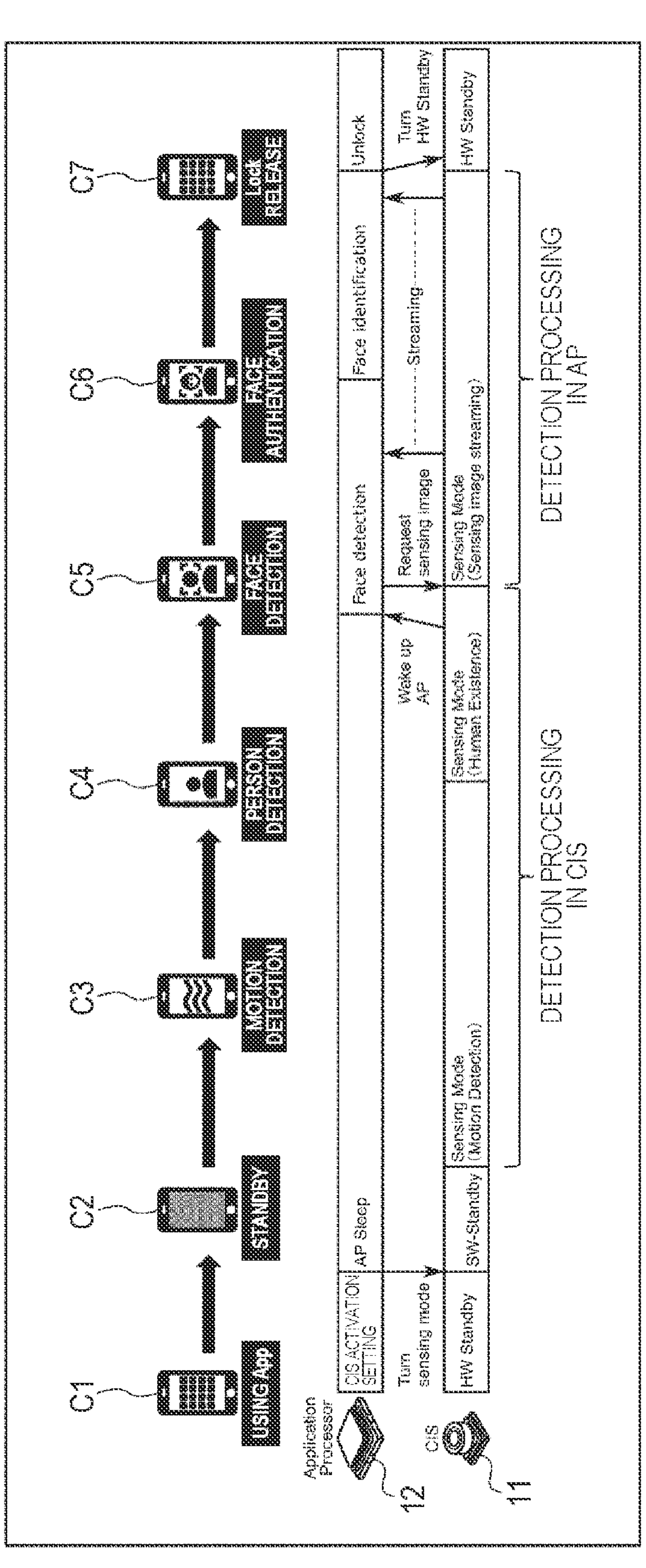
FIG. 10 is a flow diagram illustrating state transition as a terminal device in a terminal unlocking function and state transition of a CIS and an AP.

FIG. 10 is a flow diagram illustrating state transition as the terminal device 1 and state transition of the CIS 11 and the AP 12 in a case where image recognition of the CIS 11 and the AP 12 is used for the terminal unlocking function.

In FIG. 10, states C1 to C7 represent state transitions of the terminal device 1. In the state C1, the terminal device 1 is in a state of executing an application. At this time, the state of the AP 12 is a state in which activation setting of the CIS 11 is performed, and the state of the CIS 11 is a standby mode ("HW Standby"). The standby mode ("HW Standby") is a state in which power is not supplied to the CIS 11 and the CIS 11 stops processing. The terminal device 1 transitions from the state C1 to the state C2.

In the state C2, the terminal device 1 enters a standby state (locked state). The transition from the state C1 to the state C2 is not limited to a specific condition. For example, it may be a case where a person's face is not continuously detected in the image frame for a predetermined period of time, a case where an operation is not continuously performed on the terminal device 1 for a predetermined period of time, and the like.

In the state C2, the AP 11 is in a sleep mode ("AP Sleep"). In the sleep mode ("AP Sleep"), power is not supplied to the AP 12, and the AP 12 is in a standby state without doing anything. When transitioning to the sleep mode ("AP Sleep"), the AP 12 transmits a notification signal ("Turn sensing mode") requesting the CIS 11 to enable the sensing mode based on the motion detection and the person detection. The CIS 11 transitions from a standby mode ("HW Standby") in which power is not supplied to a standby mode ("SW Standby") in which power is supplied, according to a notification signal ("Turn Sensing mode") from the AP 11, and predetermined activation setting is performed by the AP 11. The terminal device 1 transitions from the state C2 to the state C3.

In the state C3, the terminal device 1 performs motion detection. The CIS 11 transitions from a standby mode ("SW Standby") in the state C2 to a motion detection mode ("Sensing Mode (Motion Detection)") in the sensing mode based on the motion detection and the person detection. The motion detection mode ("Sensing Mode (Motion Detection)") indicates the same mode as the motion detection mode ("AO MD") described in FIG. 8. Therefore, the terminal device 1 enters the state C3 in which motion detection is performed by the image recognition of the CIS 11. In the state C3, the AP 12 is in a sleep mode ("AP Sleep"). The terminal device 1 transitions from the state C3 to the state C4.

In the state C4, the terminal device 1 performs person detection. In a case where a motion is detected in the image frame in the motion detection mode ("Sensing Mode (Motion Detection)") in the state C3, the CIS 11 automatically transitions from the motion detection mode ("Sensing Mode (Motion Detection)") to the person detection mode ("Sensing Mode (Human Existence)"). The person detection mode ("Sensing Mode (Human Existence)") indicates the same mode as the person detection mode ("AO HE") described in FIG. 8. Therefore, the terminal device 1 enters the state C4 in which person detection is performed by the image recognition of the CIS 11. In the state C4, the AP 12 continues the sleep mode ("AP Sleep"). The terminal device 1 transitions from the state C4 to the state C5.

In the state C5, the terminal device 1 performs face detection. In a case where a person is detected in the image frame in the person detection mode ("Sensing Mode (Human Existence)" in the state C4, the CIS 11 transmits a detection trigger ("Wake up AP") (person detection notification signal) to the AP 12. The detection trigger ("Wake up AP") is the same signal as the detection trigger ("ON") described in FIG. 8. Therefore, the AP 12 is activated from the sleep mode ("AP Sleep") (transitions to the active mode), and transitions to a face detection mode ("Face detection"). In a case where the AP 12 transitions to the face detection mode ("Face detection"), the AP 12 transmits a notification signal ("Request sensing image") requesting transmission of a sensing image with low resolution to the CIS 11. In a case where the CIS 11 receives the notification signal ("Request sensing image") from the AP 12, the CIS 11 transitions from the person detection mode ("Sensing Mode (Human Existence)") to a sensing mode ("Sensing Mode (Sensing image streaming)") for sensing image output. The sensing mode ("Sensing Mode (Sensing image streaming)") indicates the same mode as the sensing mode ("Sensing (VGA)") described in FIG. 8. In the sensing mode ("Sensing Mode (Sensing image streaming)"), the CIS 11 transmits a sensing low-resolution image with low resolution to the AP 12. The AP 12 receives the sensing low-resolution image from the CIS 11, and performs face detection by performing image recognition on the sensing low-resolution image. Therefore, the terminal device 1 enters the state C5 in which face detection is performed by the image recognition of the AP 12. The terminal device 1 transitions from the state C5 to the state C6.

In the state C6, the terminal device 1 performs face authentication. In a case where a person's face is detected in the image frame in the face detection mode ("Face detection") in the state C5, the AP 12 transitions to a face authentication mode ("Face identification"). In the face authentication mode ("Face identification"), the AP 12 performs face authentication by collating a face detected by the face detection with information on the user's face acquired in advance. Therefore, the terminal device 1 enters the state C6 in which face authentication is performed by the image recognition of the AP 12. The terminal device 1 transitions from the state C6 to the state C7.

In the state C7, the terminal device 1 is in the unlocked state. In a case where the face authentication succeeds in the face authentication mode ("Face identification") in the state C6, the AP 12 transitions to "Unlock". "Unlock" is the same state as "Phone unlocked" described in FIG. 8, and represents a state in which the AP 12 sets the terminal device 1 to the unlocked state. When transitioning from the face authentication mode ("Face identification") to "Phone unlocked", the AP 12 transmits a notification signal ("Turn HW Standby") requesting the CIS 11 to switch to the standby mode ("HW Standby"), to the CIS 11. In a case where the notification signal ("Turn HW Standby") is received from the AP 12, the CIS 11 transitions from the sensing mode ("Sensing Mode (Sensing image streaming)") to the standby mode ("HW Standby"). Therefore, the terminal device 1 enters the state C7 in which the locked state is released by the AP 12.

Details of Example 2 of Specific Situation of Terminal Locking

FIG. 11 is a flow diagram illustrating state transition as the terminal device 1 and state transition of the CIS 11 and the AP 12 in a case where image recognition of the CIS 11 and the AP 12 is used for the terminal locking function. Note that the sensing mode of the CIS 11 includes a sensing mode in which the person detection is performed in the person detection mode in a case where the motion is detected in the motion detection mode as in the states C3 and C4 in FIG. 10, and a sensing mode in which only the person detection is performed in the person detection mode. The former is referred to as a sensing mode based on motion detection and person detection, and the latter is referred to as a sensing mode based on only person detection. Sensing using the motion detection and the person detection as in the former is referred to as sensing based on motion detection and person detection, and sensing using only the person detection as in the latter is referred to as sensing based on only person detection.

In these sensing modes or sensing, instead of outputting the detection result to the AP 12 and the like only in a case where a person is detected in the image frame, it is possible to continuously output the detection result as to whether or not a person is detected to the AP 12 and the like. In this case, image recognition (sensing) of the CIS 11 is referred to as constant sensing, and a mode in which the CIS 11 performs constant sensing is also referred to as a constant sensing mode. The detection result continuously output in the constant sensing is not limited to whether or not a person is detected in the image frame, but may also be whether or not a motion is detected in the image frame, and differs depending on processing contents of the image recognition.

In FIG. 11, states C1 to C3 represent state transitions of the terminal device 1. In the state C1, the terminal device 1 is in a state of executing an application. At this time, the state of the AP 12 is a state ("CIS activation setting") in which activation setting of the CIS 11 is performed, and the state of the CIS 11 is a standby mode ("HW Standby"). The terminal device 1 transitions from the state C1 to the state C2.

In the state C2, the terminal device 1 performs person detection in the constant sensing. The transition from the state C1 to the state C2 occurs, for example, in a case where the user does not perform any operation on the terminal device 1 continuously for a predetermined period of time.

In the state C2, the AP 12 transitions to an idle mode ("AP Idle"). In the idle mode ("AP Idle"), power is supplied to the AP 12, but the AP 12 stands by without doing anything. When transitioning to the idle mode ("AP Idle"), the AP 12 transmits a notification signal ("Turn sensing mode") requesting the CIS 11 to enable the constant sensing mode based on only the person detection. The CIS 11 transitions from a standby mode ("HW Standby") in which power is not supplied to a standby mode ("SW Standby") in which power is supplied, according to a notification signal ("Turn sensing mode") from the AP 12. In a case where the CIS 11 transitions to the standby mode ("SW Standby"), the CIS 11 subsequently transitions to a person detection mode ("Sensing Mode (Human Existence)"). The person detection mode at this time is a constant sensing mode based on only person detection. Therefore, the CIS 11 performs person detection continuously by image recognition.

In a case where a person is detected in the image frame in the person detection mode ("Sensing Mode (Human Existence)"), the CIS 11 transmits a person detection notification signal ("Human Detected") indicating that a person is detected, to the AP 12. In a case where no person is detected in the image frame in the person detection mode ("Sensing Mode (Human Existence)"), the CIS 11 transmits a no-person detection notification signal ("Human Not Detected") providing notification that no person is detected, to the AP 12. In a case where the no-person detection notification signal ("Human Not Detected") is transmitted to the AP 12, the CIS 11 transitions to the standby mode ("SW Standby"). In a case where the no-person detection notification signal ("Human Not Detected") is received from the CIS 11, the AP 12 performs processing of causing the terminal device 1 to enter the locked state, and enters the state of "CIS activation setting" in which activation setting of the CIS 11 is performed. In this state, the AP 12 transmits a notification signal ("Turn sensing mode") for requesting the enabling of the sensing mode based on the motion detection and the person detection, to the CIS 11. Thereafter, the AP 12 switches to a sleep mode ("AP Sleep") in which power is not supplied. Therefore, the terminal device 1 transitions to the state C3 that is a standby state. In the standby state, for example, the display of the terminal device 1 is turned off. In a case where a notification signal ("Turn sensing mode") requesting the enabling of the sensing mode based on the motion detection and the person detection is received from the AP 12, the CIS 11 transitions from the standby mode ("SW Standby") to the sensing mode based on the motion detection and the person detection. The reason why the CIS 11 transitions to the sensing mode based on the motion detection and the person detection is to unlock the terminal.

(Processing Procedure of Terminal Locking and Terminal Unlocking)

Figure 12:
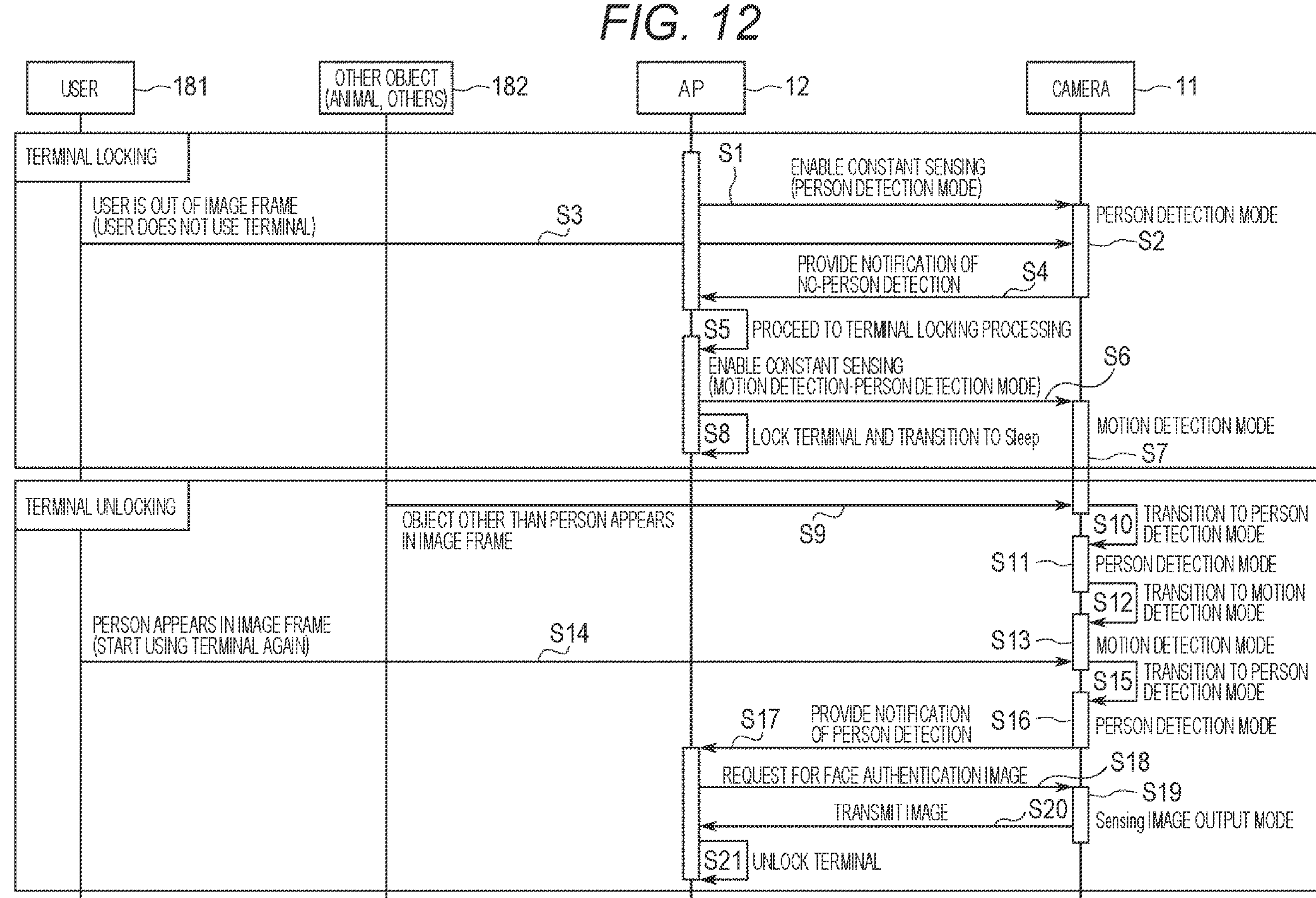
FIG. 12 is a sequence diagram exemplifying a processing procedure of terminal locking and terminal unlocking.

FIG. 12 is a sequence diagram exemplifying a processing procedure of terminal locking and terminal unlocking. FIG. 12 illustrates a flow of processing regarding the camera (CIS 11), the AP 12, the user 181, another object (moving body 182), and the user 181. Since the camera corresponds to the CIS 11, it is described as the CIS 11 in the present description, and since the other object corresponds to the moving body 182 in FIG. 7, it is described as the moving body 182 in the present description. In FIG. 12, steps S1 to S7 relate to terminal locking, and steps S9 to S21 relate to terminal unlocking.

The AP 12 requests the CIS 11 to enable constant sensing based on only person detection (step S1). In response to the request in step S1, the CIS 11 transitions to the person detection mode (corresponding to person detection mode ("Sensing Mode (Human Existence)" in FIG. 11) (step S2). In a case where the user 181 is out of the image frame (step S3), the CIS 11 notifies the AP 12 of no-person detection (that no person is detected) (step S4). In response to the notification of the no-person detection in step S4, the AP 12 proceeds to terminal locking processing (step S5). In a case where the AP 12 proceeds to the terminal locking processing, the AP 12 requests the CIS 11 to enable the sensing (constant sensing) based on the motion detection and the person detection (step S6). In response to the request in step S6, the CIS 11 transitions to the motion detection mode (step S7). After the notification in step S6, the AP 12 sets the terminal device 1 to the locked state, and transitions to the sleep mode. Therefore, the terminal device 1 enters the locked state.

In a case where the CIS 11 transitions to the sensing mode based on the motion detection and the person detection in response to the notification signal in step S6, and transitions to the person detection mode in step S7, it is assumed that the moving body 182 other than a person appears in the image frame (step S9). In a case where a motion is detected in the image frame, the CIS 11 transitions from the motion detection mode to the person detection mode (step S10), and enters the person detection mode (step S11). In the person detection mode in step S11, since no person is detected in the image frame, the CIS 11 transitions to the motion detection mode (step S12), and returns to the motion detection mode (step S13). In a case where the user 181 appears in the image frame (step S14) in the motion detection mode of step S13, the CIS 11 transitions to the person detection mode (step S15), and enters the person detection mode (step S16). In the person detection mode of step S16, the CIS 11 detects the user 181 as a person, and notifies the AP 12 of person detection (that a person is detected) (step S17). After the notification of step 17, the AP 12 requests the CIS 11 for an image (sensing image) for face recognition (step S18). In response to the request of step S18, the CIS 11 transitions to the sensing image output mode (sensing mode for sensing image output) (step S19). In a case where the CIS 11 transitions to the sensing image output mode, the CIS 11 transmits a sensing image (sensing low-resolution image) to the AP 12 (step S20). The AP 12 performs face authentication including face detection using the sensing image of step S20, and when the face authentication succeeds, the AP 12 sets the terminal device 1 to the unlocked state (step S21).

(Processing Procedure of Terminal Locking)

Figure 13:
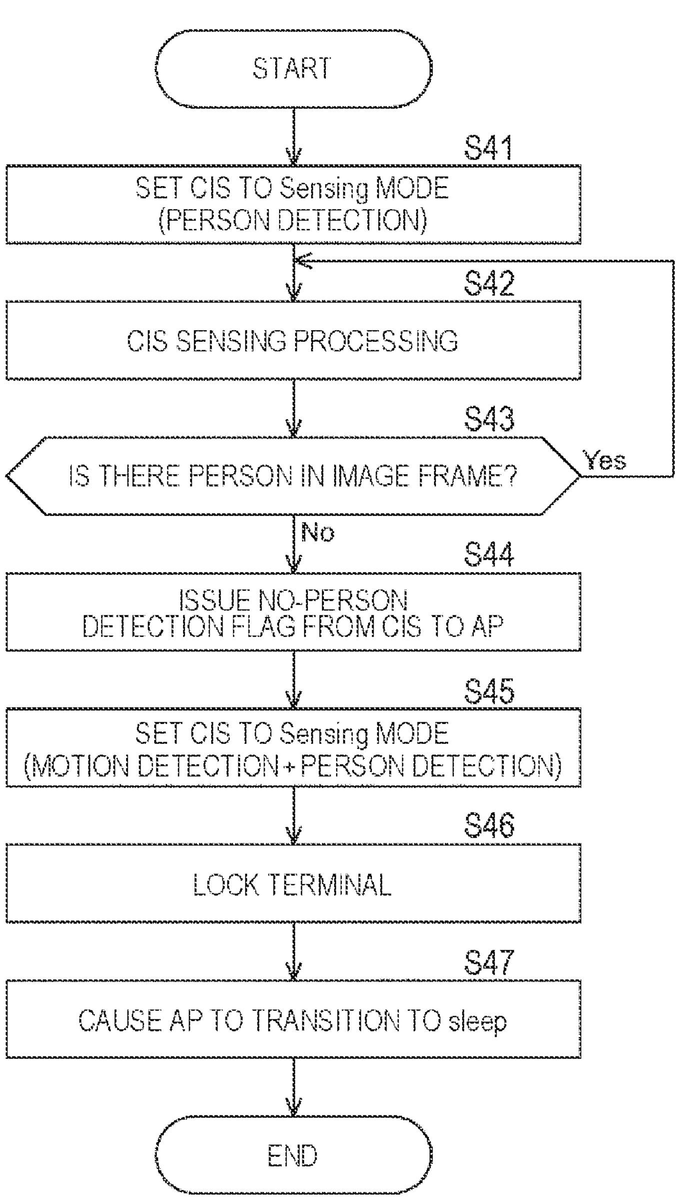
FIG. 13 is a flowchart illustrating a processing procedure performed by a CIS and an AP in terminal locking.

FIG. 13 is a flowchart illustrating a processing procedure performed by the CIS 11 and the AP 12 in terminal locking. In step S41, the AP 12 sets the CIS 11 to the constant sensing mode based on only person detection. That is, the AP 12 requests the CIS 11 to enable the constant sensing mode based on only person detection, and causes the CIS 11 to transition to the mode. In step S42, the CIS 11 performs person detection. In step S43, the CIS 11 determines whether or not there is a person in the image frame. In the case of affirmative determination in step S43, the processing returns to step S42, and the processing is repeated from step S42.

In the case of negative determination in step S43, the processing proceeds to step S44. In step S44, the CIS 11 notifies the AP 12 of no-person detection (that no person is detected) (issues a flag of no-person detection). In step S45, the AP 12 sets the CIS 11 to the sensing mode based on motion detection and person detection. That is, the AP 12 requests the CIS 11 to enable the sensing mode based on motion detection and person detection, and causes the CIS 11 to transition to the mode. In step S46, the AP 12 sets the terminal device 1 to the locked state. In step S47, the AP 12 transitions to the sleep mode.

By the processing of the CIS 11 and the AP 12 in the terminal locking described above, in a case where no person is detected in the image frame, the terminal device 1 is set to the locked state.

(Processing Procedure of Terminal Unlocking)

Figure 14:
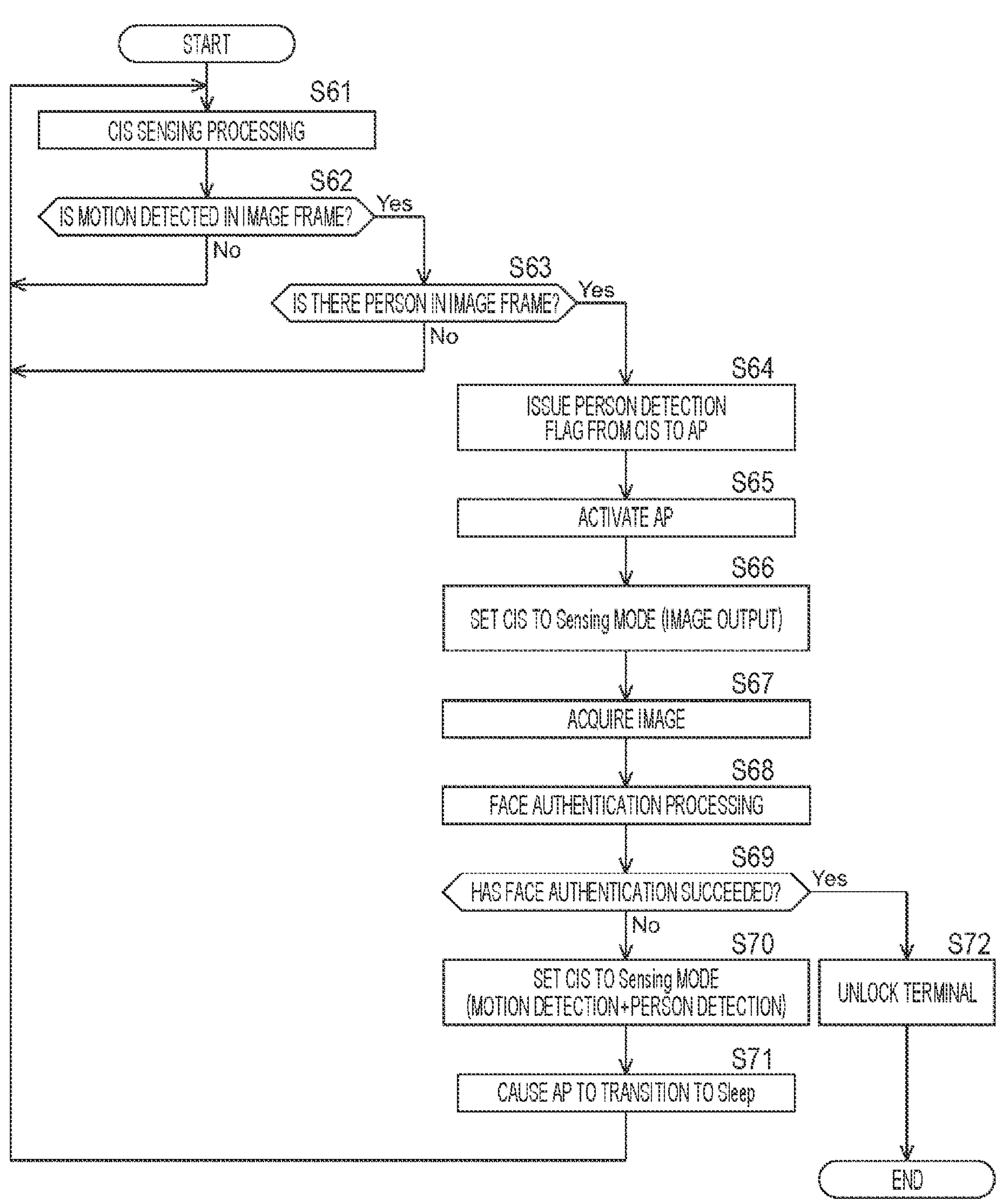
FIG. 14 is a flowchart illustrating a processing procedure performed by a CIS and an AP in terminal unlocking.

FIG. 14 is a flowchart illustrating a processing procedure performed by the CIS 11 and the AP 12 in terminal unlocking. In step S61, the CIS 11 performs motion detection and person detection by image recognition (sensing processing) in the sensing mode based on the motion detection and the person detection. Note that it is assumed that the state of the AP 12 is the sleep mode. In step S62, the CIS 11 performs motion detection, and determines whether or not a motion is detected in the image frame. In the case of negative determination in step S62, the processing returns to step S61. In the case of affirmative determination in step S62, the processing proceeds to step S63.

In step S63, the CIS 11 performs person detection, and determines whether or not a person is detected in the image frame. In the case of negative determination in step S63, the processing returns to step S61, and is repeated from step S61. In the case of affirmative determination in step S63, the processing proceeds to step S64. In step S64, the CIS 11 notifies the AP 12 of person detection (that a person is detected) (issues a flag of person detection). In step S65, the AP 12 is activated (transitions to the active mode) from the sleep mode in response to the notification of step S64. In step S66, the AP 12 sets the CIS 11 to the sensing mode for sensing image output. In step S67, the AP 12 acquires the sensing image from the CIS 11. In step S68, the AP 12 performs face authentication that the face in the image frame is the user's face using the sensing image from the CIS 11. In step S69, the AP 12 determines whether or not the face authentication has succeeded.

In the case of negative determination in step S69, the processing proceeds to step S70. In step S70, the AP 12 sets the CIS 11 to the sensing mode based on the motion detection and the person detection. In step S71, the AP 12 transitions to the sleep mode. The processing returns from step S71 to step S61, and is repeated from step S61.

In the case of affirmative determination in step S69, the processing proceeds to step S72. In step S72, the AP 12 sets the terminal device 1 to the unlocked state. In a case where the process of step S72 is ended, the processing of this flowchart is ended.

Summary of Application Example 1

According to Application Example 1, in the terminal unlocking, the person detection as to whether or not the user (person) is detected in the image frame is performed, and the face authentication is performed only in a case where the person is detected in the image frame. In a case where the face authentication has succeeded, the terminal device 1 is unlocked. In a case where no person is detected in the image frame by the person detection or in a case where the face authentication has failed, the terminal device 1 is not unlocked. In the terminal locking, in a state where the terminal device 1 is not locked (unlocked state), the person detection as to whether or not the user (person) is detected in the image frame is performed, and in a case where no person is detected in the image frame, the terminal device 1 is locked. In a case where a person is detected in the image frame, the terminal device 1 is not locked. Since the person detection can be realized with lower processing capability than the face authentication, the person detection can be performed by the image recognition of the CIS 11 having lower processing capability than the AP 12, and the power consumption can also be reduced. Since the person detection is performed by the image recognition of the CIS 11 not only for the terminal unlocking but also for the terminal locking, it is not necessary to transmit a large amount of image data from the CIS 11 to the AP 12 at the time of person detection, and the AP 12 can stand by in a power saving state such as a sleep mode or can focus on processing other than the person detection. Therefore, in a case where the person detection is performed by the CIS 11, power consumption required for the transmission of the image data and power consumption consumed by the AP 12 are reduced as compared with a case where the person detection is performed by the AP 12.

In the person detection by the image recognition (DNN processing) of the CIS 11, the sensitivity of the person detection (the degree of excessive detection or omission of detection) may be adjusted so as to be able to cope with occlusion of hair, a mask, glasses, or the like, appearance at the end of the image frame, visibility due to enlargement or reduction of the image frame, and the like. The person detection by the image recognition (DNN processing) of the CIS 11 may be limited to a state in which the face authentication is easily performed, and the presence of a person in the image frame may be detected. The state in which the face authentication is easily performed is, for example, a state in which the size of the person with respect to the image frame is within a range of a predetermined ratio or a state in which the person faces the front (the direction of the camera). Such limitation on the person detection may be handled by adjusting a condition for performing the notification (detection trigger) from the CIS 11 to the AP 12 that the person is detected. The adjustment of the condition may be, for example, adjustment of a threshold (lower limit value) at which it is determined that a person is detected with respect to the person detection certainty factor that is the detection result of the DNN processing.

The person detection by the image recognition of the CIS 11 is performed in a case where a motion is detected in the image frame by the motion detection. Since the motion detection can be performed with lower processing capability than the person detection, the power consumption is further reduced as compared with a case where only the person detection is performed in the CIS 11. There may be a case in which only one of the motion detection and the person detection in the CIS 11 is performed. In a case where only the motion detection is performed in the CIS 11, it is only required to notify the AP 12 that the motion is detected in the image frame as a notification equivalent to that in a case where a person is detected.

Application Example 2

Application Example 2 is an application example when the image recognition of the CIS 11 is applied to a Smart rotate function of the terminal device 1. The Smart rotate of the terminal device 1 is a function of the rotation according to a vertical direction of the image displayed on the display of the terminal device 1 (vertical direction of the screen of the image) and a posture of the terminal device 1 or the direction (vertical direction) of the face of the user viewing the display of the terminal device 1. In Application Example 2, the image recognition of the CIS 11 is used to determine whether to rotate the screen on the basis of the posture of the terminal device 1 or to rotate the screen on the basis of the direction of the face between a case where the direction of the face of the user can be detected by the camera (CIS 11) of the terminal device 1 and a case where the direction of the face of the user cannot be detected by the camera (CIS 11) of the terminal device 1. Note that, for example, a smartphone is assumed as the terminal device 1, and the camera including the CIS 11 images a range facing the display of the smartphone.

Figure 15:
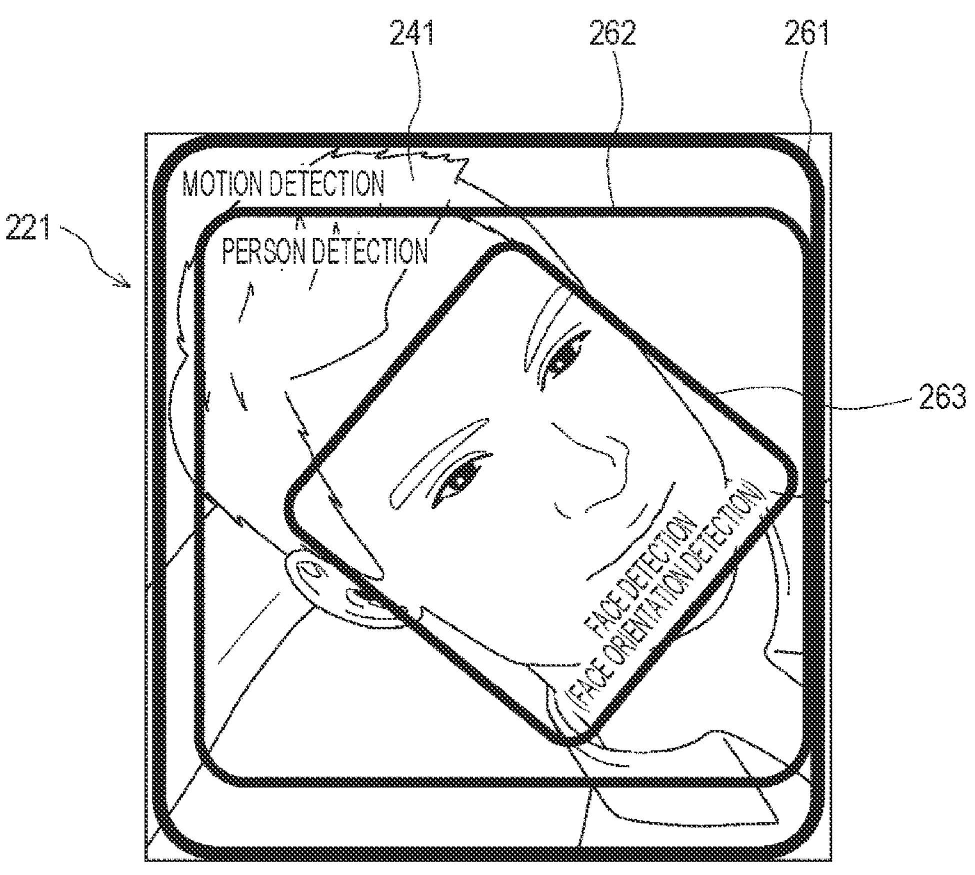
FIG. 15 is a diagram describing image recognition performed by a CIS and an AP for a Smart rotate function.

FIG. 15 is a diagram describing image recognition performed by the CIS 11 and the AP 12 for the Smart rotate function of the terminal device 1. In FIG. 15, a captured image 221 is an example of a captured image captured by the CIS 11, and represents a state of the subject in the image frame. A user 241 represents, for example, the owner of the terminal device 1, but may not be the owner of the terminal device 1, and may be a user who is viewing the display of the terminal device 1.

In the Smart rotate function of the terminal device 1, as the image recognition, motion detection indicated by a motion detection frame 261, person detection indicated by a person detection frame 262, and face detection indicated by a face detection frame 263 are performed. The motion detection frame 261, the person detection frame 262, and the face detection frame 263 respectively correspond to the motion detection frame 201, the person detection frame 202, and the face detection frame 203 described in FIG. 7, and thus, a detailed description thereof is omitted.

Both the motion detection indicated by the motion detection frame 261 and the person detection indicated by the person detection frame 262 are performed by the image recognition of the CIS 11. This face detection indicated by the face detection frame 263 is performed by the image recognition of the AP 12. In the face detection in Application Example 2, not only the range of the face in the image frame but also the orientation of the face (head) is detected. In the Smart rotate, the image is rotated such that the detected orientation of the face and the orientation of the image displayed on the display are appropriate.

(Processing Procedure of Smart Rotate)

FIG. 16 is a flowchart illustrating a processing procedure performed by the CIS 11 and the AP 12 in the Smart rotate. In step S91, the AP 12 activates a video application (application) according to the user's operation. The video application is an application for reproducing a video.

In step S92, the AP 12 reproduces the video according to the user's operation. In step S93, the AP 12 sets the CIS 11 to the constant sensing mode based on only person detection. That is, the AP 12 requests the CIS 11 to enable the constant sensing mode based on only person detection, and causes the CIS 11 to transition to the mode. In step S94, the AP 12 measures an inclination of the terminal device 1 (display) using a gyro sensor. For example, the AP 12 detects, as a detection direction, a direction in which the inclination becomes larger with respect to the horizontal plane among directions along a display surface with respect to the horizontal plane. Note that, in step S94, the inclination (posture) of the terminal device 1 may be detected by an arbitrary sensor, and the expression method of the detected inclination is not limited to a specific method.

In step S95, the AP 12 determines whether or not an inclination is detected in the terminal device 1 on the basis of the measurement result of step S94. In the case of negative determination in step S95, the processing returns to step S94. In the case of affirmative determination in step S95, the processing proceeds to step S96. In step S96, the CIS 11 performs person detection by image recognition (sensing processing) in the sensing mode based on only the person detection. In step S97, the CIS 11 determines whether or not a person is detected in the image frame. In the case of negative determination in step S97, the processing proceeds to step S98.

In step S98, the AP 12 rotates the screen of the video to be displayed on the display on the basis of the detection direction detected by the gyro sensor in step S94. For example, the screen of the video is rotated such that the detection direction and the vertical direction of the screen of the video are most parallel to each other. After step S98, the processing proceeds to step S103. In the case of affirmative determination in step S97, the processing proceeds to step S99. In step S99, the AP 12 sets the CIS 11 to the sensing mode for sensing image output. In step S100, the AP 12 acquires the sensing image from the CIS 11. In step S101, the AP 12 detects a face rotation angle on the basis of the sensing image from the CIS 11. The face rotation angle is, for example, a rotation angle of the face in the vertical direction with respect to a reference direction (for example, the vertical direction) of the image frame.

In step S102, the AP 12 rotates the screen of the video to be displayed on the display on the basis of the face rotation angle (the direction of the face with respect to the image frame) detected in step S101. For example, the screen of the video is rotated such that the vertical direction of the face and the vertical direction of the screen of the video are most parallel to each other. After step S102, the processing proceeds to step S103. In step S103, the AP 12 determines whether or not the video application is ended. In the case of negative determination in step S103, the processing returns to step S93. In the case of affirmative determination in step S103, the processing of this flowchart is ended.

Summary of Application Example 2

According to Application Example 2, in the Smart rotate, person detection as to whether or not the user (person) is detected in the image frame is performed, face detection is performed in a case where the person is detected in the image frame, and the rotation of the screen based on the face detection is performed. In a case where no person is detected in the image frame, the rotation of the screen based on the posture of the terminal device 1 is performed. By performing the person detection before performing the rotation of the screen, whether the rotation of the screen is performed on the basis of the face detection or on the basis of the posture of the terminal device 1 is appropriately determined, and power consumption due to wasteful face detection in a situation where no person is detected in the image frame can also be reduced.

Since the person detection can be realized with lower processing capability than the face detection, the person detection can be performed by the image recognition of the CIS 11 having lower processing capability than the AP 12, and the power consumption can also be reduced. Since the person detection is performed by the image recognition of the CIS 11, it is not necessary to transmit a large amount of image data from the CIS 11 to the AP 12 at the time of the person detection, and power consumption required for the transmission of the image data at the time of the person detection and power consumption consumed by the AP 12 are reduced as compared with a case where the person detection is performed by the AP 12. The AP 12 can focus on processing other than the person detection.

In the person detection by the image recognition (DNN processing) of the CIS 11, the sensitivity of the person detection (the degree of excessive detection or omission of detection) may be adjusted so as to be able to cope with occlusion of hair, a mask, glasses, or the like, appearance at the end of the image frame, visibility due to enlargement or reduction of the image frame, and the like. The person detection by the image recognition (DNN processing) of the CIS 11 may be limited to a state in which a person is gazing at the screen, and the presence of a person in the image frame may be detected. The state in which a person is gazing at the screen is, for example, a state in which the size of the person with respect to the image frame is within a range of a predetermined ratio or a state in which the person faces the front (the direction of the camera). Such limitation on the person detection may be handled by adjusting a condition for performing the notification (detection trigger) from the CIS 11 to the AP 12 that the person is detected. The adjustment of the condition may be, for example, adjustment of a threshold (lower limit value) at which it is determined that a person is detected with respect to the person detection certainty factor that is the detection result of the DNN processing.

The person detection by the image recognition of the CIS 11 may be performed in a case where a motion is detected in the image frame by the motion detection. In this case, since the motion detection can be performed with lower processing capability than the person detection, the power consumption is further reduced as compared with a case where only the person detection is performed in the CIS 11. There may be a case in which only one of the motion detection and the person detection in the CIS 11 is performed. In a case where only the motion detection is performed in the CIS 11, it is only required to notify the AP 12 that the motion is detected in the image frame as a notification equivalent to that in a case where a person is detected.

Application Example 3

Application Example 3 is an application example when the image recognition of the CIS 11 is applied to a video reproduction control function of the terminal device 1. The video reproduction control function is a function of, in a case where a video is reproduced in the terminal device 1, reproducing a video in a case where the user is browsing the video of the display, and automatically stopping the reproduction of the video in a case where the user is not browsing the video. In Application Example 3, the image recognition of the CIS 11 is used to determine whether or not the user is browsing a video. Note that, for example, a smartphone is assumed as the terminal device 1, and the camera including the CIS 11 images a range facing the display of the smartphone.

Figure 17:
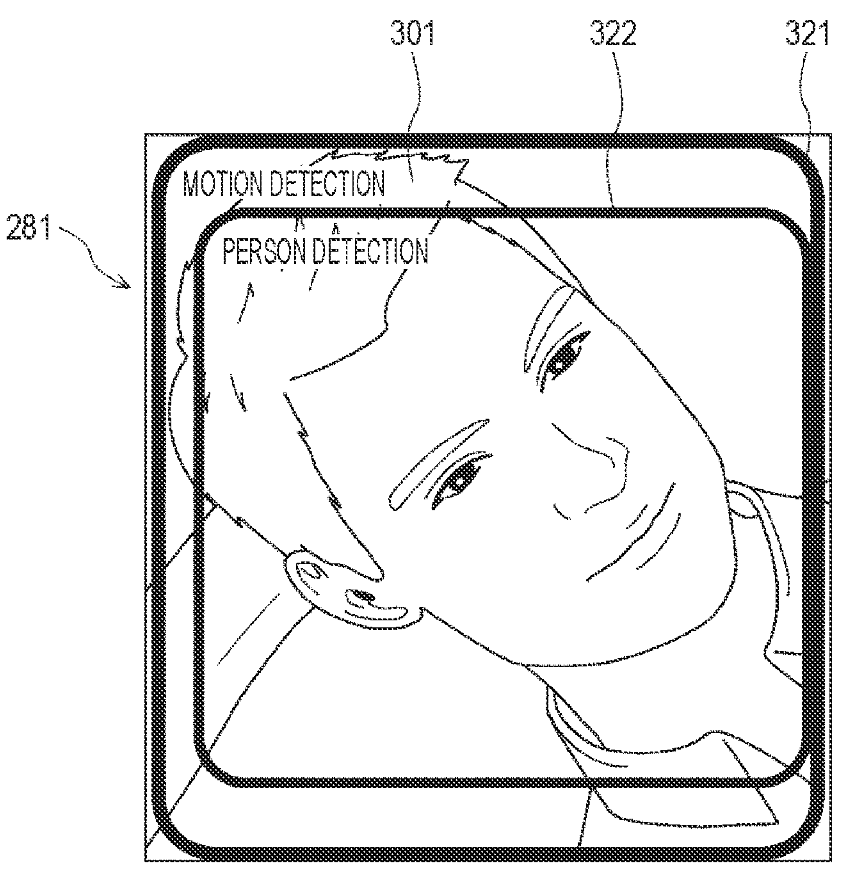
FIG. 17 is a diagram describing image recognition performed by a CIS and an AP 12 for a video reproduction control function.

FIG. 17 is a diagram describing image recognition performed by the CIS 11 and the AP 12 for the video reproduction control function of the terminal device 1. In FIG. 17, a captured image 281 is an example of a captured image captured by the CIS 11, and represents a state of the subject in the image frame. A user 301 represents, for example, the owner of the terminal device 1, but may not be the owner of the terminal device 1, and may be a user who is browsing the display of the terminal device 1.

In the video reproduction control function of the terminal device 1, motion detection indicated by a motion detection frame 321 and person detection indicated by a person detection frame 322 are performed as the image recognition. The motion detection frame 321 and the person detection frame 322 respectively correspond to the motion detection frame 201 and the person detection frame 202 described in FIG. 7, and thus, a detailed description thereof is omitted. Both the motion detection indicated by the motion detection frame 321 and the person detection indicated by the person detection frame 322 are performed by the image recognition of the CIS 11.

Note that, in Application Example 3, the image recognition (sensing) of the CIS 11 is not limited to the motion detection and the person detection. For example, the image recognition of the CIS 11 may include any one or more of motion detection, person detection, and line-of-sight detection. The line-of-sight detection may be performed not only in a case where the line-of-sight direction is specified but also in a case where whether or not the line of sight is in a specific direction (the direction of the display of the terminal device 1). The line-of-sight detection may be any method such as a method based on detection of a positional relationship between the inner corner of the eye and the iris. In Application Example 3, it is assumed that the sensing mode of the CIS 11 is the constant sensing mode.

(Processing Procedure of Video Reproduction Control)

FIG. 18 is a sequence diagram exemplifying a processing procedure of video reproduction control. FIG. 18 illustrates a flow of processing regarding the user 301, the camera (CIS 11), the AP 12, and video reproduction service 341. Since the camera corresponds to the CIS 11, it is described as the CIS 11 in the present description. The video reproduction service 341 corresponds to a program for performing video reproduction control.

In FIG. 18, in a case where the user 301 activates a video application (step S121), the video reproduction service 341 is activated. The video reproduction service 341 requests the CIS 11 to enable the constant sensing mode (step S122). Note that the constant sensing mode is a sensing mode in which at least one of person detection or line-of-sight detection among motion detection, person detection, and line-of-sight detection is performed. In the description, in the constant sensing mode of the CIS 11, it is assumed that the person detection also includes the line-of-sight detection, and the detection result includes a detection result such as whether or not a person is detected in the image frame and whether or not the line of sight is browsing (gazing) the display (video).

In response to the request in step S122, the CIS 11 transitions to the constant sensing mode (step S123). In a case where the user 301 instructs the video reproduction service 341 to reproduce a video (step S124), the CIS 11 detects a person in the image frame since the user 301 appears in the image frame. Therefore, the CIS 11 notifies the video reproduction service 341 of the person detection (that a person is detected) (step S125). The video reproduction service 341 reproduces the video in response to the instruction in step S124.

Here, a case where the user 301 goes out from the image frame because the user 301 is away from the seat or not browsing during the reproduction of the video, or a case where the line of sight is off the display is assumed. At this time, the CIS 11 notifies the video reproduction service 341 of the detection result indicating that no person is detected in the image frame or the line of sight is not gazing at the display as the detection result in the constant sensing mode (step S127). Therefore, the video reproduction service 341 stops the reproduction of the video (step S128).

Next, it is assumed that the user 301 enters the image frame or the line of sight gazes at the display because the user 301 is present or resumes the browsing while the video is stopped in step S128. At this time, the CIS 11 notifies the video reproduction service 341 of the detection result indicating that a person is detected in the image frame or the line of sight is gazing at the display as the detection result in the constant sensing mode (step S129). Therefore, the video reproduction service 341 resumes the reproduction of the video (step S130). In a case where the user 301 ends the video application (step S131), the video reproduction service 341 causes the CIS 11 to end the constant sensing mode based on only the person detection (step S132).

(Processing Procedure of Video Reproduction Control)

FIG. 19 is a sequence diagram exemplifying a processing procedure of the video reproduction control in a case where the same function as that in FIG. 18 is realized by the image recognition of the AP 12 without using the image recognition of the CIS 11, for comparison with FIG. 18.

FIG. 19 illustrates a flow of processing regarding the user 301, the camera (CIS 11-1), the AP 12-1, the user 301, and video reproduction service 341. The camera (CIS 11-1) may be regarded as the CIS 11 in FIG. 19, or may be a general image sensor that does not have a function of performing image recognition on the CIS 11 since it is a case where image recognition of the CIS 11 is not used. The AP 12-1 corresponds to the AP 12 in FIG. 18 and has a function of performing image recognition. The user 301 and the video reproduction service 341 correspond to the user 301 and the video reproduction service 341 in FIG. 18. In FIG. 19, in a case where the user 301 activates a video application (step S151), the video reproduction service 341 is activated. The video reproduction service 341 requests the AP 12 to enable the constant sensing (step S152). Note that the constant sensing is similar to the image recognition in the constant sensing mode in the case of FIG. 18, and thus description thereof is omitted.

In order to perform sensing (image recognition), the AP 12-1 activates the CIS 11-1 (camera), and requests the CIS 11-1 (camera) to transmit the captured image to the AP 12-1 (step S153). In a case where the user 301 instructs the video reproduction service 41 to reproduce a video (step S154), the user 301 appears in the image frame. In a case where the image (captured image) transmitted from the CIS 11-1 is acquired (step S155), the AP 12-1 performs image recognition (sensing) on the image. It is assumed that the image recognition is image recognition (sensing) similar to that in FIG. 18 and also includes line-of-sight detection. As a result, the captured image for detecting the AP 12-1 is transmitted to the AP 12-1 (step S155). The AP 12-1 detects a person in the image frame as a result of the sensing, notifies the video reproduction service 341 of the detection result (step S156), and instructs the CIS 11-1 to stop the imaging (stop the camera). The video reproduction service 341 reproduces the video according to the notification in step S156. The CIS 11-1 stops imaging in response to the instruction in step S156.

Here, a case where the user 301 goes out from the image frame because the user 301 is away from the seat or not browsing during the reproduction of the video, or a case where the line of sight is off the display is assumed. For periodic sensing, the AP 12-1 activates the CIS 11-1 (camera) (step S159), and acquires an image captured by the CIS 11-1 (step S160). At this time, the AP 12-1 notifies the video reproduction service 341 of the detection result indicating that no person is detected in the image frame or that the line of sight is not gazing at the display as the detection result in sensing (step S161), and instructs the CIS 11-1 to stop the imaging (stop the camera) (step S162). Therefore, the video reproduction service 341 stops the reproduction of the video (step S163). The CIS 11-1 stops imaging in response to the instruction in step S162.

Next, it is assumed that the user 301 enters the image frame or the line of sight gazes at the display because the user 301 is present or resumes the browsing while the video is stopped in step S163. In this case, for periodic sensing, the AP 12-1 activates the CIS 11-1 (camera) (step S164), and acquires an image captured by the CIS 11-1 (step S165). At this time, the AP 12-1 notifies the video reproduction service 341 of the detection result indicating that a person is detected in the image frame or that the line of sight is gazing at the display as the detection result in sensing (step S166), and instructs the CIS 11-1 to stop the imaging (stop the camera) (step S167). Therefore, the video reproduction service 341 resumes the reproduction of the video (step S168). The CIS 11-1 stops imaging in response to the instruction in step S167. In a case where the user 301 ends the video application (step S169), the video reproduction service 341 causes the AP 12-1 to end the constant sensing (step S170).

As is clear from the comparison between FIG. 18 and FIG. 19, since the transmission of the image from the CIS 11 to the AP 12 is not performed in FIG. 18, the power consumption required for transmitting the image from the CIS 11 to the AP 12 is greatly reduced.

(Processing Procedure of Video Reproduction Control)

Figure 20:
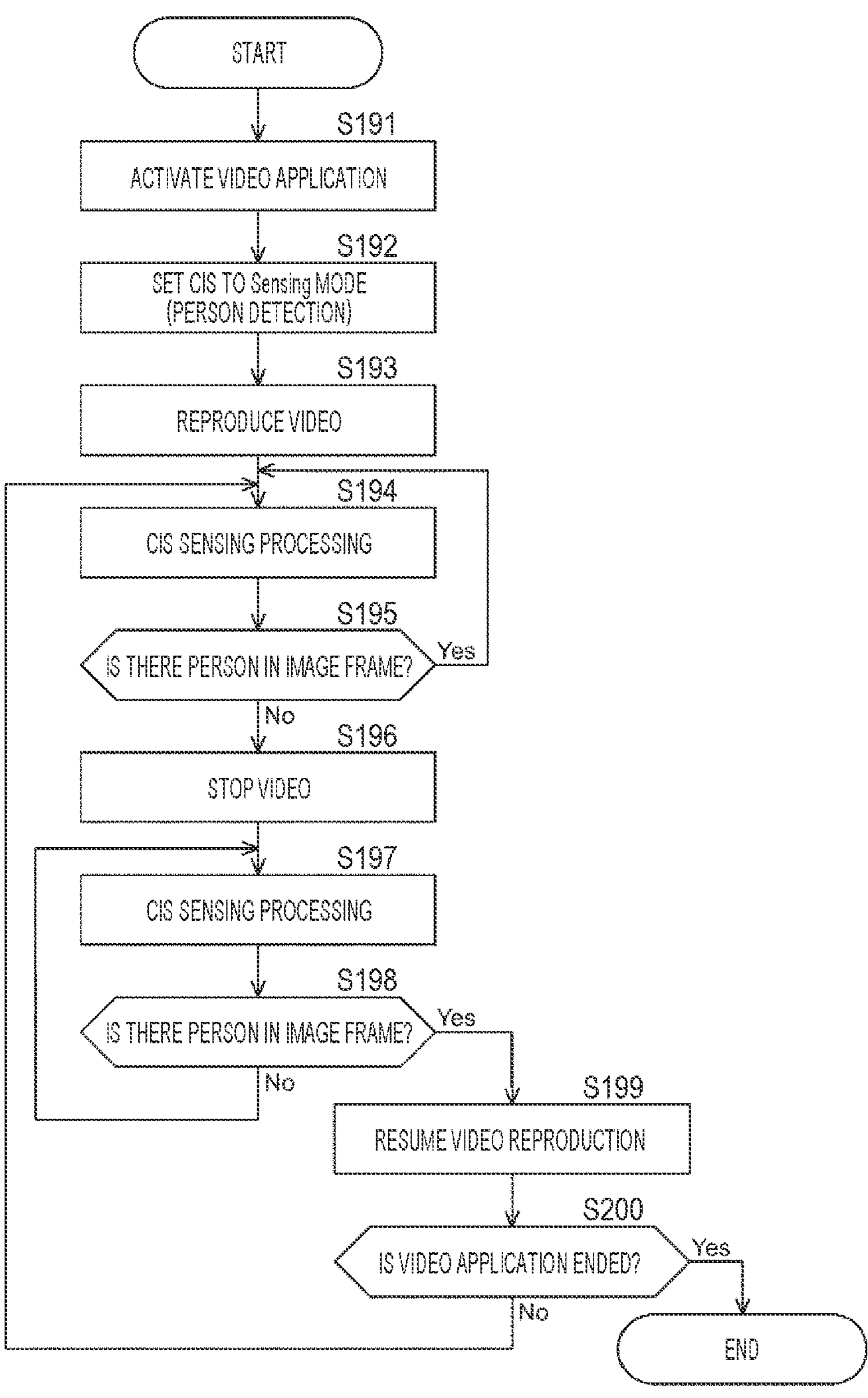
FIG. 20 is a flowchart illustrating a processing procedure performed by a CIS and an AP in video reproduction control.

FIG. 20 is a flowchart illustrating a processing procedure performed by the CIS 11 and the AP 12 in the video reproduction control. In steps S191, in a case where the user 301 activates a video application, the video reproduction service 341 is activated. In step S192, the video reproduction service 341 sets the CIS 11 to the constant sensing mode. Note that the constant sensing mode is the constant sensing mode described in FIG. 18, but here, the constant sensing mode is a constant sensing mode based on only the person detection.

In step S193, the video reproduction service 341 reproduces a video. In step S194, the CIS 11 performs image recognition (sensing) on the captured image (detection processing image), and notifies the video reproduction service 341 of the detection result. In step S195, the video reproduction service 341 determines whether or not a person is detected in the image frame (whether or not there is a person in the image frame) on the basis of the detection result notification of which is provided in step S194.

In the case of affirmative determination in step S195, the processing returns to step S194. In the case of negative determination in step S195, the processing proceeds to step S196. In steps S196, the video reproduction service 341 stops the reproduction of the video. In step S197, the CIS 11 performs image recognition (sensing) on the captured image (detection processing image), and notifies the video reproduction service 341 of the detection result.

In step S198, the video reproduction service 341 determines whether or not a person is detected in the image frame (whether or not there is a person in the image frame) on the basis of the detection result notification of which is provided in step S197. In the case of negative determination in step S198, the processing returns to step S197. In the case of affirmative determination in step S198, the processing proceeds to step S199.

In steps S199, the video reproduction service 341 resumes the reproduction of the video. In step S200, the video reproduction service 341 determines whether or not the video application is ended. In the case of negative determination in step S200, the processing returns to step S194. In the case of affirmative determination in step S200, the processing of this flowchart is ended.

Summary of Application Example 3

According to Application Example 3, in the video reproduction control, person detection as to whether or not the user (person) is detected in the image frame is performed, a video is reproduced in a case where the person is detected in the image frame, and the reproduction of the video is stopped in a case where no person is detected in the image frame. Since the person detection can be realized with lower processing capability, the person detection can be performed by the image recognition of the CIS 11 having lower processing capability than the AP 12. Since the person detection is performed by the image recognition of the CIS 11, it is not necessary to transmit a large amount of image data from the CIS 11 to the AP 12 at the time of the person detection, and power consumption required for the transmission of the image data at the time of the person detection and power consumption consumed by the AP 12 are reduced as compared with a case where the person detection is performed by the AP 12. The AP 12 can focus on processing other than the person detection.

In the person detection by the image recognition (DNN processing) of the CIS 11, the sensitivity of the person detection (the degree of excessive detection or omission of detection) may be adjusted so as to be able to cope with occlusion of hair, a mask, glasses, or the like, appearance at the end of the image frame, visibility due to enlargement or reduction of the image frame, and the like. The person detection by the image recognition (DNN processing) of the CIS 11 may be limited to a state in which a person is gazing at the screen, and the presence of a person in the image frame may be detected. The state in which the person is gazing at the screen is, for example, a state in which the line of sight is directed in the direction of the screen, a state in which the size of the person with respect to the image frame is within a range of a predetermined ratio, or a state in which the person faces the front (the direction of the camera). Such limitation on the person detection may be handled by adjusting a condition for performing the notification (detection trigger) from the CIS 11 to the AP 12 that the person is detected, in addition to the case of the line-of-sight detection described above. The adjustment of the condition may be, for example, adjustment of a threshold (lower limit value) at which it is determined that a person is detected with respect to the person detection certainty factor that is the detection result of the DNN processing. The line-of-sight detection may be performed by the AP 12 that has received a notification indicating that a person is detected in the image frame from the CIS 11.

The person detection by the image recognition of the CIS 11 may be performed in a case where a motion is detected in the image frame by the motion detection. In this case, since the motion detection can be performed with lower processing capability than the person detection, the power consumption is further reduced as compared with a case where only the person detection is performed in the CIS 11. There may be a case in which only one of the motion detection and the person detection in the CIS 11 is performed. In a case where only the motion detection is performed in the CIS 11, it is only required to notify the AP 12 that the motion is detected in the image frame as a notification equivalent to that in a case where a person is detected.

Application Example 4

Application Example 4 is an application example when the image recognition of the CIS 11 is applied to a Peeping prevention function of the terminal device 1. The Peeping prevention of the terminal device 1 is a function of performing predetermined warning processing such as display of a warning message in a case where a person other than the user is gazing at the display of the terminal device 1. In Application Example 4, the image recognition of the CIS 11 is used to determine whether or not a person other than the user is present at a position where the display of the terminal device 1 can be browsed. Note that, for example, a smartphone is assumed as the terminal device 1, and the camera including the CIS 11 images a range facing the display of the smartphone.

Figure 21:
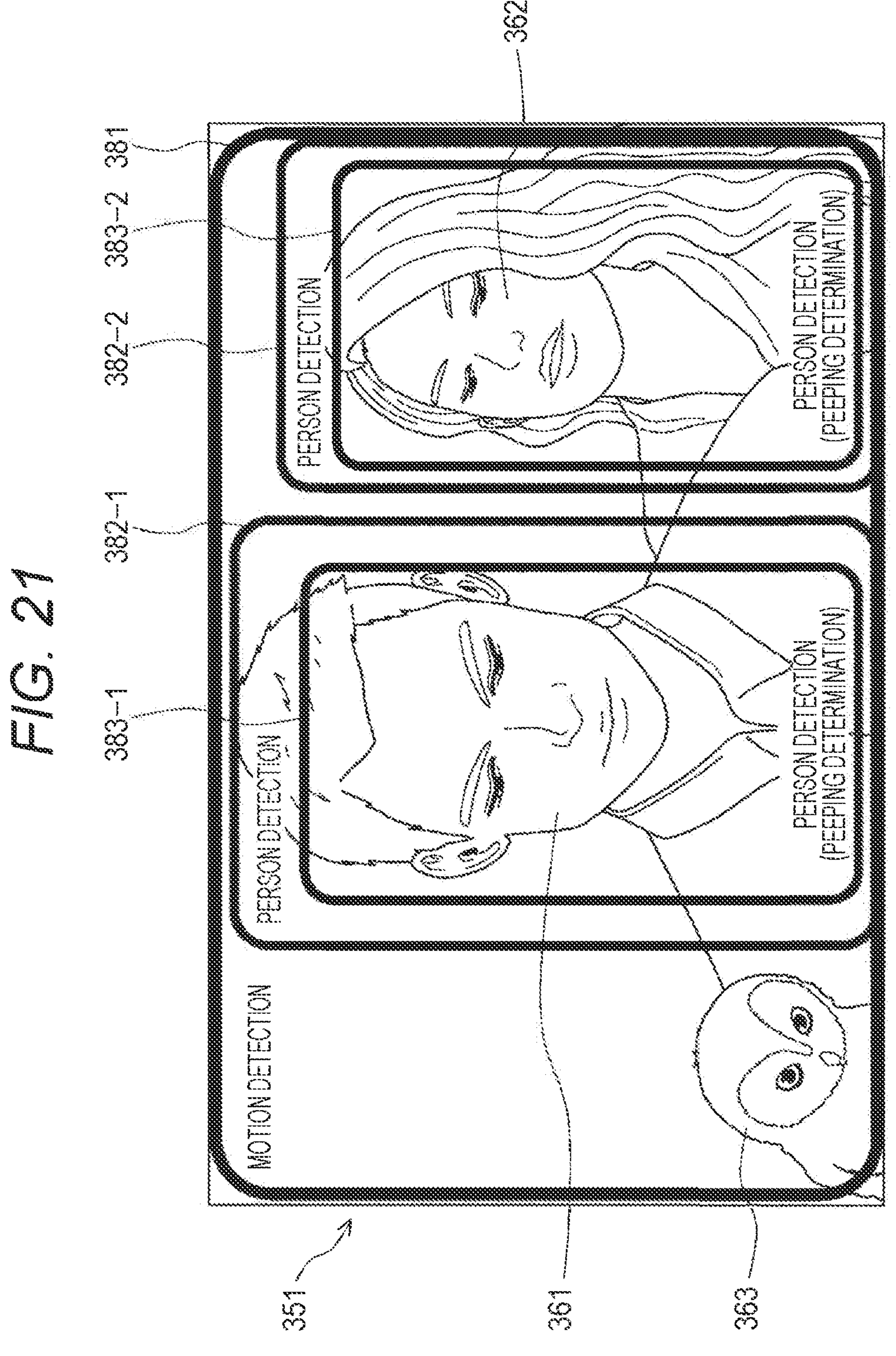
FIG. 21 is a diagram describing image recognition performed by a CIS and an AP for a Peeping prevention function.

FIG. 21 is a diagram describing image recognition performed by the CIS 11 and the AP 12 for the Peeping prevention function of the terminal device 1. In FIG. 21, a captured image 351 is an example of a captured image captured by the CIS 11, and represents a state of the subject in the image frame. A user 361 represents, for example, the owner of the terminal device 1. A person 362 represents a person other than the user 361. A moving body 363 represents an arbitrary moving object.

In the Peeping prevention function of the terminal device 1, motion detection indicated by a motion detection frame 381, person detection indicated by person detection frames 382-1 and 382-2, and person detection (peeping determination) indicated by person detection frames 383-1 and 383-2 are performed as the image recognition. The motion detection frame 381 and the person detection frames 382-1 and 382-2 respectively correspond to the motion detection frame 201 and the person detection frame 202 described in FIG. 7, and thus, a detailed description thereof is omitted.

The person detection frames 383-1 and 383-2 represent a range in which a person is detected in the image frame by the person detection. For the person detection frames 383-1 and 383-2, it is determined whether or not the person is gazing at the display (peeping determination). Both the motion detection indicated by the motion detection frame 381 and the person detection indicated by the person detection frames 382-1 and 382-2 are performed by the image recognition of the CIS 11. The person detection and the peeping determination indicated by the person detection frames 383-1 and 383-2 are performed by the image recognition of the AP 12. Note that the peeping determination may be performed by detecting whether or not the line of sight is in the direction of the display of the terminal device 1, similarly to the line-of-sight detection described in Application Example 3.

(Processing Procedure of Peeping Prevention)

Figure 22:
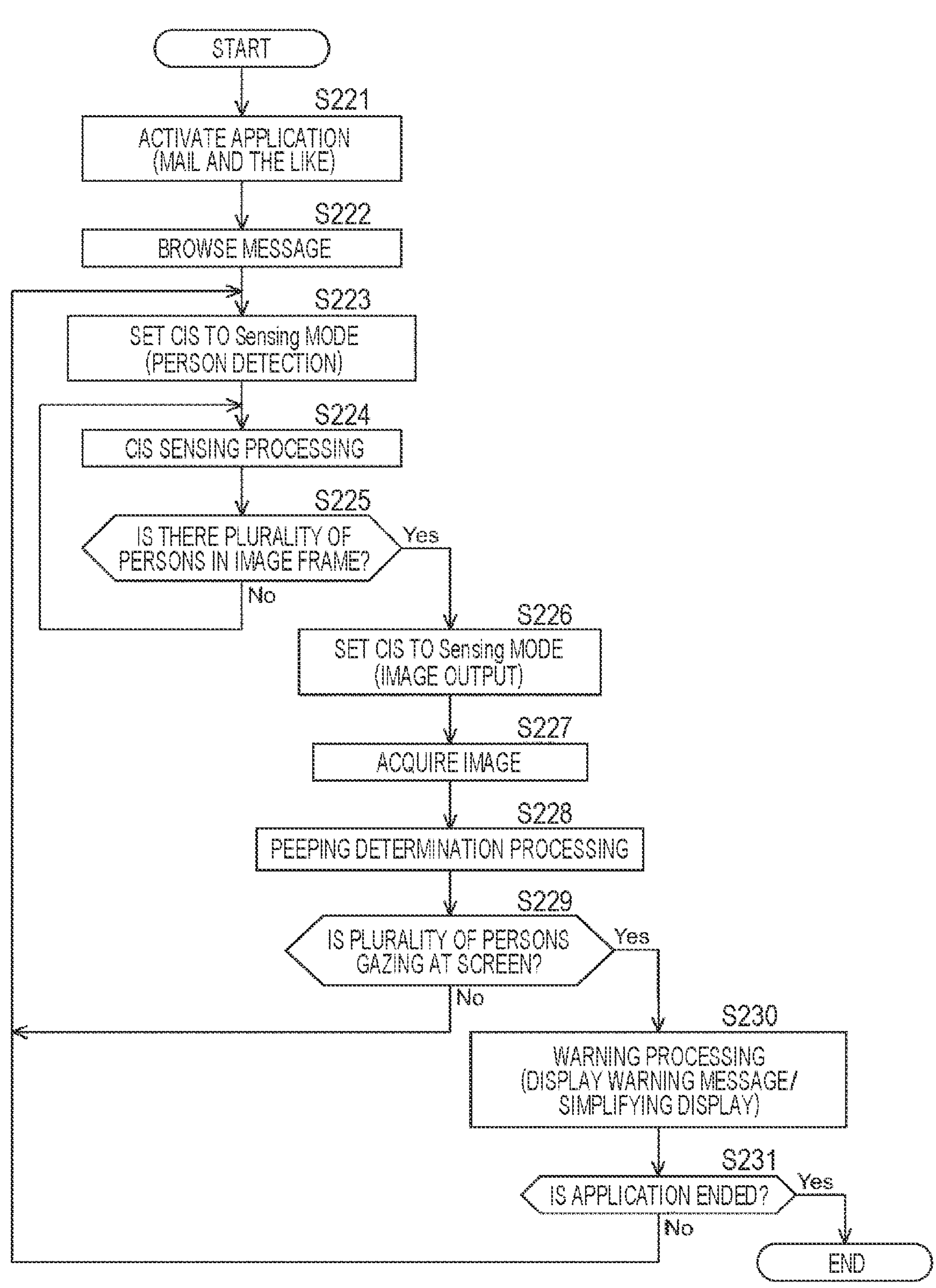
FIG. 22 is a flowchart illustrating a processing procedure performed by a CIS and an AP in Peeping prevention.

FIG. 22 is a flowchart illustrating a processing procedure performed by the CIS 11 and the AP 12 in the Peeping prevention. In step S221, the AP 12 activates a predetermined application (mail application and the like). In step S222, the AP 12 displays a display image (message and the like) corresponding to the type of the application on the display. In step S223, the AP 12 sets the CIS 11 to the constant sensing mode. In the present description, the constant sensing mode is a constant sensing mode based on only the person detection, but may be a constant sensing mode based on the motion detection and the person detection.

In step S224, the CIS 11 performs person detection by image recognition (sensing processing). In step S225, the CIS 11 determines whether or not a plurality of persons is detected in the image frame. In the case of negative determination in step S225, the processing returns to step S224. In the case of affirmative determination in step S225, the processing proceeds to step S226. In step S226, the AP 12 sets the CIS 11 to the sensing mode for sensing image output.

In step S227, the AP 12 acquires a sensing image with low resolution (sensing low-resolution image) transmitted from the CIS 11. In step S228, the AP 12 performs image recognition on the sensing image acquired in step S227, and performs peeping determination. For example, the AP 12 detects a plurality of persons in the image frame, and detects the number of persons who are gazing at the display on the basis of the line of sight and the like for each of the plurality of detected persons. In step S229, the AP 12 determines whether or not a plurality of persons is gazing at the display. In the case of negative determination in step S229, the processing returns to step S223. In the case of affirmative determination in step S229, the processing proceeds to step S230.

In step S230, the AP 12 performs warning processing. The warning processing may be any processing as long as it is processing of preventing the peeping, such as processing of displaying a message indicating that the peeping is being performed on the display or processing of simplifying the display image of the display. In step S231, the AP 12 determines whether or not the application is ended according to the user's instruction and the like. In the case of negative determination in step S231, the processing returns to step S223. In the case of affirmative determination in step S231, the processing of this flowchart is ended.

Summary of Application Example 4

According to Application Example 4, in the Peeping prevention, the person detection as to whether or not a plurality of persons is detected in the image frame is performed, and the peeping determination is performed only in a case where a plurality of persons is detected in the image frame. Since the person detection can be realized with lower processing capability than the peeping determination, the person detection can be performed by the image recognition of the CIS 11 having lower processing capability than the AP 12. Since the person detection is performed by the image recognition of the CIS 11, it is not necessary to transmit a large amount of image data from the CIS 11 to the AP 12 at the time of the person detection, and power consumption required for the transmission of the image data at the time of the person detection and power consumption consumed by the AP 12 are reduced as compared with a case where the person detection is performed by the AP 12. The AP 12 can focus on processing other than the person detection.

In the person detection by the image recognition (DNN processing) of the CIS 11, the sensitivity of the person detection (the degree of excessive detection or omission of detection) may be adjusted so as to be able to cope with occlusion of hair, a mask, glasses, or the like, appearance at the end of the image frame, visibility due to enlargement or reduction of the image frame, and the like. The person detection by the image recognition (DNN processing) of the CIS 11 may be limited to a state in which a person is gazing at the screen, and the presence of a person in the image frame may be detected. The state in which the person is gazing at the screen is, for example, a state in which the line of sight is directed in the direction of the screen, a state in which the size of the person with respect to the image frame is within a range of a predetermined ratio, or a state in which the person faces the front (the direction of the camera). Such limitation on the person detection may be performed by performing the line-of-sight detection in the CIS 11 and reflecting the result in the result of the person detection, or may be handled by adjusting a condition for performing the notification (detection trigger) from the CIS 11 to the AP 12 that the person is detected. The adjustment of the condition may be, for example, adjustment of a threshold (lower limit value) at which it is determined that a person is detected with respect to the person detection certainty factor that is the detection result of the DNN processing. The line-of-sight detection may be performed by the AP 12 that has received a notification indicating that a person is detected in the image frame from the CIS 11.

The person detection by the image recognition of the CIS 11 may be performed in a case where a motion is detected in the image frame by the motion detection. In this case, since the motion detection can be performed with lower processing capability than the person detection, the power consumption is further reduced as compared with a case where only the person detection is performed in the CIS 11. There may be a case in which only one of the motion detection and the person detection in the CIS 11 is performed. In a case where only the motion detection is performed in the CIS 11, it is only required to notify the AP 12 that the motion is detected in the image frame as a notification equivalent to that in a case where a person is detected.

Application Example 5

Application Example 5 is an application example when the image recognition of the CIS 11 is applied to a function of automatic transition (voice/video call automatic transition) of a voice call and a video call of the terminal device 1. The voice/video call automatic transition of the terminal device 1 is a function of automatically switching to a video call in a case where the user (person) is detected in the image frame when the terminal device 1 is making a voice call while putting the terminal device 1 on an ear. In Application Example 5, image recognition of the CIS 11 is used to detect whether or not a person is present in the image frame. Note that, for example, a smartphone is assumed as the terminal device 1, and the camera including the CIS 11 images a range facing the display of the smartphone.

(Example of Specific Situation of Voice/Video Call Automatic Transition)

FIG. 23 is a diagram describing an example of a specific situation (scene development) until the terminal device 1 is switched from a voice call to a video call by the voice/video call automatic transition function of the terminal device 1 and an outline of the state transition of the CIS 11 and the AP 12 at that time.

In FIG. 23, a scene C1 is a scene in which the user is talking while putting the terminal device 1 in a state of a voice call on his/her ear. A scene C2 is a scene in which the user is moved to a state of browsing the display of the terminal device 1 in order to switch from the voice call to the video call (a state in which the user appears in the camera of the terminal device 1). A scene C3 is a scene in which a conversation is being held on the terminal device 1 in a state where the voice call is switched to the video call.

In scene C1, the state of the AP 12 is "Voice call". "Voice call" is a state in which the AP 12 is performing voice call processing. At the time of "Voice call", the AP 12 transmits a notification signal ("Turn sensing mode") requesting the CIS 11 to enable the sensing mode based on the motion detection and the person detection. According to a notification signal ("Turn sensing mode") from the AP 11, the CIS 11 transitions from a standby mode ("HW Standby") in which power is not supplied to a standby mode ("SW Standby") in which power is supplied, and then transitions to a motion detection mode ("Sensing Mode (Motion Detection)") in the sensing mode.

In the scene C2, since the terminal device 1 is moved from the position put on the user's ear to the front side of the user, the CIS 11 detects the motion in the image frame by the motion detection of the image recognition in the motion detection mode ("Sensing Mode (Motion Detection)"). Therefore, the CIS 11 automatically transitions from the motion detection mode ("Sensing Mode (Motion Detection) ") to the person detection mode ("Sensing Mode (Human Existence)"). The CIS 11 detects the person (user) in the image frame by the person detection of the image recognition in the person detection mode ("Sensing Mode (Human Existence)"). In a case where the person is detected in the image frame, the CIS 11 transmits a detection trigger ("Human Detected") (person detection notification signal) to the AP 12, and transitions to the standby mode ("SW Standby"). Therefore, the AP 12 transitions from the voice call processing ("Voice call") to "Switch from voice call to video call". "Switch from voice call to video call" is a state in which processing of switching from a voice call to a video call is being performed.

In the scene C3, the AP 11 transitions from "Switch from voice call to video call" to "Video call". "Video call" is a state in which video call processing is performed. When transitioning from "Switch from voice call to video call" to "Video call", the AP 11 transmits a notification signal ("Request viewing image") requesting the transmission of a viewing image with high resolution to the CIS 11. When the notification signal ("Request viewing image") from the AP 12 is received, the CIS 11 transitions from the standby mode ("SW Standby") to "Viewing Mode (Streaming)". "Viewing Mode (Streaming)" is a viewing mode in which a viewing high-resolution image with high resolution is transmitted to the AP 12. When transitioning to the viewing mode ("Viewing Mode (Streaming)"), the CIS 11 continuously transmits the viewing high-resolution image with high resolution to the P 12. The AP 12 receives the viewing high-resolution image from the CIS 11, and transmits the image to the terminal device of the other party of the video call.

(Processing Procedure of Voice/Video Call Automatic Transition)

Figure 24:
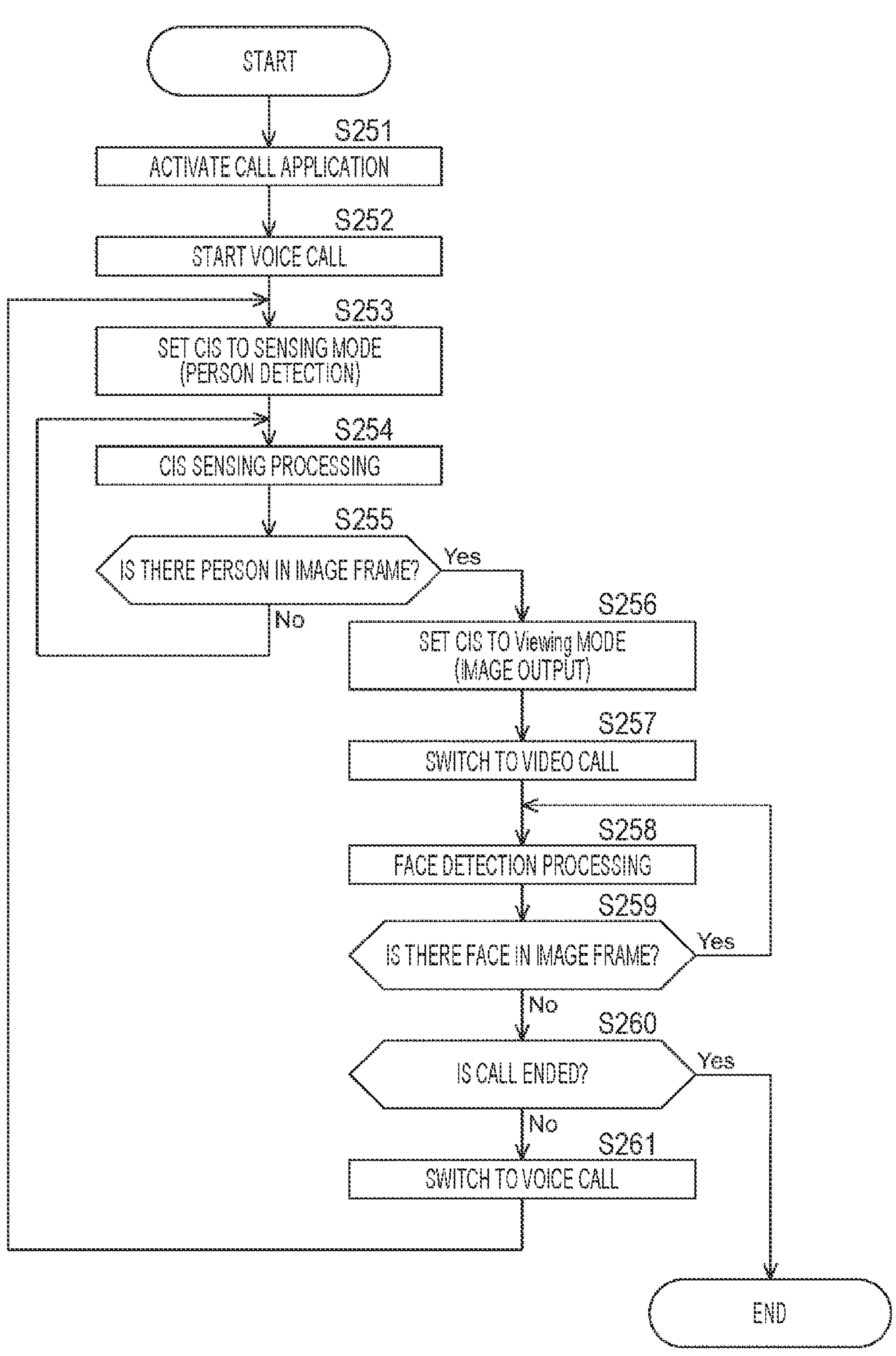
FIG. 24 is a flowchart illustrating a processing procedure performed by a CIS and an AP in a voice/video call.

FIG. 24 is a flowchart illustrating a processing procedure performed by the CIS 11 and the AP 12 in the voice/video call automatic transition. In step S251, the AP 12 activates a call application according to an instruction from the user and the like. In step S252, the AP 12 starts the voice call processing. In step S253, the AP 12 sets the CIS 11 to the constant sensing mode. In the present description, the constant sensing mode is a constant sensing mode based on only the person detection, but may be a constant sensing mode based on the motion detection and the person detection. In step S254, the CIS 11 performs person detection by image recognition (sensing processing). In step S255, the CIS 11 determines whether or not a person is detected in the image frame.

In the case of negative determination in step S255, the processing returns to step S254. In the case of affirmative determination in step S255, the processing proceeds to step S256. In step S256, the AP 12 sets the CIS 11 to the viewing mode ("Viewing Mode (Streaming)"). The viewing mode ("Viewing Mode (Streaming)") is a mode for continuously transmitting the viewing high-resolution image with high resolution to the AP 12. Note that the resolution of the image transmitted to the AP 12 in the viewing mode may be equal to or lower than that of the sensing low-resolution image.

In step S257, the AP 12 switches to the video call processing. In this case, the AP 12 transmits the viewing high-resolution image received from the CIS 11 in step S256 to the terminal device of the other party of the call. In step S258, the AP 12 performs face detection by image recognition on the viewing high-resolution image. In step S259, the AP 12 determines whether or not a face is detected in the image frame as a result of step S258.

In the case of affirmative determination in step S259, the processing returns to step S258. In the case of negative determination in step S259, the processing proceeds to step S260. In step S260, the AP 12 determines whether or not the video call is ended according to the user's operation and the like.

In the case of negative determination in step S260, the processing proceeds to step S261. In step S261, the AP 12 switches from the video call to the voice call processing. The processing returns from step S261 to step S253. In the case of affirmative determination in step S260, the processing of this flowchart is ended.

Summary of Application Example 5

According to Application Example 5, in the voice/video call automatic transition, the person detection as to whether or not the user (person) is detected in the image frame is performed, and the face detection is performed in a case where the person is detected in the image frame. A video call is set in a case where a face is detected in the image frame by the face detection. In a case where no person is detected in the image frame by the person detection, or in a case where no face is detected in the image frame by the face detection, the voice call is set. Since the person detection can be realized with lower processing capability than the face detection, the person detection can be performed by the image recognition of the CIS 11 having lower processing capability than the AP 12. Since the person detection is performed by the image recognition of the CIS 11, it is not necessary to transmit a large amount of image data from the CIS 11 to the AP 12 at the time of the person detection, and power consumption required for the transmission of the image data at the time of the person detection and power consumption consumed by the AP 12 are reduced as compared with a case where the person detection is performed by the AP 12. The AP 12 can focus on processing other than the person detection.

In the person detection by the image recognition (DNN processing) of the CIS 11, the sensitivity of the person detection (the degree of excessive detection or omission of detection) may be adjusted so as to be able to cope with occlusion of hair, a mask, glasses, or the like, appearance at the end of the image frame, visibility due to enlargement or reduction of the image frame, and the like. The person detection by the image recognition (DNN processing) of the CIS 11 may be limited to a state in which the face detection is easily performed, and the presence of a person in the image frame may be detected. The state in which the face detection is performed is, for example, a state in which the size of the person with respect to the image frame is within a range of a predetermined ratio or a state in which the person faces the front (the direction of the camera). Such limitation on the person detection may be handled by adjusting a condition for performing the notification (detection trigger) from the CIS 11 to the AP 12 that the person is detected. The adjustment of the condition may be, for example, adjustment of a threshold (lower limit value) at which it is determined that a person is detected with respect to the person detection certainty factor that is the detection result of the DNN processing.

The person detection by the image recognition of the CIS 11 may be performed in a case where a motion is detected in the image frame by the motion detection. In this case, since the motion detection can be performed with lower processing capability than the person detection, the power consumption is further reduced as compared with a case where only the person detection is performed in the CIS 11. There may be a case in which only one of the motion detection and the person detection in the CIS 11 is performed. In a case where only the motion detection is performed in the CIS 11, it is only required to notify the AP 12 that the motion is detected in the image frame as a notification equivalent to that in a case where a person is detected.

Application Example 6

Application Example 6 is an application example when the image recognition of the CIS 11 is applied to a screen luminance automatic adjustment function of the terminal device 1. The screen luminance automatic adjustment of the terminal device 1 is a function of automatically adjusting the luminance of the screen of the display according to the brightness of the environment around the terminal device 1 (display). For example, the terminal device 1 makes the luminance of the screen brighter as the surrounding environment of the display is brighter, and makes the display image easier to see. At that time, even in a case where the surrounding environment is bright, there is a case where the user is not browsing the screen, and in this case, since power consumption is wasted, the luminance of the screen is reduced. In this case, image recognition of the CIS 11 is used to detect whether or not the user is browsing the screen. Note that, for example, a smartphone is assumed as the terminal device 1, and the camera including the CIS 11 images a range facing the display of the smartphone.

(Processing Procedure of Screen Luminance Automatic Adjustment)

Figure 25:
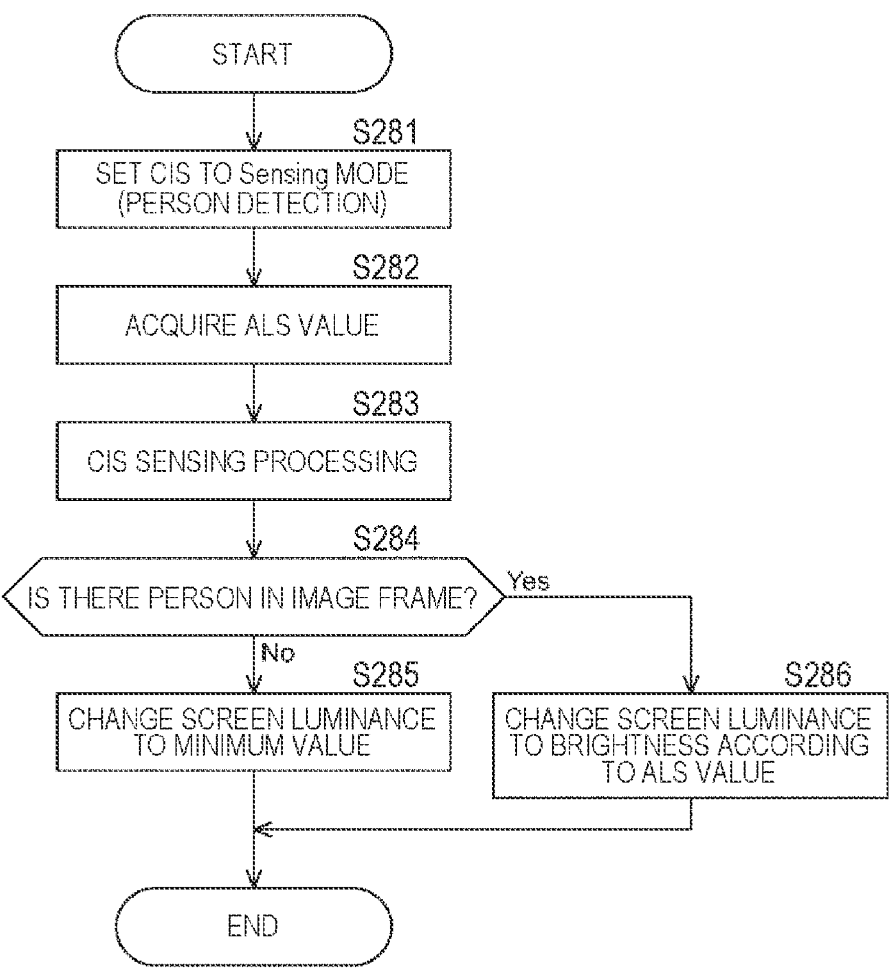
FIG. 25 is a flowchart illustrating a processing procedure performed by a CIS and an AP in screen luminance automatic adjustment.

FIG. 25 is a flowchart illustrating a processing procedure performed by the CIS 11 and the AP 12 in the screen luminance automatic adjustment. In step S281, the AP 12 sets the CIS 11 to the constant sensing mode. In the present description, the constant sensing mode is a constant sensing mode based on only the person detection, but may be a constant sensing mode based on the motion detection and the person detection. In step S282, the AP 12 acquires an ALS value from the CIS 11. The ALS value is calculated by the exposure control unit 61 of the CIS 11 in FIG. 2. In step S283, the CIS 11 performs person detection by image recognition (sensing). In step S284, the CIS 11 determines whether or not a person is detected in the image frame as a result of the image recognition. Note that step S284 may be determination processing of the AP 12 that has acquired the detection result from the CIS 11.

In the case of negative determination in step S284, the processing proceeds to step S285. In step S285, the AP 11 determines that the user is not browsing the screen of the display, and sets or changes the luminance of the screen to the minimum value. In a case where the processing of step S285 is ended, the processing of this flowchart is ended. In the case of affirmative determination in step S284, the processing proceeds to step S286. In step S286, the AP 11 determines that the user is browsing the screen of the display, and sets the luminance of the screen to an optimum luminance value on the basis of the ALS value acquired in step S282. In a case where the process of step S286 is ended, the processing of this flowchart is ended.

Summary of Application Example 6

According to Application Example 6, in the screen luminance automatic adjustment, the person detection as to whether or not the user (person) is detected in the image frame is performed, and in a case where the person is detected in the image frame, the luminance (luminance value) of the screen is adjusted on the basis of a measurement value (ALS value) of the brightness of the environment. For example, when the environment is bright, the luminance of the screen is also increased to make the screen easier to see. In a case where no person is detected in the image frame, the luminance of the screen is set to the minimum value. The minimum value of the luminance of the screen is a predetermined luminance value, for example, a lower limit value of a luminance range that can be adjusted in the screen luminance automatic adjustment. Therefore, even in a case where the environment is bright, when there is no person browsing the screen, the luminance of the screen is reduced as compared with a case where there is a person browsing the screen, so that unnecessary power consumption is reduced. Note that the ALS value may be acquired from a sensor other than the CIS 11, but by using the ALS value detected by the CIS 11, it is not necessary for the terminal device 1 to include a sensor such as an illuminance sensor other than the CIS 11 for the screen luminance automatic adjustment, and it is not necessary to operate such a sensor. Therefore, power consumption is reduced as compared with a case where a sensor is used. Since the person detection can be realized with lower processing capability, the person detection can be performed by the image recognition of the CIS 11 having lower processing capability than the AP 12. Since the person detection is performed by the image recognition of the CIS 11, it is not necessary to transmit a large amount of image data from the CIS 11 to the AP 12 at the time of the person detection, and power consumption required for the transmission of the image data at the time of the person detection and power consumption consumed by the AP 12 are reduced as compared with a case where the person detection is performed by the AP 12. The AP 12 can focus on processing other than the person detection.

In the person detection by the image recognition (DNN processing) of the CIS 11, the sensitivity of the person detection (the degree of excessive detection or omission of detection) may be adjusted so as to be able to cope with occlusion of hair, a mask, glasses, or the like, appearance at the end of the image frame, visibility due to enlargement or reduction of the image frame, and the like. The person detection by the image recognition (DNN processing) of the CIS 11 may be limited to a state in which a person is gazing at the screen, and the presence of a person in the image frame may be detected. The state in which the person is gazing at the screen is, for example, a state in which the line of sight is directed in the direction of the screen, a state in which the size of the person with respect to the image frame is within a range of a predetermined ratio, or a state in which the person faces the front (the direction of the camera). Such limitation on the person detection may be performed by performing the line-of-sight detection in the CIS 11 and reflecting the result in the result of the person detection, or may be handled by adjusting a condition for performing the notification (detection trigger) from the CIS 11 to the AP 12 that the person is detected. The adjustment of the condition may be, for example, adjustment of a threshold (lower limit value) at which it is determined that a person is detected with respect to the person detection certainty factor that is the detection result of the DNN processing. The line-of-sight detection may be performed by the AP 12 that has received a notification indicating that a person is detected in the image frame from the CIS 11.

The person detection by the image recognition of the CIS 11 may be performed in a case where a motion is detected in the image frame by the motion detection. In this case, since the motion detection can be performed with lower processing capability than the person detection, the power consumption is further reduced as compared with a case where only the person detection is performed in the CIS 11. There may be a case in which only one of the motion detection and the person detection in the CIS 11 is performed. In a case where only the motion detection is performed in the CIS 11, it is only required to notify the AP 12 that the motion is detected in the image frame as a notification equivalent to that in a case where a person is detected.

Application Example 7

Application Example 7 is an application example when the image recognition of the CIS 11 is applied to a pet camera function of the terminal device 1. The pet camera of the terminal device 1 is, for example, a function of imaging a state of a pet with a camera of the terminal device 1 installed in a room and the like. In Application Example 7, in a case where recording is performed only in a case where a pet appears in an image frame, image recognition of the CIS 11 is used to detect whether or not there is a pet in the image frame. Note that the terminal device 1 may be mainly used as a camera (imaging device) or may be used as a device other than a camera such as a smartphone. In Application Example 7, a detection target of object detection in image recognition (DNN processing) of the CIS 11 is not a person but a pet to be imaged, and the detection target varies depending on the type of the pet. In Application Example 7, it is assumed that the type of the pet is a dog, and dog detection is performed instead of person detection by image recognition of the CIS 11.

(Example of Specific Situation of Pet Camera)

FIG. 26 is a diagram describing an example of a specific situation (scene development) until the terminal device 1 transitions from a non-recording state to a recording state and from the recording state to the non-recording state by the pet camera function of the terminal device 1, and an outline of the state transition of the CIS 11 and the AP 12 at that time.

In FIG. 26, scenes C1 to C3 are scenes where a part of a room is imaged by a camera of the terminal device 1 as an image frame by the terminal device 1 fixed to a floor of the room and the like. In the scene C1, imaging by the camera of the terminal device 1 is started, and at that time, the dog as a pet is out of the image frame. In the scene C2, the dog enters the image frame, and in the scene C3, the dog is out of the image frame again.

In the scene C1, the state of the AP 12 is a state ("CIS activation setting") in which activation setting of the CIS 11 is performed, and the state of the CIS 11 is a standby mode ("HW Standby"). The AP 12 transitions to the sleep mode ("AP Sleep"), and at that time, the AP 12 transmits a notification signal ("Turn sensing mode") requesting the CIS 11 to enable the sensing mode based on the motion detection and the dog detection. According to a notification signal ("Turn sensing mode") from the AP 12, the CIS 11 transitions from the standby mode ("HW Standby") to the standby mode ("SW Standby"), and then transitions to a motion detection mode ("Sensing Mode (Motion Detection)") in the sensing mode based on the motion detection and the dog detection.

In the scene C2, the CIS 11 detects a motion in the image frame when the dog enters the image frame in the motion detection mode ("Sensing Mode (Motion Detection)"). Therefore, the CIS 11 automatically transitions from the motion detection mode ("Sensing Mode (Motion Detection)") to a dog detection mode ("Sensing Mode (Dog Existence)"). The dog detection mode ("Sensing Mode (Dog Existence)") indicates a mode for detecting a dog instead of detecting a person in the person detection mode.

In a case where a dog is detected in the image frame in the dog detection mode ("Sensing Mode (Dog Existence)"), the CIS 11 transmits a detection trigger ("Dog Detected") (dog detection notification signal) to the AP 12.

Therefore, the AP 12 is activated from the sleep mode ("AP Sleep") (transitions to the active mode), and transitions to a recording mode ("Recording"). In a case where the AP 12 transitions to the recording mode ("Recording"), the AP 12 transmits a notification signal for requesting the CIS 11 to enable the viewing mode ("Viewing Mode"). In a case where the CIS 11 receives the notification signal ("Request viewing image") requesting the enabling of the viewing mode from the AP 12, the CIS 11 transitions to the standby mode ("SW Standby"), and then transitions to the viewing mode ("Viewing Mode (Streaming)"). The viewing mode ("Viewing Mode (Streaming)") is a mode for continuously transmitting the viewing high-resolution image with high resolution to the AP 12. When transitioning to the viewing mode ("Viewing Mode (Streaming)"), the CIS 11 continuously transmits the viewing high-resolution image with high resolution to the AP 12. The AP 12 receives the viewing high-resolution image from the CIS 11, and stores the received viewing high-resolution image in the storage unit.

At the same time as the processing of storing the viewing high-resolution image in the storage unit, the AP 12 performs dog detection by image recognition (DNN processing) and the like on the viewing high-resolution image, and detects whether or not the dog is present in the image frame.

In the scene C3, since the AP 12 does not detect the dog in the image recognition (dog detection) on the viewing high-resolution image, the AP 12 stops the recording in the recording mode ("Recording"), and transitions to a state of "CIS activation setting". The AP 12 performs activation setting of the CIS 11 by "CIS activation setting", and then transitions to the sleep mode ("AP Sleep"). When transitioning to the sleep mode ("AP Sleep"), the AP 12 transmits a notification signal ("Turn sensing mode") requesting the CIS 11 to enable the sensing mode based on the motion detection and the dog detection. According to a notification signal ("Turn sensing mode") from the AP 12, the CIS 11 transitions from the standby mode ("HW Standby") to the standby mode ("SW Standby"), and then transitions to a motion detection mode ("Sensing Mode (Motion Detection)") in the sensing mode based on the motion detection and the dog detection.

(Processing Procedure of Pet Camera)

Figure 27:
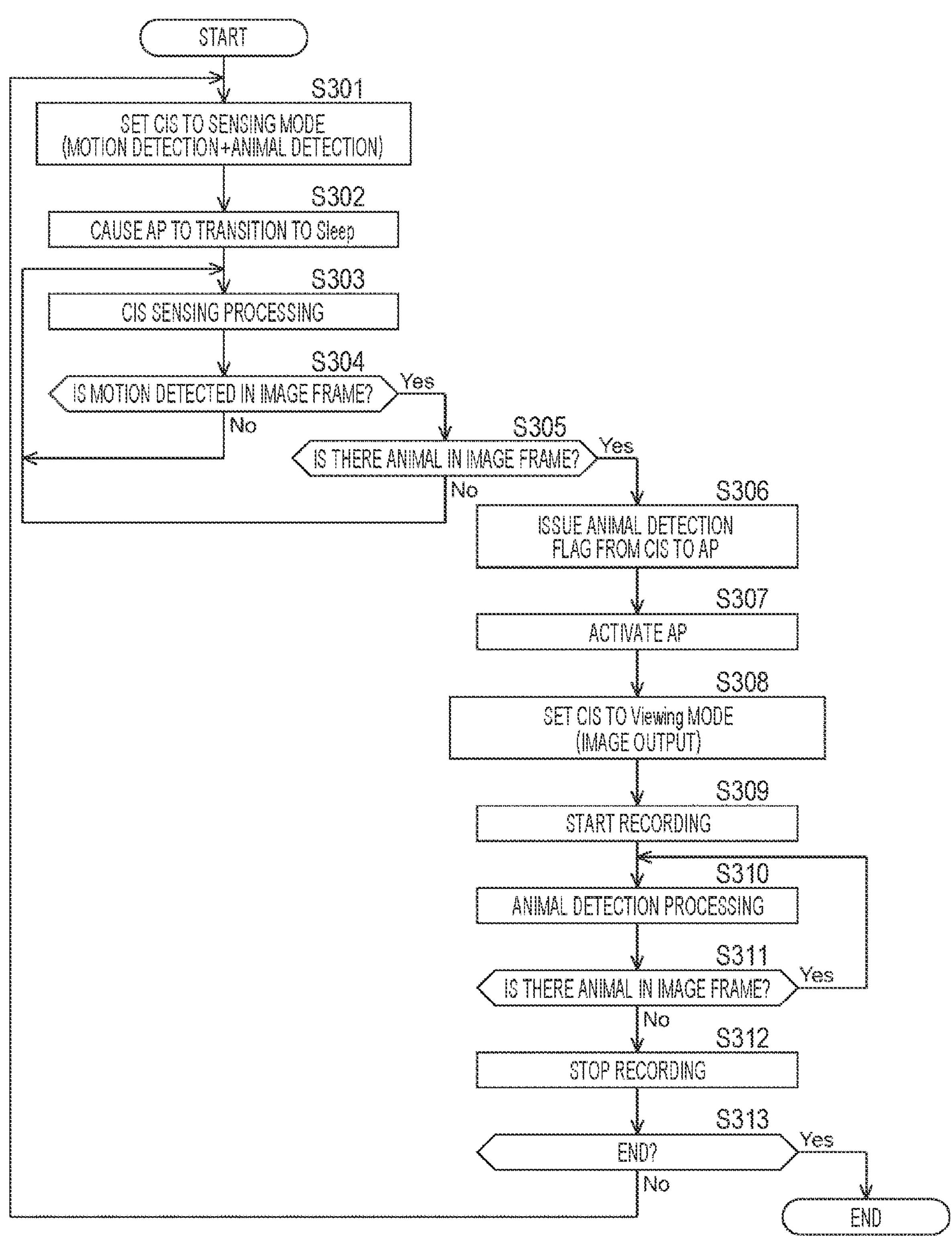
FIG. 27 is a flowchart illustrating a processing procedure performed by a CIS and an AP in the pet camera.

FIG. 27 is a flowchart illustrating a processing procedure performed by the CIS 11 and the AP 12 in the pet camera.

In step S301, the AP 12 sets the CIS 11 to the sensing mode based on the motion detection and animal detection. In the present description, the pet is a dog in FIG. 26, but is an animal in the present description. In step S302, the AP 12 transitions to the sleep mode. In step S303, the CIS 11 performs motion detection by image recognition in the sensing mode based on the motion detection and the animal detection. In step S304, the CIS 11 determines whether or not a motion is detected in the image frame.

In the case of negative determination in step S304, the processing returns to step S303. In the case of affirmative determination in step S304, the processing proceeds to step S305. In step S305, the CIS 11 performs the animal detection by image recognition in the sensing mode based on the motion detection and the animal detection, and determines whether or not an animal is detected in the image frame. In the case of negative determination in step S305, the processing returns to step S303. In the case of affirmative determination in step S305, the processing proceeds to step S306.

In step S306, the CIS 11 transmits a detection flag to the AP 12. In step S307, the AP 12 transitions from the sleep mode to the active mode, and is activated. In step S308, the AP 12 sets the CIS 11 to the viewing mode ("Viewing Mode (Streaming)"). In step S309, the AP 12 starts recording of the viewing high-resolution image from the CIS 11. In step S310, the AP 12 performs animal detection by image recognition on the viewing high-resolution image from the CIS 11. In step S311, the AP 12 determines whether or not an animal is detected in the image frame as a result of the animal detection in step S310. In the case of affirmative determination in step S311, the processing returns to step S310. In the case of negative determination in step S311, the processing proceeds to step S312. In step S312, the AP 12 stops the recording. In step S313, it is determined whether or not the pet camera is to be ended according to the user's instruction and the like. In the case of negative determination in step S313, the processing returns to step S301. In the case of affirmative determination in step S314, the processing of this flowchart is ended.

Summary of Application Example 7

According to Application Example 7, in the pet camera, the animal detection as to whether or not the pet (animal) is detected in the image frame is performed, recording is performed in a case where the animal is detected in the image frame, and recording is not performed in a case where the animal is not detected in the image frame. Since the animal detection can be realized with lower processing capability, the person detection can be performed by the image recognition of the CIS 11 having lower processing capability than the AP 12, and the power consumption can also be reduced. Since animal detection is performed by image recognition of the CIS 11 other than during recording, it is not necessary to transmit a large amount of image data from the CIS 11 to the AP 12 at the time of animal detection, and the AP 12 only needs to stand by in a power saving state such as a sleep mode. Therefore, power consumption required for the transmission of image data at the time of animal detection and power consumption consumed by the AP 12 are reduced as compared with a case where the animal detection is performed by the AP 12. Note that the target detected by the animal detection may be a person.

In the animal detection by the image recognition (DNN processing) of the CIS 11, the sensitivity of the animal detection (the degree of excessive detection or omission of detection) may be adjusted so as to be able to cope with occlusion, visibility, and the like. The animal detection by the image recognition (DNN processing) of the CIS 11 may be limited to a certain state such that the presence of a person in the image frame is detected. The certain state is, for example, a state in which the size of the animal with respect to the image frame is within a range of a predetermined ratio, a state in which the animal faces the front (the direction of the camera), and the like. Such limitation on the animal detection may be handled by adjusting a condition for performing the notification (detection trigger) from the CIS 11 to the AP 12 that the animal is detected. The adjustment of the condition may be, for example, adjustment of a threshold (lower limit value) at which it is determined that an animal is detected with respect to the animal detection certainty factor that is the detection result of the DNN processing.

The animal detection by the image recognition of the CIS 11 is performed in a case where a motion is detected in the image frame by the motion detection. Since the motion detection can be performed with lower processing capability than the animal detection, the power consumption is further reduced as compared with a case where only the animal detection is performed in the CIS 11. There may be a case in which only one of the motion detection and the animal detection in the CIS 11 is performed. In a case where only the motion detection is performed in the CIS 11, it is only required to notify the AP 12 that the motion is detected in the image frame as a notification equivalent to that in a case where an animal is detected.

Application Example 8

Application Example 8 is an application example when the image recognition of the CIS 11 is applied to a security door phone function of the terminal device 1. The security door phone of the terminal device 1 is a function of imaging a person outside the door with a camera installed in the periphery of the door, unlocking the door when the imaged person is a person who is authenticated in advance, and notifying a person in the room with an alarm and the like without unlocking the door when the imaged person is not authenticated. In Application Example 8, image recognition of the CIS 11 is used to determine whether or not there is a person in the image frame. Note that the terminal device 1 is assumed to be a device constituting the security door phone.

(Example of Specific Situation of Security Door Phone)

FIG. 28 is a diagram describing an example of a specific situation (scene development) in which the door is unlocked or not unlocked by the security door phone function of the terminal device 1 and an outline of state transition of the CIS 11 and the AP 12 at that time.

In FIG. 28, a scene C1 is a case where there is no change in the image frame of the camera installed in the periphery of the door. Scenes C2, C3, and C4 selectively occur with respect to the scene C1, respectively, and the scene C2 is a scene in which an authenticated person is detected in the image frame. The authenticated person is a person whose face for the face authentication is registered in advance, and represents a person who is permitted to unlock the door. The scene C3 is a scene in which an unauthenticated person is detected in the image frame. The unauthenticated person represents a person other than the authenticated person. The scene C4 is a scene in which only a moving body other than a person is detected in the image frame after the scene C2 or the scene C3.

In the scene C1, the state of the AP 12 is a state ("CIS activation setting") in which activation setting of the CIS 11 is performed, and the state of the CIS 11 is a standby mode ("HW Standby"). The AP 12 transitions to the sleep mode ("AP Sleep"), and at that time, the AP 12 transmits a notification signal ("Turn sensing mode") requesting the CIS 11 to enable the sensing mode based on the motion detection and the person detection. According to a notification signal ("Turn sensing mode") from the AP 12, the CIS 11 transitions from the standby mode ("HW Standby") to the standby mode ("SW Standby"), and then transitions to a motion detection mode ("Sensing Mode (Motion Detection)") in the sensing mode based on the motion detection and the person detection.

In the scene C2, the CIS 11 detects a motion in the image frame when the authenticated person enters the image frame in the motion detection mode ("Sensing Mode (Motion Detection)"). Therefore, the CIS 11 automatically transitions from the motion detection mode ("Sensing Mode (Motion Detection)") to the person detection mode ("Sensing Mode (Human Existence)"). In a case where a person is detected in the image frame in the person detection mode ("Sensing Mode (Human Existence)"), the CIS 11 transmits the detection trigger ("Human Detected") (person detection notification signal) to the AP 12. Therefore, the AP 12 is activated from the sleep mode ("AP Sleep") (transitions to the active mode), and transitions to the face authentication mode ("Face Detection, Face Identification").

In a case where the AP 12 transitions to the face authentication mode ("Face Detection, Face Identification"), the AP 12 transmits a notification signal for requesting the CIS 11 to enable the sensing mode for sensing image output ("Sensing image streaming"). Therefore, the CIS 11 transitions to the standby mode ("SW Standby"), and then transitions to the sensing mode for sensing image output ("Sensing image streaming"). In a case where the CIS 11 transitions to the sensing mode for sensing image output ("Sensing image streaming"), the CIS 11 continuously transmits sensing image with low resolution (sensing low-resolution image) to the AP 12. In the face authentication mode, the AP 12 performs face detection on the sensing image from the CIS 11 prior to the face authentication, and collates the detected face with the authenticated face. As a result, since the person detected in the image frame has been authenticated, the AP 12 succeeds in the face authentication, and unlocks the door.

In the scene C3, since the person detected in the image frame is unauthenticated, the AP 12 fails in the face authentication, does not unlock the door (or locks the door), and notifies the person in the house that the unauthenticated person visits with an alarm and the like. In the scene C4, the state transitions from the face authentication mode to the "CIS activation setting" state. The AP 12 performs activation setting of the CIS 11 by "CIS activation setting", and then transitions to the sleep mode ("AP Sleep"). When transitioning to the sleep mode ("AP Sleep"), the AP 12 transmits a notification signal ("Turn sensing mode") requesting the CIS 11 to enable the sensing mode based on the motion detection and the person detection. According to a notification signal ("Turn Sensing mode") from the AP 12, the CIS 11 transitions from the sensing mode for sensing image output ("Sensing image streaming") to the standby mode ("SW Standby"), and then transitions to a motion detection mode ("Sensing Mode (Motion Detection)") in the sensing mode based on the motion detection and the person detection. In the scene C4, since no person is detected in the image frame, the motion detection mode ("Sensing Mode (Motion Detection)") and the person detection mode ("Sensing Mode (Human Existence)") in the sensing mode are repeated.

(Processing Procedure of Security Door Phone)

Figure 29:
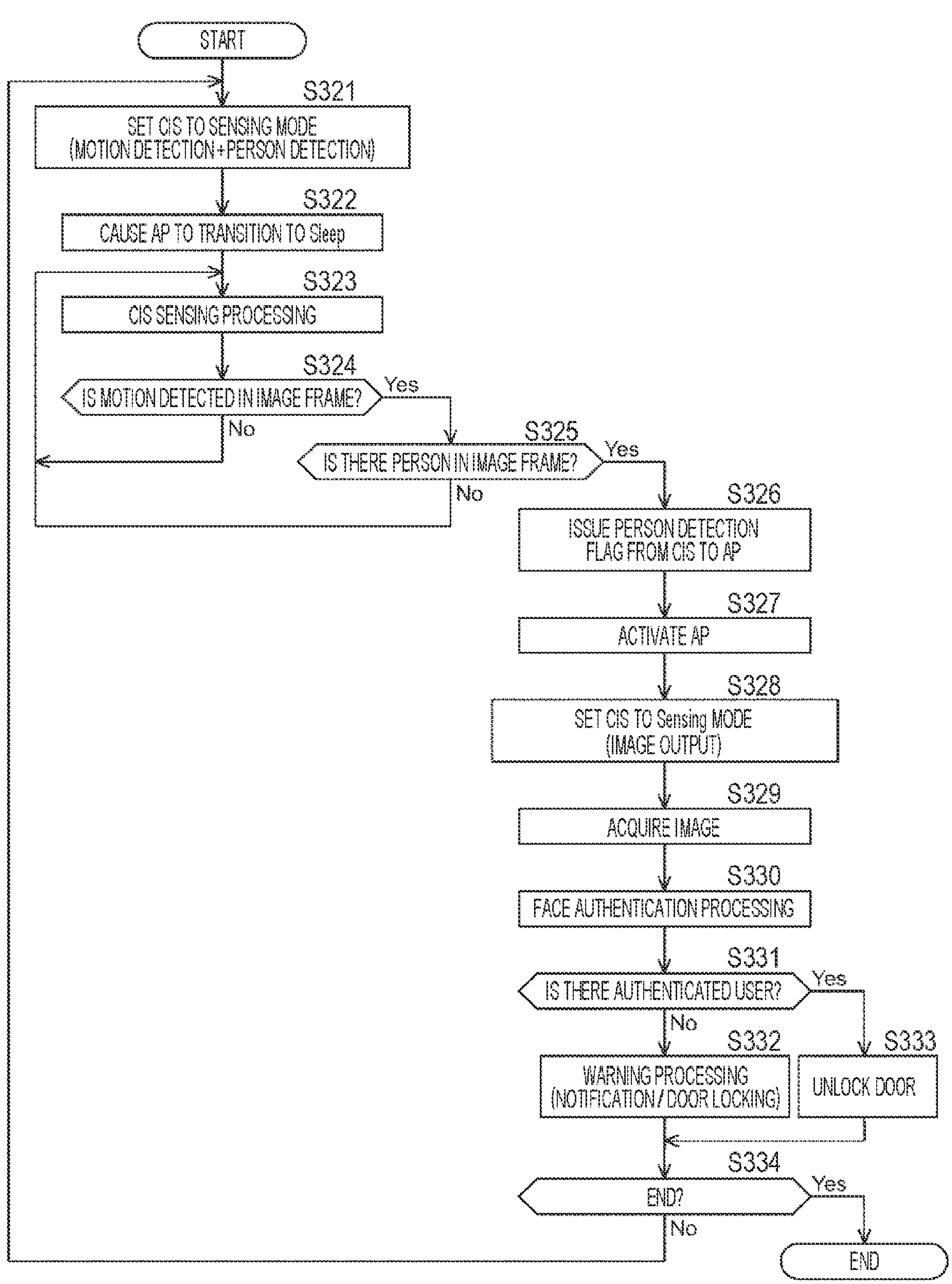
FIG. 29 is a flowchart illustrating a processing procedure performed by a CIS and an AP in the security door phone.

FIG. 29 is a flowchart illustrating a processing procedure performed by the CIS 11 and the AP 12 in the security door phone. In step S321, the AP 12 sets the CIS 11 to the sensing mode based on the motion detection and the person detection. In step S322, the AP 12 enters the sleep mode. In step S323, the CIS 11 performs the motion detection and the person detection in the sensing mode based on the motion detection and the person detection. In step S324, the CIS 11 determines whether or not a motion is detected in the image frame, using the motion detection. In the case of negative determination in step S324, the processing returns to step S323. In the case of affirmative determination in step S324, the processing proceeds to step S325. In step S325, the CIS 11 determines whether or not a person is detected in the image frame, using the person detection. In the case of negative determination in step 325, the processing proceeds to step S324. In the case of affirmative determination in step S325, the processing proceeds to step S326.

In step S326, the CIS 11 sets a detection flag indicating that a person is detected to the AP 12 (transmits a detection trigger). In step S327, the AP 12 is activated by the detection flag in step S326. In step S328, the AP 12 sets the CIS 11 to the sensing mode for sensing image output. In step S329, the AP 12 acquires the sensing image transmitted from the CIS 11. In step S330, the AP 12 performs face authentication on the basis of the sensing image acquired in step S329. In step S331, the AP 12 determines whether or not there is an authenticated person in the image frame on the basis of the result of the face authentication in step S330. In the case of negative determination in step S331, the processing proceeds to step S332. In step S332, the AP 12 performs warning processing. Examples of the warning processing include processing of locking a door, processing of sounding an alarm, processing of notifying a security company, and the like. The processing proceeds to step S334.

In the case of affirmative determination in step S331, the processing proceeds to step S333. In step S333, the AP 12 unlocks the door. The processing proceeds to step S334. In step S334, the AP 12 determines whether or not to end the processing according to the user's instruction and the like. In the case of negative determination in step S334, the processing returns to step S321. In the case of affirmative determination in step S334, the processing of this flowchart is ended.

Summary of Application Example 8

According to Application Example 8, in the security door phone, the person detection as to whether or not the user (person) is detected in the image frame is performed, and the face authentication is performed only in a case where the person is detected in the image frame. In a case where the face authentication succeeds, the door is unlocked (unlocked). In a case where no person is detected in the image frame or in a case where the face authentication has failed, the door is not unlocked. Since the person detection can be realized with lower processing capability than the face authentication, the person detection can be performed by the image recognition of the CIS 11 having lower processing capability than the AP 12, and the power consumption can also be reduced. Since person detection is performed by image recognition of the CIS 11, it is not necessary to transmit a large amount of image data from the CIS 11 to the AP 12 at the time of person detection, and the AP 12 only needs to stand by in a power saving state such as a sleep mode. Therefore, power consumption required for the transmission of image data at the time of person detection and power consumption consumed by the AP 12 are reduced as compared with a case where the person detection is performed by the AP 12. Note that the target to be locked is not limited to a door of a house, and may be any openable and closable opening and closing unit such as a door of an automobile, a door of an entrance of a building, a door of a locker, and a window of a house.

In the person detection by the image recognition (DNN processing) of the CIS 11, the sensitivity of the person detection (the degree of excessive detection or omission of detection) may be adjusted so as to be able to cope with occlusion of hair, a mask, glasses, or the like, appearance at the end of the image frame, visibility due to enlargement or reduction of the image frame, and the like. The person detection by the image recognition (DNN processing) of the CIS 11 may be limited to a state in which the face authentication is easily performed, and the presence of a person in the image frame may be detected. The state in which the face authentication is easily performed is, for example, a state in which the size of the person with respect to the image frame is within a range of a predetermined ratio or a state in which the person faces the front (the direction of the camera). Such limitation on the person detection may be handled by adjusting a condition for performing the notification (detection trigger) from the CIS 11 to the AP 12 that the person is detected. The adjustment of the condition may be, for example, adjustment of a threshold (lower limit value) at which it is determined that a person is detected with respect to the person detection certainty factor that is the detection result of the DNN processing.

The person detection by the image recognition of the CIS 11 is performed in a case where a motion is detected in the image frame by the motion detection. Since the motion detection can be performed with lower processing capability than the person detection, the power consumption is further reduced as compared with a case where only the person detection is performed in the CIS 11. There may be a case in which only one of the motion detection and the person detection in the CIS 11 is performed. In a case where only the motion detection is performed in the CIS 11, it is only required to notify the AP 12 that the motion is detected in the image frame as a notification equivalent to that in a case where a person is detected.

Application Example 9

Application Example 9 is an application example when the image recognition of the CIS 11 is applied to an application activation function using a 1D code (one-dimensional code) or a 2D code (two-dimensional code) of the terminal device 1. Note that, in the description of Application Example 9, a case where the image recognition of the CIS 11 is applied to the application activation function using the 2D code will be described. Even in a case where the application is activated using a 1D code such as a barcode instead of a 2D code or using an arbitrary code of the 1D code and the 2D code, the image recognition of the CIS 11 can be applied similarly to the present description. The application activation using the 2D code of the terminal device 1 is a function of activating an application associated with a 2D code in a case where the 2D code is detected in an image frame of a captured image of a camera (CIS 11) included in the terminal device 1. In Application Example 9, the image recognition of the CIS 11 is used to determine whether or not a 2D code is detected in the image frame.

In Application Example 9, the detection target of the object detection in the image recognition (DNN processing) of the CIS 11 is not a person but a 2D code. In Application Example 9, it is assumed that 2D code detection is performed instead of the person detection by the image recognition of the CIS 11. Note that, a smartphone is assumed as the terminal device 1, for example. The camera including the CIS 11 may be a camera that images a rear surface side of the display instead of imaging a range facing the display of the smartphone.

(Example of Specific Situation of Application Activation Using 2D Code)

Figure 30:
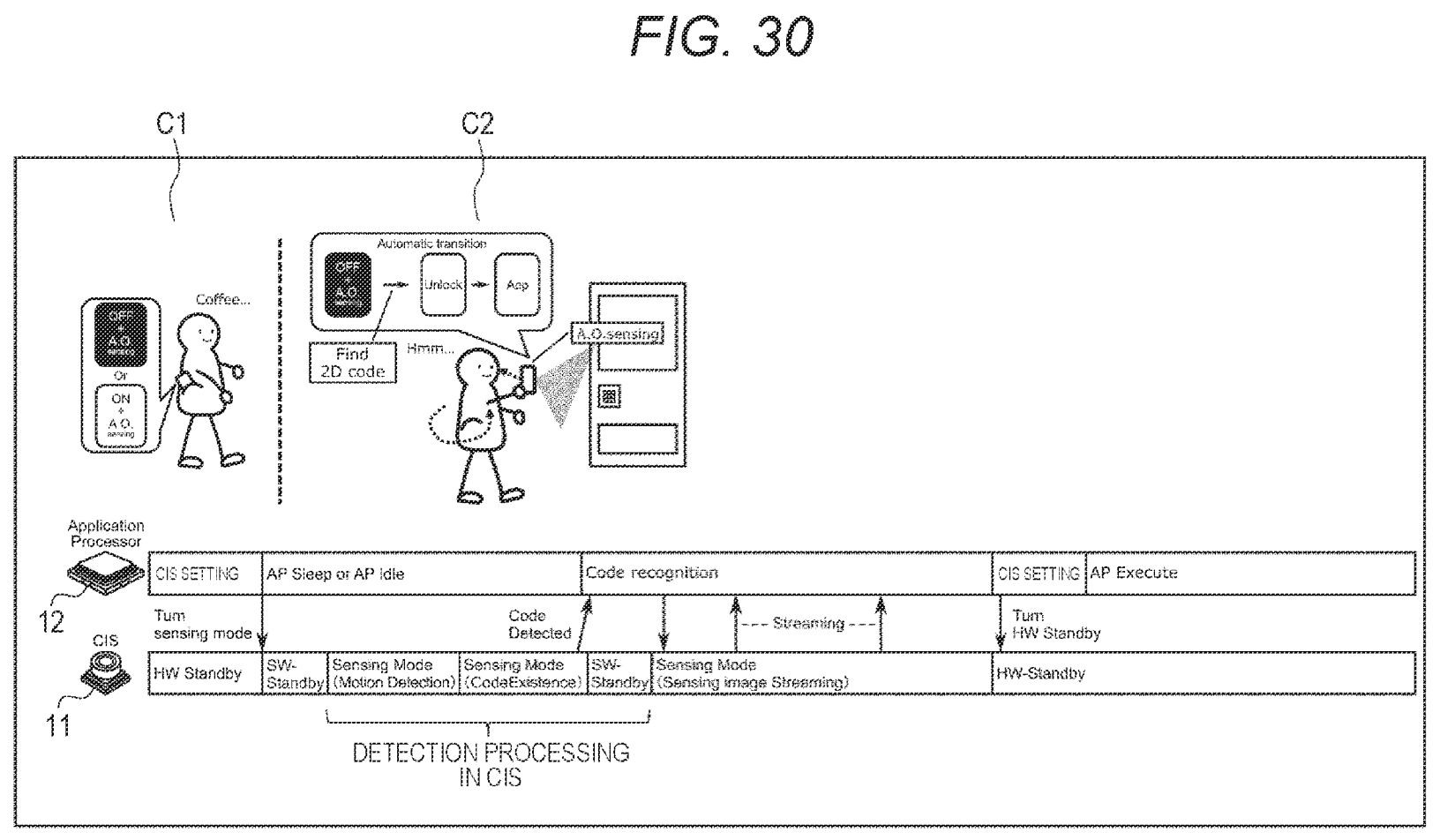

FIG. 30 is a diagram describing an example of a specific situation (scene development) until the application associated with the 2D code is activated by the application activation function using the 2D code of the terminal device 1 and an outline of the state transition of the CIS 11 and the AP 12 at that time. In FIG. 30, a scene C1 is a scene in which the user is walking by carrying the terminal device 1 in the standby state or the activated state. A scene C2 is a scene in which, when the user purchases drinking water at a vending machine, a 2D code displayed on the vending machine is imaged by the camera of the terminal device 1, and an application (payment application and the like) associated with the 2D code is activated.

In the scene C1, the state of the AP 12 is a state ("CIS activation setting") in which activation setting of the CIS 11 is performed, and the state of the CIS 11 is a standby mode ("HW Standby"). The AP 12 transitions to the sleep mode ("AP Sleep") or the idle mode ("AP Idle"), and at that time, the AP 12 transmits a notification signal ("Turn sensing mode") requesting the CIS 11 to enable the sensing mode based on the motion detection and the 2D code detection. According to a notification signal ("Turn sensing mode") from the AP 12, the CIS 11 transitions from the standby mode ("HW Standby") to the standby mode ("SW Standby"), and then transitions to a motion detection mode ("Sensing Mode (Motion Detection)") in the sensing mode based on the motion detection and the 2D code detection.

In the scene C2, the CIS 11 detects a motion in the image frame by the user moving the terminal device 1 to the vicinity of the position of the 2D code of the vending machine in the motion detection mode ("Sensing Mode (Motion Detection)"). Therefore, the CIS 11 automatically transitions from the motion detection mode ("Sensing Mode (Motion Detection)") to a 2D code detection mode ("Sensing Mode (Code Existence)"). In a case where a 2D code is detected in the image frame in the 2D code person detection mode ("Sensing Mode (Human Existence)"), the CIS 11 transmits the detection trigger ("Code Detected") (detection notification signal) to the AP 12. Therefore, the AP 12 is activated (transitions to the active mode) from the sleep mode ("AP Sleep") or the idle mode ("AP Idle"), and transitions to a 2D code authentication mode ("Code recognition").

In a case where the AP 12 transitions to the 2D code authentication mode ("Code recognition"), the AP 12 transmits a notification signal for requesting the CIS 11 to enable the sensing mode for sensing image output ("Sensing image streaming"). Therefore, the CIS 11 transitions to the standby mode ("SW Standby"), and then transitions to the sensing mode for sensing image output ("Sensing image streaming"). In a case where the CIS 11 transitions to the sensing mode for sensing image output ("Sensing image streaming"), the CIS 11 continuously transmits sensing image with low resolution (sensing low-resolution image) to the AP 12. In the 2D code authentication mode, the AP 12 performs 2D code analysis on the sensing image from the CIS 11 prior to the authentication. As a result, the AP 12 activates the application associated with the 2D code in the image frame after the transition to the "CIS setting" ("App Execute"). After setting the CIS 11 by "CIS setting", the AP 12 transmits a notification signal ("Turn HW Standby") requesting the CIS 11 to transition to the standby mode ("HW Standby") when activating the application. The CIS 11 transitions to the standby mode ("HW Standby") according to the notification signal ("Turn HW Standby") from the AP 12.

(Processing Procedure of Application Activation Using 2D Code)

Figure 31:
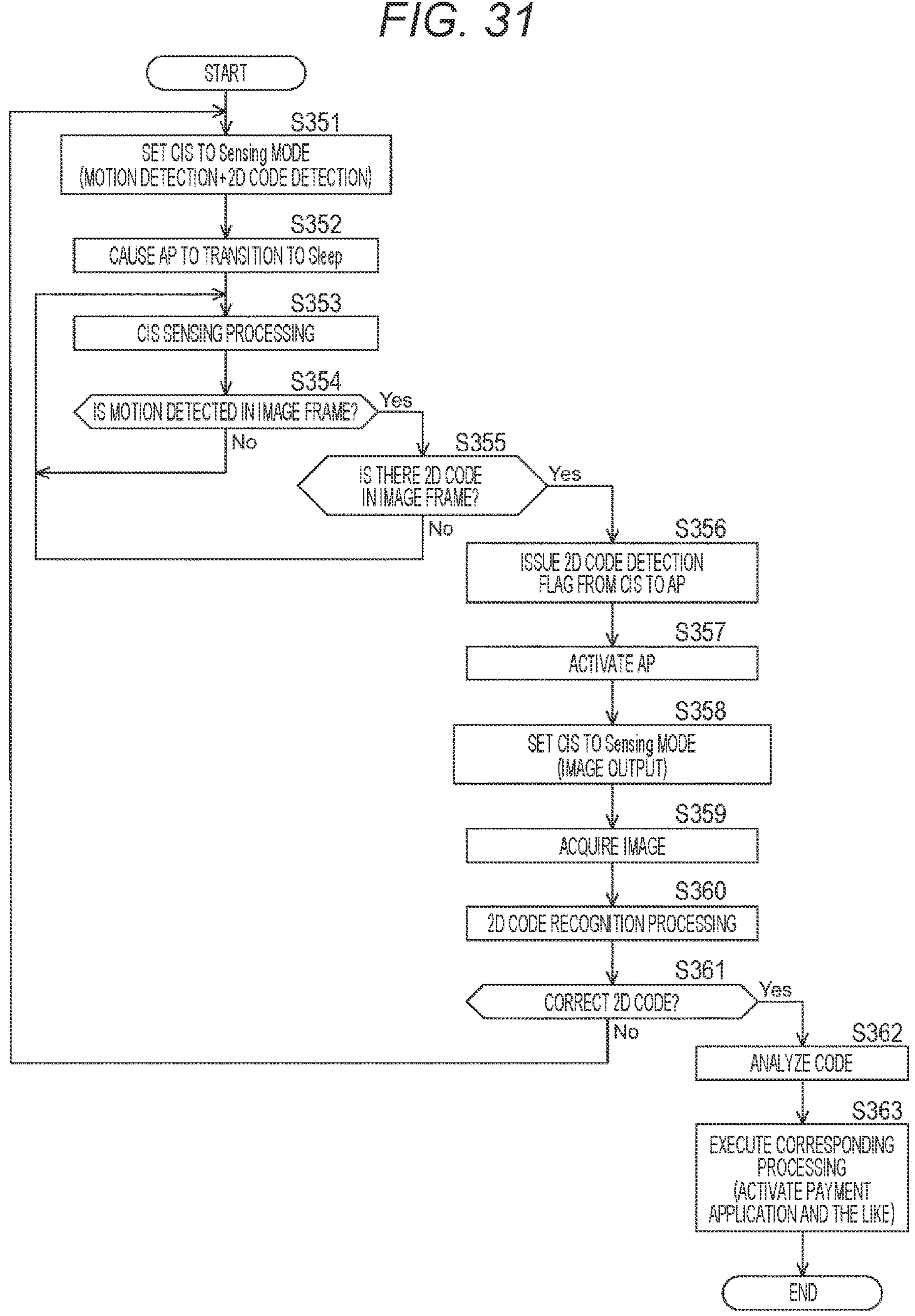
FIG. 31 is a flowchart illustrating a processing procedure performed by a CIS and an AP in an application activation function using a 2D code.

FIG. 31 is a flowchart illustrating a processing procedure performed by the CIS 11 and the AP 12 in the application activation using a 2D code. In step S351, the AP 12 sets the CIS 11 to the sensing mode based on the motion detection and the code detection. In step S352, the AP 12 enters the sleep mode. In step S353, the CIS 11 performs the motion detection and the 2D code detection in the sensing mode based on the motion detection and the code detection. In step S354, the CIS 11 determines whether or not a motion is detected in the image frame, using the motion detection. In the case of negative determination in step S354, the processing returns to step S353. In the case of affirmative determination in step S354, the processing proceeds to step S355. In step S355, the CIS 11 determines whether or not a 2D code is detected in the image frame, using the 2D code detection.

In the case of negative determination in step S355, the processing returns to step S353. In the case of affirmative determination in step S355, the processing proceeds to step S356. In step S356, the CIS 11 transmits a detection trigger indicating that a 2D code is detected to the AP 12. In step S357, the AP 12 is activated by the detection flag in step S356. In step S358, the AP 12 sets the CIS 11 to the sensing mode for sensing image output. In step S359, the AP 12 acquires the sensing image transmitted from the CIS 11. In step S360, the AP 12 performs 2D code recognition processing on the basis of the sensing image acquired in step S359.

In step S361, the AP 12 determines whether or not the 2D code recognized in step S360 is a correct 2D code. In the case of negative determination in step S361, the processing returns to step S351. In the case of affirmative determination in step S361, the processing proceeds to step S362. In step S362, the AP 12 analyzes the 2D code. In step S363, the AP 12 executes processing corresponding to the 2D code. For example, the AP 12 activates an application (payment application and the like) associated with the 2D code. In a case where the process of step S363 is ended, the processing of this flowchart is ended.

Summary of Application Example 9

According to Application Example 9, in the application activation using the 2D code (or 1D code, omitted hereinafter), code detection as to whether or not the 2D code is detected in the image frame is performed, and code recognition (analysis) is performed only in a case where the 2D code is detected in the image frame. The content of the 2D code is read by code recognition, and in a case where there is an application (processing) corresponding to the 2D code, the application (or processing) is executed. In a case where the 2D code is not detected by the code detection, in a case where the content of the 2D code cannot be read by the 2D code recognition, or in a case where there is no application (processing) corresponding to the 2D code, the application (processing) is not executed. Since the code detection can be realized with lower processing capability than the code recognition, the person detection can be performed by the image recognition of the CIS 11 having lower processing capability than the AP 12, and the power consumption can also be reduced. Since code detection is performed by image recognition of the CIS 11, it is not necessary to transmit a large amount of image data from the CIS 11 to the AP 12 at the time of code detection, and the AP 12 only needs to stand by in a power saving state such as a sleep mode. Therefore, power consumption required for the transmission of image data at the time of code detection and power consumption consumed by the AP 12 are reduced as compared with a case where the code detection is performed by the AP 12.

The code detection by the image recognition of the CIS 11 is performed in a case where a motion is detected in the image frame by the motion detection. Since the motion detection can be performed with lower processing capability than the code detection, the power consumption is further reduced as compared with a case where only the code detection is performed in the CIS 11. There may be a case in which only one of the motion detection and the code detection in the CIS 11 is performed. In a case where only the motion detection is performed in the CIS 11, it is only required to notify the AP 12 that the motion is detected in the image frame as a notification equivalent to that in a case where a 2D code is detected.

<Program>

The above-described series of processing in the CIS 11 and the AP 12 can be executed by hardware or can be executed by software. In a case where a series of processing is executed by the software, a program constituting the software is installed on a computer. Here, the computer includes a computer incorporated in dedicated hardware, a general-purpose personal computer capable of executing various functions by installing various programs, and the like, for example.

The present technology can also have the following configurations.

(1)

An information processing apparatus including:

an image recognition unit that an image sensor has, and detects that an image of a predetermined detection target is included in a captured image captured by the image sensor; and a processing unit that acquires an output image output from the image sensor, executes predetermined processing on the output image, and causes the image sensor to output the output image in a case where the image recognition unit detects that the image of the detection target is included.

(2)

The information processing apparatus described in (1), in which the image recognition unit sets the detection target as a person.

(3)

The information processing apparatus described in (2), in which the processing unit is in a power saving state in a case where the image recognition unit does not detect that the image of the detection target is included.

(4)

The information processing apparatus described in (2) or (3), in which the processing unit executes processing of detecting an image of a face included in the output image.

(5)

The information processing apparatus described in any one of (2) to (4), in which the processing unit performs face authentication for authenticating that an image of a face included in the output image is a face of a specific person.

(6)

The information processing apparatus described in (5), in which the processing unit unlocks an own device in a case where the face authentication succeeds.

(7)

The information processing apparatus described in (5) or (6), in which the processing unit enables locking of an own device in a case where the image recognition unit does not detect that the image of the person is included.

(8)

The information processing apparatus described in (5), in which the processing unit unlocks an opening and closing unit in a case where the face authentication succeeds.

(9)

The information processing apparatus described in (2), in which the processing unit detects an orientation of the image of the face included in the output image.

(10)

The information processing apparatus described in (9), in which the processing unit rotates an image displayed on a display unit on the basis of the orientation of the image of the face.

(11)

The information processing apparatus described in (10), in which the processing unit rotates the image displayed on the display unit on the basis of a posture of an own device in a case where the image recognition unit does not detect that the image of the person is included.

(12)

The information processing apparatus described in (2), in which the processing unit performs processing of preventing peeping in a case where the image recognition unit detects that images of a plurality of persons are included.

(13)

The information processing apparatus described in (12), in which the processing unit performs processing of preventing the peeping only in a case where the plurality of persons is gazing at the image of the display unit.

(14)

The information processing apparatus described in (2), in which the processing unit transmits the output image to another party of a video call.

(15)

The information processing apparatus described in (14) in which the processing unit performs voice call processing in a case where it is detected that the image of the face of the person is not included in the output image.

(16)

The information processing apparatus described in (1), in which the image recognition unit sets the detection target as an animal, and the processing unit stores the output image in a storage unit.

(17)

The information processing apparatus described in (16), in which the processing unit stops the storing of the output image in the storage unit in a case where it is detected that an image of the animal is not included in the output image.

(18)

The information processing apparatus described in (1), in which the image recognition unit sets the detection target as at least one code of one-dimensional code or a two-dimensional code, and the processing unit performs processing corresponding to the code.

(19)

The information processing apparatus described in (18), in which the processing unit activates an application corresponding to the code.

(20)

The information processing apparatus described in (18) or (19), in which the processing unit performs processing of analyzing the code included in the output image.

(21)

An information processing apparatus including:

an image recognition unit that an image sensor has, and detects whether or not an image of a predetermined detection target is included in a captured image captured by the image sensor; and a processing unit that executes predetermined processing on the basis of a result that is output from the image sensor and is detected by the image recognition unit.

(22)

The information processing apparatus described in (21), in which the image recognition unit sets the detection target as a person.

(23)

The information processing apparatus described in (22), in which the processing unit stops reproduction of a video in a case where the image recognition unit does not detect that the image of the person is included.

(24)

The information processing apparatus described in (23), in which the processing unit resumes the reproduction of the video in a case where the image recognition unit detects that the image of the person is included.

(25)

The information processing apparatus described in (22)

in which the processing unit adjusts luminance of a screen of a display unit on the basis of brightness of an environment in a case where the image recognition unit detects that the image of the person is included, and sets the screen of the display unit to predetermined luminance in a case where the image recognition unit detects that the image of the person is not included.

(26)

The information processing apparatus described in any one of (1) to (25), in which the image recognition unit includes processing of image recognition using an inference model having a neural network structure.

(27)

The information processing apparatus described in any one of (1) to (26), in which the image recognition unit performs processing of image recognition using an image with lower resolution than resolution of the output image.

(28)

The information processing apparatus described in any one of (1) to (20), in which the image sensor outputs the output image with lower resolution than resolution of a viewing image to the processing unit.

(29)

The information processing apparatus described in any one of (1) to (28), in which the image recognition unit detects whether or not the image of the detection target is included in the captured image in a case where a motion is detected in the captured image.

(30)

An information processing method including:

detecting that an image of a predetermined detection target is included in a captured image captured by an image sensor, via an image recognition unit of an information processing apparatus having the image sensor, the image recognition unit of the image sensor, and a processing unit; and acquiring an output image output from the image sensor, executing predetermined processing on the output image, and causing the image sensor to output the output image in a case where the image recognition unit detects that the image of the detection target is included.

(31)

A program of causing a computer to function as:

an image recognition unit that an image sensor has, and detects that an image of a predetermined detection target is included in a captured image captured by the image sensor; and a processing unit that acquires an output image output from the image sensor, executes predetermined processing on the output image, and causes the image sensor to output the output image in a case where the image recognition unit detects that the image of the detection target is included.

REFERENCE SIGNS LIST

1 Terminal device
13 Storage
21 Pre-processing unit
22 Detection processing unit
31 Light receiving unit
32 Pixel reading unit
33 Drive timing control unit
34 Image pre-processing unit
36 Sensing processing unit
37 Sensing image signal processing unit
38 Viewing image signal processing unit
39 Register control unit
40 External IO control unit
42 Power management unit
43 Image output interface
61 Exposure control unit

The invention claimed is:

1. An information processing apparatus, comprising:

an image sensor configured to capture an image in an image frame, wherein the image sensor includes image recognition circuitry configured to:

execute image recognition on image data, obtained by a light receiving circuitry of the image sensor, based on an inference model having a Deep Neural Network (DNN) structure;

detect that an image of a specific detection target is included in the captured image captured by the image sensor; and output a detection result including a detection trigger; and processing circuitry, switchable between an activated state and a power-saving state, configured to:

in the power-saving state, cause the image sensor to operate in a sensing mode in which the image sensor executes the image recognition by the image recognition circuitry while suppressing transfer of the image data to the processing circuitry, based on reception of the detection trigger from the image sensor, transition from the power-saving state to the activated state, acquire an output image output from the image sensor, execute a specific processing on the output image, and cause the image sensor to stop or change the sensing mode after completion of the specific processing.

2. The information processing apparatus according to claim 1, wherein the image recognition circuitry includes DNN processing circuitry configured to execute person detection based on the inference model, and motion detection circuitry configured to detect a motion in the image frame based on a temporal change in the captured image, and the image sensor is configured such that the DNN processing circuitry executes the person detection based on the motion detection by the motion detection circuitry.

3. The information processing apparatus according to claim 2, wherein the processing circuitry is further configured to execute a process to detect an image of a face included in the output image.

4. The information processing apparatus according to claim 2, wherein the processing circuitry is further configured to execute face authentication to authenticate that an image of a face included in the output image is a face of a specific person.

5. The information processing apparatus according to claim 4, wherein the processing circuitry is further configured to unlock an own device in a case where the face authentication succeeds.

6. The information processing apparatus according to claim 4, wherein the processing circuitry is further configured to enable lock of an own device in a case where the image recognition circuitry does not detect that the image of the specific person is included.

7. The information processing apparatus according to claim 4, wherein the processing circuitry is further configured to unlock opening and closing circuitry in a case where the face authentication succeeds.

8. The information processing apparatus according to claim 2, wherein the processing circuitry is further configured to detect an orientation of an image of a face included in the output image.

9. The information processing apparatus according to claim 8, wherein the processing circuitry is further configured to rotate an image displayed on a display screen based on the orientation of the image of the face.

10. The information processing apparatus according to claim 9, wherein the processing circuitry is further configured to rotate the image displayed on the display screen based on a posture of an own device in a case where the image recognition circuitry does not detect that an image of a specific person is included.

11. The information processing apparatus according to claim 2, wherein the processing circuitry is further configured to execute a process to prevent peeping in a case where the image recognition circuitry detects that images of a plurality of persons are included.

12. The information processing apparatus according to claim 2, wherein the processing circuitry is further configured to transmit the output image to a party of a video call.

13. The information processing apparatus according to claim 1, wherein the image recognition circuitry is further configured to set the specific detection target as an animal, and the processing circuitry is further configured to store the output image in a storage unit.

14. The information processing apparatus according to claim 1, wherein the image recognition circuitry is further configured to set the specific detection target as at least one code of one-dimensional code or a two-dimensional code, and the processing circuitry is further configured to execute a process corresponding to the at least one code.

15. The information processing apparatus according to claim 14, wherein the processing circuitry is further configured to activate an application corresponding to the at least one code.

16. An information processing apparatus, comprising:

an image sensor configured to capture an image in an image frame, wherein the image sensor includes image recognition circuitry configured to:

execute image recognition on image data, obtained by light receiving circuitry of the image sensor, based on an inference model having a deep neural network structure;

detect whether an image of a specific detection target is included in the captured image captured by the image sensor; and processing circuitry, switchable between an activated state and a power-saving state, configured to:

in the power-saving state, cause the image sensor to operate in a sensing mode in which the image sensor executes the image recognition by the image recognition circuitry while suppressing transfer of the image data to the processing circuitry, execute a specific processing based on a result that is output from the image sensor and is detected by the image recognition circuitry, and cause the image sensor to stop or change the sensing mode after completion of the specific processing.

17. The information processing apparatus according to claim 1, wherein the image recognition circuitry is further configured to execute a process of image recognition based on an image with lower resolution than resolution of the output image.

18. An information processing method, comprising:

in an information processing apparatus having an image sensor:

executing, by image recognition circuitry of the image sensor, image recognition on image data, obtained by light receiving circuitry of the image sensor, based on an inference model having a deep neural network structure;

detecting, by the image recognition circuitry, that an image of a specific detection target is included in a captured image captured by the image sensor;

outputting, by the image recognition circuitry, a detection result including a detection trigger; and based on reception of the detection trigger from the image sensor, transitioning, by processing circuitry of the information processing apparatus, from a power-saving state to an activated state, wherein the processing circuitry is switchable between the activated state and the power-saving state, and in the power-saving state, the processing circuitry is configured to cause the image sensor to operate in a sensing mode in which the image sensor executes the image recognition by the image recognition circuitry while suppressing transfer of the image data to the processing circuitry, acquiring, by the processing circuitry, an output image output from the image sensor, executing, by the processing circuitry, a specific processing on the output image, and causing, by the processing circuitry, the image sensor to stop or change the sensing mode after completion of the specific processing.

19. A non-transitory computer readable medium having stored thereon, computer executable instructions, which when executed by a computer, cause the computer to execute operations:

executing, by image recognition circuitry of an image sensor included in an information processing apparatus, image recognition on image data, obtained by light receiving circuitry of the image sensor, based on an inference model having a deep neural network structure;

detecting, by the image recognition circuitry, that an image of a specific detection target is included in a captured image by the image sensor;

outputting, by the image recognition circuitry, a detection result including a detection trigger; and based on reception of the detection trigger from the image sensor, transitioning, by processing circuitry of the information processing apparatus, from a power-saving state to an activated state, wherein the processing circuitry is switchable between the activated state and the power-saving state, and in the power-saving state, the processing circuitry is configured to cause the image sensor to operate in a sensing mode in which the image sensor executes the image recognition by the image recognition circuitry while suppressing transfer of the image data to the processing circuitry, acquiring, by the processing circuitry, an output image output from the image sensor, executes predetermined executing, by the processing circuitry, a specific processing on the output image, and causing, by the processing circuitry, the image sensor to stop or change the sensing mode after completion of the specific processing.

* * * * *